United States Patent
Chiu et al.

(10) Patent No.: US 12,313,519 B2
(45) Date of Patent: May 27, 2025

(54) METHOD AND APPARATUS FOR FLOW-BASED, SINGLE-PARTICLE AND/OR SINGLE-MOLECULE ANALYSIS

(71) Applicant: University of Washington, Seattle, WA (US)

(72) Inventors: Daniel T. Chiu, Seattle, WA (US); Yifei Jiang, Seattle, WA (US); Mengxia Zhao, Seattle, WA (US); Yuanhua Cheng, Seattle, WA (US)

(73) Assignee: University of Washington, Seattle, WA (US)

( * ) Notice: Subject to any disclaimer, the term of this patent is extended or adjusted under 35 U.S.C. 154(b) by 252 days.

(21) Appl. No.: 18/250,613

(22) PCT Filed: Nov. 10, 2021

(86) PCT No.: PCT/US2021/058750
§ 371 (c)(1),
(2) Date: Apr. 26, 2023

(87) PCT Pub. No.: WO2022/103814
PCT Pub. Date: May 19, 2022

(65) Prior Publication Data
US 2024/0027325 A1 Jan. 25, 2024

Related U.S. Application Data

(60) Provisional application No. 63/198,748, filed on Nov. 10, 2020.

(51) Int. Cl.
*G01N 15/14* (2024.01)
*G01N 15/1434* (2024.01)
*G01N 15/01* (2024.01)

(52) U.S. Cl.
CPC ......... *G01N 15/1434* (2013.01); *G01N 15/01* (2024.01)

(58) Field of Classification Search
CPC .................................................. G01N 15/1434
See application file for complete search history.

(56) References Cited

U.S. PATENT DOCUMENTS 5,317,162 A * 5/1994 Pinsky ............... G01N 15/1459
250/459.1
6,653,651 B1 * 11/2003 Meinhart ........... G01N 15/1427
356/28

(Continued)

FOREIGN PATENT DOCUMENTS

WO 2019/199499 A1 3/2019
WO 2022/055656 A1 3/2022

OTHER PUBLICATIONS

Wu, Y. et al., "Ultrastable Fluorescent Polymer Dots for Stimulated Emission Depletion Bioimaging," Adv. Optical Mater. 2018, 6, 1800333.

(Continued)

*Primary Examiner* — Hugh Maupin
(74) *Attorney, Agent, or Firm* — Christensen O'Connor Johnson Kindness PLLC

(57) ABSTRACT

Systems and methods for analyzing particles flowing in a channel are described. In an embodiment, the channel is configured to flow a particle through a lumen of the channel, the channel defining an interrogation window configured to allow light to pass into and out of the lumen; a light engine comprising: a first light source positioned to output first excitation light onto a first portion of the channel in the interrogation window; and a second light source positioned to output second excitation light onto a second portion of the channel in the interrogation window separate from the first portion. In an embodiment, the systems include an emission (Continued)

fiber bundle comprising a first emission optical fiber and a second emission optical fiber, wherein a proximal end of first emission optical fiber and second emission optical fiber are arranged in an emission fiber bundle head.

23 Claims, 37 Drawing Sheets

(56) References Cited

U.S. PATENT DOCUMENTS

| | | | |
|---|---|---|---|
| 2003/0127609 A1* | 7/2003 | El-Hage | G01N 21/6452 250/574 |
| 2005/0162648 A1 | 7/2005 | Auer et al. | |
| 2006/0078998 A1* | 4/2006 | Puskas | G01N 33/68 436/64 |
| 2008/0213915 A1* | 9/2008 | Durack | G01N 15/1459 436/172 |
| 2010/0014068 A1 | 1/2010 | Padmanabhan et al. | |
| 2012/0097582 A1* | 4/2012 | Tsukii | G01N 15/1404 209/577 |
| 2012/0135874 A1* | 5/2012 | Wang | C12Q 1/6844 435/5 |
| 2012/0238472 A1* | 9/2012 | Jaffe | G01N 21/253 436/172 |
| 2015/0140577 A1* | 5/2015 | Li | G01N 33/56972 250/226 |
| 2017/0038299 A1* | 2/2017 | Long | G01N 21/6408 |
| 2019/0299210 A1 | 10/2019 | Lemoine et al. | |
| 2024/0167934 A1* | 5/2024 | Nolan | G01N 15/1459 |

OTHER PUBLICATIONS

Wu, C. et al., "Bioconjugation of Ultrabright Semiconducting Polymer Dots for Specific Cellular Targeting," J. Am. Chem. Soc. 2010, 132, 15410-15417.

Wu, C. et al., "Design of Highly Emissive Polymer Dot Bioconjugates for In Vivo Tumor Targeting," Angew. Chem. Int. Ed. 2011, 50, 3430 -3434.

Wu, C. and D. T. Chiu, "Highly Fluorescent Semiconducting Polymer Dots for Biology and Medicine," Angew. Chem. Int. Ed. 2013, 52, 3086-3109.

Wu, C. et al., "Preparation and Encapsulation of Highly Fluorescent Conjugated Polymer Nanoparticles," Langmuir 2006, 22, 2956-2960.

Xu, S. et al., "Sequential Ensemble-Decision Aliquot Ranking Isolation and Fluorescence In Situ Hybridization Identification of Rare Cells from Blood by Using Concentrated Peripheral Blood Mononuclear Cells," Anal. Chem. 2021, 93, 3196-3201.

Yu, J. et al., "Recent Advances in the Development of Highly Luminescent Semiconducting Polymer Dots and Nanoparticles for Biological Imaging and Medicine," Anal. Chem. 2017, 89, 42-56.

Yu, J. et al., "Stable Functionalization of Small Semiconducting Polymer Dots via Covalent Cross-Linking and Their Application for Specific Cellular Imaging," Adv. Mater. 2012, 24, 3498-3504.

Extended European Search Report mailed on Sep. 9, 2024, issued in the corresponding European Application No. 21892708.5, filed on Nov. 10, 2021; 7 pages.

International Search Report and Written Opinion mailed on Mar. 24, 2022, issued in corresponding International Application No. PCT*US2021/058750, filed on Nov. 10, 2021, pp. 1-24.

Andaloussi, S. E. et al., "Extracellular vesicles: biology and emerging therapeutic opportunities," Perspectives; Nature Reviews | Drug Discovery; vol. 12, May 2013, pp. 347-357.

Andersson, M. et al., "Photoinduced Electron Transfer Reactions in a Porphyrin-Viologen Complex: Observation of S2 to S1 Relaxation and Electron Transfer from the S2 State," J. Phys. Chem. B 1999, 103, 3258-3262.

Andreu, Z. and M. Yanez-Mo, "Tetraspanins in extracellular vesicle formation and function," frontiers in Immunology, Review Article, Sep. 16, 2014, vol. 5, Article 442, pp. 1-12.

Andronico, L. A. et al., "Sizing Extracellular Vesicles Using Membrane Dyes and a Single Molecule-Sensitive Flow Analyzer," Anal. Chem. 2021, 93, 5897-5905.

Aoki, Y. et al., Stacking layered structure of polymer light emitting diodes prepared by evaporative spray deposition using ultradilute solution for improving carrier balance, Elsevier: Thin Solid Films 518 (2009) 493-493.

Bates, M. et al., "Short-Range Spectroscopic Ruler Based on a Single-Molecule Optical Switch," Physical Review Letters 94, 108101-108101-4 (2005).

Betzig, E. et al., "Imaging Intracellular Fluorescent Proteins at Nanometer Resolution," Science, vol. 313 (5793), Sep. 15, 2006, pp. 1642-1646.

Chang, J-B et al., "Iterative expansion microscopy," Articles, Nature Methods, vol. 14:No. 6; Jun. 2017, 11 pages.

Chen, X. et al., "Multicolor Super-resolution Fluorescence Microscopy with Blue and Carmine Small Photoblinking Polymer Dots," ACS NANO 2017, 11, 084-8091.

Chen, X. et al., "Small Photoblinking Semiconductor Polymer Dots for Fluorescence Nanoscopy," Adv. Mater, 2017, 29, 1604850, pp. 1-7.

Daaboul, G. G. et al., "Digital Detection of Exosomes by Interferometric Imaging," Scientific Reports, 6:37246; Nov. 17, 2016, pp. 1-10.

Demchenki, A. P., et al., "Breaking the Kasha Rule for More Efficient Photochemistry," Chemical reviews 2017, 117, 13353-13381.

Dempsey, G. T. et al., "Evaluation of fluorophores for optimal performance in localization-based super-resolution imaging," Nature Methods; vol. 8:No. 12, Dec. 2011, 14 pages.

Ding, Z. et al., "Ratiometric pH sensing by fluorescence resonance energy transfer-based hybrid semiconducting polymer dots in living cells," Nanotechnology 32 (2021) 245502, 7 pages.

Emelyanov, A. et al., "Cryo-electron microscopy of extracellular vesicles from cerebrospinal fluid," PLoS ONE 15(1): e0227949 (2020) <https://doi.org/10.1371/journal.pone.0227949>.

Ghossoub, R. et al., "Tetraspanin-6 negatively regulates exosome production," PNAS, Mar. 17, 2020, vol. 117:No. 11; 5913-5922.

He, X. et al., "Formation of Well-Ordered Heterojunctions in Polymer:PCBM Photovoltaic Devices," Adv. Funct. Mater. 2011, 21, 139-146.

Huang, B. et al., "Three-Dimensional Super-Resolution Imaging by Stochastic Optical Reconstruction Microscopy," Science, Feb. 8, 2008, vol. 319 (5864), 810-814.

Jeppesen, D. K. et al., "Reassessment of Exosome Composition," Cell 177, Apr. 4, 2019, 428-445.

Jiang, Y. et al., "Dual-Mode Superresolution Imaging Using Charge Transfer Dynamics in Semiconducting Polymer Dots," Angew. Chem. Int. Ed. 2020, 59, 16173-16180.

Jiang, Y. et al., "Improved Superresolution Imaging Using Telegraph Noise in Organic Semiconductor Nanoparticles," ACS Publications; Nano Lett. 2017, 17, 3896-3901.

Jiang, Y. and J. McNeill, "Light-Harvesting and Amplified Energy Transfer in Conjugated Polymer Nanoparticles," ACS Publications; Chem. Rev. 2017, 117, 838-859.

Jiang, Y. et al., "Multimode Time-Resolved Superresolution Microscopy Revealing Chain Packing and Anisotropic Single Carrier Transport in Conjugated Polymer Nanowires," ACS Publications; Nano Lett. 2021, 21, 4255-4261.

Jung, S-R et al., "Single-Molecule Flow Platform for the Quantification of Biomolecules Attached to Single Nanoparticles," Anal. Chem. 2018, 90, 6089-6095.

Kalluri, R and V. S. LeBleu, "The biology, function, and biomedical applications of exosomes," Science, 367, 640, Feb. 7, 2020, 17 pages.

Kalluri, Raghu, "The biology and function of exosomes in cancer," J Clin Invest. 2016;126(4):1208-1215. https://doi.org/10.1172/JCI81135.

Kiyosawa, K. et al., "Electron Transfer from the Porphyrin S2 State in a Zinc Porphyrin-Rhenium Bipyridyl Dyad having Carbon Dioxide Reduction Activity," J. Phys. Chem. C 2009, 113, 11667-11673.

Li, J. and K. Pu, "Semiconducting Polymer Nanomaterials as Near-Infrared Photoactivatable Protherapeutics for Cancer," Acc. Chem. Res. 2020, 53, 752-762,.

(56) References Cited

OTHER PUBLICATIONS

Li., Y. et al., "Electrochemical properties of luminescent polymers and polymer light-emitting electrochemical cells," Elsevier: Synthetic Metals 99 (1999) 243-248.

Liu, J-J et al., "CryoEM structure of yeast cytoplasmic exosome complex," Cell Research (2016) 26:822-837.

Lorenz, R. M. et al., "Simultaneous generation of multiple aqueous droplets in a microfluidic device," Elsevier: Science Direct, Analytica Chimica Acta 630 (2008) 124-130.

Lyu, Y. et al., "Intraparticle Molecular Orbital Engineering of Semiconducting Polymer Nanoparticles as Amplified Theranostics for in Vivo Photoacoustic Imaging and Photothermal Therapy," ACS Publications, ACS Nano 2016, 10, 4472-4481.

Lyu, Y. et al., "Near-Infrared Afterglow Semiconducting Nano-Polycomplexes for the Multiplex Differentiation of Cancer Exosomes," VIP Biosensors, Angew. Chem. 2019, 131, 5037-5041.

Mutch, S. A. et al., "Protein Quantification at the Single Vesicle Level Reveals That a Subset of Synaptic Vesicle Proteins Are Trafficked with High Precision," The Journal of Neuroscience, Jan. 26, 2011; 31(4):1461-1470.

Mutch, S. A. et al., "Determining the number of specific proteins in cellular compartments by quantitative microscopy," Nature Protocols; vol. 6:No. 12, 2011, 1953-1968.

Oku, T. et al., "Effects of germanium addition to copper phthalocyanine/fullerene-based solar cells," Cent. Eur. J. Eng.; 2(2), 2012, 248-252.

Oku, T. et al., "Fabricationandcharacterizationoffullerene/porphyrinbulk heterojunctionsolarcells," Elsevier: Journal of Physics and Chemistry of Solids, 71 (2010) 551-555.

Raposo, G. and W. Stoorvogel, "Extracellular vesicles: Exosomes, microvesicles, and friends," The Rockefeller University Press; J. Cell Biol., vol. 200:No. 4, 373-383.

Rust, M. J. et al., "Sub-diffraction-limit imaging by stochastic optical reconstruction microscopy (STORM)," Nature Methods, vol. 3:No. 10, Oct. 2006, 793-795.

Schiro, P. G. et al., Continuous-flow single-molecule CE with high detection efficiency, Electrophoresis 2007, 28, 2430-2438.

Soung, Y. H. et al., "Exosomes in Cancer Diagnostics," Cancers 2017, 9, 8; doi:10.3390/cancers9010008.

Stoner, S. A. et al., "High Sensitivity Flow Cytometry of Membrane Vesicles," ISAC, Cytometry Part A, 89A: 196-206, 2016.

Tan, Y. H. et al., "A Nanoengineering Approach for Investigation and Regulation of Protein Immobilization," ACS NANO, vol. 2:No. 11, 2374-2384.

Théry, C. et al., "Exosomes: Composition, Biogenesis and Function," Nature Reviews, Immunology, vol. 2, Aug. 2002, 569-579.

Thompson, R. E. et al., "Precise Nanometer Localization Analysis for Individual Fluorescent Probes," Biophysical Journal, vol. 82, May 2002, 2775-2783.

Tian, Y. et al., "Protein Profiling and Sizing of Extracellular Vesicles from Colorectal Cancer Patients via Flow Cytometry," ACS Nano 2018, 12, 671-680.

Van Der Pol, E. et al., "Particle size distribution of exosomes and microvesicles determined by transmission electron microscopy, flow cytometry, nanoparticle tracking analysis, and resistive pulse sensing," Journal of Thrombosis and Haemostasis, 12: 1182-1192.

van Niel, G. et al., "Shedding light on the cell biology of extracellular vesicles," Nature Reviews, Molecular Cell Biology, vol. 19, Apr. 2018, 213-228.

Vojtech, L. et al., "Exosomes in human semen carry a distinctive repertoire of small non-coding RNAs with potential regulatory functions," Nucleic Acids Research, 2014, vol. 42, No. 11, 7290-7304.

\* cited by examiner

METHOD AND APPARATUS FOR FLOW-BASED, SINGLE-PARTICLE AND/OR SINGLE-MOLECULE ANALYSIS

CROSS-REFERENCES TO RELATED APPLICATIONS

The present application is a National Stage of International Application No. PCT/US2021/058750, filed Nov. 10, 2021, which claims the benefit of U.S. Provisional Patent Application No. 63/198,748, filed Nov. 10, 2020, the disclosure of each of which is incorporated herein by reference in its entirety.

STATEMENT OF GOVERNMENT LICENSE RIGHTS

This invention was made with government support under Grant No. UG3 TR002874, awarded by the National Institutes of Health. The government has certain rights in the invention.

BACKGROUND

Flow-based analysis of small particles, such as extracellular vesicles, can present several challenges. Typical flow-based particle analysis includes flowing a number of particles dispersed in a fluid suspension through a channel. As a size of the particles decreases, the particles tend to diffuse faster than larger particles. Additionally, because a velocity of fluid flowing through the channel under laminar conditions varies radially according to its distance from a wall of the channel, the velocity of the particles flowing through the channel correspondingly varies according to their distance from the wall. Accordingly, it is more difficult to differentiate between various smaller particles flowing through a channel as particle velocity is dependent upon their radial position, which is, in turn strongly affected by their relatively high diffusivity.

Accordingly, there is presently a need for devices, systems, and methods for flow-based analysis of small particles that account for diffusion-based challenges in identifying and characterizing such small particles.

SUMMARY

In certain aspects, the present disclosure provides devices, systems, and methods for flow-based analysis of particles and/or molecules to address these and related challenges.

In an aspect, the present disclosure provides a system for analyzing particles and/or molecules. In an embodiment, the system comprises: a channel configured to flow a particle and/or molecules through a lumen of the channel, the channel defining an interrogation window configured to allow light to pass into and out of the lumen; a light engine comprising: a first light source positioned to output first excitation light onto a first portion of the channel in the interrogation window; and a second light source positioned to output second excitation light onto a second portion of the channel in the interrogation window separate from the first portion; an emission fiber bundle comprising a first emission optical fiber and a second emission optical fiber, wherein a proximal end of first emission optical fiber and second emission optical fiber are arranged in an emission fiber bundle head, and wherein the proximal end of the first emission optical fiber is positioned to receive first emission light emitted from the first portion and the proximal end of the second emission optical fiber is positioned to receive second emission light emitted from the second portion; and a detector system comprising: a first photodetector positioned to receive the first emission light emitted from a distal end of the first emission optical fiber; and a second photodetector positioned to receive the second emission light emitted from a distal end of the second emission optical fiber.

In another aspect, the present disclosure provides a method of interrogating a particle and/or molecules, the method comprising: flowing a particle and/or molecules through a channel; outputting first excitation light through an interrogation window onto a first portion of the channel; outputting second excitation light through the interrogation window onto a second portion of the channel distinct from the first portion; generating a first emission signal with a first photodetector based on first emission light received through a proximal end of a first emission optical fiber; and generating a second emission signal with a second photodetector based on second emission light received through a proximal end of a second emission optical fiber, wherein the proximal end of the first emission optical fiber and the proximal end of the second emission optical fiber are arranged in an emission fiber bundle head.

In another aspect, the present disclosure provides a system for analyzing particles and/or molecules, the system comprising: a channel configured to flow a particle and/or molecules through a lumen of the channel, the channel defining an interrogation window configured to allow light to pass into and out of the lumen; a light engine configured to output excitation light into the channel through the interrogation window; a detector system positioned to receive emission light emitted from the channel and configured to generate a signal based upon the received emission light; and a light collection system positioned to collect the emission light from the channel and direct the collected emission light onto the detector system, the light collection system comprising an air objective having a numerical aperture in a range of greater than 0.91 and less than 0.99, greater than 0.92 and less than 0.98, greater than 0.93 and less than 0.97, and greater than 0.94 and less than 0.96.

In yet another aspect, the present disclosure provides a method for analyzing a particle or molecule in a fluid sample, the method comprising: flowing a fluid sample comprising a plurality of particles/molecules through a channel; illuminating in the channel a particle/molecule of the plurality of particles/molecules having a hydrodynamic diameter of less than 1 μm; collecting emission light emitted from the channel with a light collection system comprising an air objective having a numerical aperture in a range of about 0.91 to less than 0.99; and generating a signal based on the collected emission light emitted from the channel based on the particle/molecule; and assigning a value to the particle/molecule based on the signal.

In another aspect, the present disclosure provides a system for self-corrected single-particle/molecule flow analysis, the system comprising: a channel configured to flow a particle/molecule through a lumen of the channel, the channel defining an interrogation window configured to allow light to pass into and out of the lumen; a light engine comprising: a first light source positioned to output first excitation light onto a first portion of the channel in the interrogation window; and a second light source positioned to output second excitation light onto a second portion of the channel in the interrogation window separate from the first portion; and a detector system comprising: a first photodetector positioned to receive first emission light emitted from the first portion of the channel; and a second photodetector positioned to receive second emission light emitted from the second portion; and a controller operatively coupled to the first light source, the second light source, the first photodetector, and the second photodetector, including logic that, when executed by the controller, causes the system to perform operations including: outputting the first excitation light with the first light source; outputting the second excitation light with the second light source; generating a first emission signal with the first photodetector based upon first emission light received from the first portion; generating a second emission signal with the second photodetector based upon second emission light received from the second portion; and determining a velocity of a particle/molecule in the channel based on a time difference between generating the first emission signal and the second emission signal and a distance between the first portion and the second portion.

In yet another aspect, the present disclosure provides a method for self-corrected single-molecule flow analysis, the method comprising: flowing a particle/molecule through a lumen of a channel, the channel defining an interrogation window configured to allow light to pass into and out of the lumen; outputting first excitation light with a first light source into a first portion of the interrogation window; outputting second excitation light with a second light source into a second portion of the interrogation window separate from the first portion; generating a first emission signal with a first photodetector based upon first emission light received from the first portion; generating a second emission signal with a second photodetector based upon second emission light received from the second portion and determining a velocity of a particle/molecule in the channel based on a time difference between the first emission signal and the second emission signal and a distance between the first portion and the second portion.

In another aspect, the present disclosure provides another method for self-corrected single-molecule flow analysis, the method comprising: flowing a particle/molecule through a lumen of a channel, the channel defining an interrogation window configured to allow light to pass into and out of the lumen; outputting an excitation light with a light source into a portion of the interrogation window; generating an emission signal with a photodetector based upon the emission light received from the portion; acquiring the emission signal at a rate faster than the transit time of the particle/molecule across the portion; determining the transit time of the particle/molecule across the portion. In an embodiment, the acquiring of the emission signal is at a rate that is at least 2 fold, at least 5 fold, or at least 10 fold faster than the transit time of the particle/molecule. In an embodiment, the determining of the transit time of the particle/molecule across the portion is based on fitting the acquired emission signal trace to a function. In an embodiment, the function is a Gaussian curve. In another aspect, the present disclosure provides a method of maintaining focusing on a fluidic channel, the method comprising: illuminating an interrogation window of a fluidic channel with light from a light source; focusing the light onto the interrogation window with optical components disposed between the channel and a photodetector; generating a lock signal with the photodetector based on the focused light back reflected from the interrogation window at a first time; generating a test signal with the photodetector based on the focused light back reflected from the interrogation window at a second time after the first time; determining whether the test signal is within a predetermined percentage of the lock signal; and moving the fluidic channel relative to the photodetector if the test signal is outside of the predetermined percentage of the lock signal.

In yet another aspect, the present disclosure provides a method of focusing optical components on a fluidic channel, the method comprising illuminating an interrogation window of a fluidic channel with light from a light source; focusing the light onto the interrogation window with optical components disposed between the channel and a photodetector; generating a lock signal with the photodetector based on the focused light back reflected from the interrogation window at a first time; generating a test signal with the photodetector based on the focused light back reflected from the interrogation window at a second time after the first time; determining whether the test signal is within a predetermined percentage of the lock signal; and moving the fluidic channel relative to the high numerical aperture air objective if the test signal is outside of the predetermined percentage of the lock signal. In an embodiment, the imaging is performed outside of the visible range, and more preferably, in the near-infrared region. In an embodiment, the imaging is performed using an air objective with a NA of between 0.91 and 0.99. In an embodiment, the imaging is performed using an air objective with a NA of around 0.95.

In another aspect, the present disclosure provides a method of maintaining focus of optical components directed on a fluidic channel, the method comprising: illuminating an imaging area of a microfluidic system with light from a light source; generating an image of the imaging area with a camera; determining an amount of defocus of the image; determining whether the amount of defocus is within a predetermined amount of defocus; and moving the fluidic channel relative to the camera if the test signal is outside of the predetermined range.

In yet another aspect, the present disclosure provides a method of single-molecule detection, the method comprising flowing a plurality of molecules through a channel, wherein one or more molecules of the plurality of molecules is associated with a detectable agent; illuminating in the channel a molecule of the plurality of molecules; collecting emission light emitted from the channel with a light collection system comprising an air objective having a numerical aperture in a range of about 0.91 to less than 0.99; generating an emission signal based on the collected emission light emitted from the channel based on the molecule; and assigning a value to the molecule based on the signal.

In another aspect, the present disclosure provides an apparatus with single-molecule detection efficiency, the apparatus comprising a channel configured to flow a particle or molecule through a lumen of the channel, the channel defining an interrogation window configured to allow light to pass into and out of the lumen; a light engine configured to output excitation light into the channel through the interrogation window; a detector system positioned to receive emission light emitted from the channel and configured to generate a signal based upon the received emission light; a light collection system positioned to collect the emission light from the channel and direct the collected emission light onto the detector system, the light collection system comprising an air objective having a numerical aperture in a range of greater than 0.91 and less than 0.99; and a controller operatively coupled to the light engine and the detector and including logic that, when executed by the controller, causes the system to perform operations including flowing a plurality of molecules and/or a plurality of particles through the channel, wherein one or more molecules of the plurality of molecules and/or one or more particles of the plurality of particles is associated with a detectable agent; illuminating in the channel a molecule of the plurality of molecules or a particle of the plurality of particles; collecting emission light emitted from the channel with the light collection system; generating an emission signal based on the collected emission light emitted from the channel based on the molecule and/or the particle; and assigning a value to the molecule and/or the particle based on the signal.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure provides systems and methods for flow-based analysis of particles and molecules. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Small particles and molecules tend to diffuse in a fluid flowing within a channel more than larger particles. Radial displacement of the particles, i.e. displacement of the particles in a direction orthogonal to a major flow axis of the channel, due to diffusion of the particle can make measuring characteristics of such small particles, such as fluorescence measurements, challenging, particularly when there are a number of particles or molecules flowing through the channel. For example, with multiple particles or molecules flowing through the channel simultaneously, individual particles or molecules may have different velocities through the channel. Where particles and/or molecules in the channel are measured at various points in the channel, correlating signals generated by photodetectors positioned to interrogate the channel at various points along a length of the channel with a single molecule or particle can become challenging. Indeed, as a size of the particles decreases toward the size of, for example, extracellular vesicles, or even single molecules, such measurement can become very challenging.

Systems

Accordingly, in an aspect, the present disclosure provides a system for analyzing particles, such as single biological nanoparticles, and/or molecules.

Fiber-Bundled Emission and Excitation

Figure 1A:
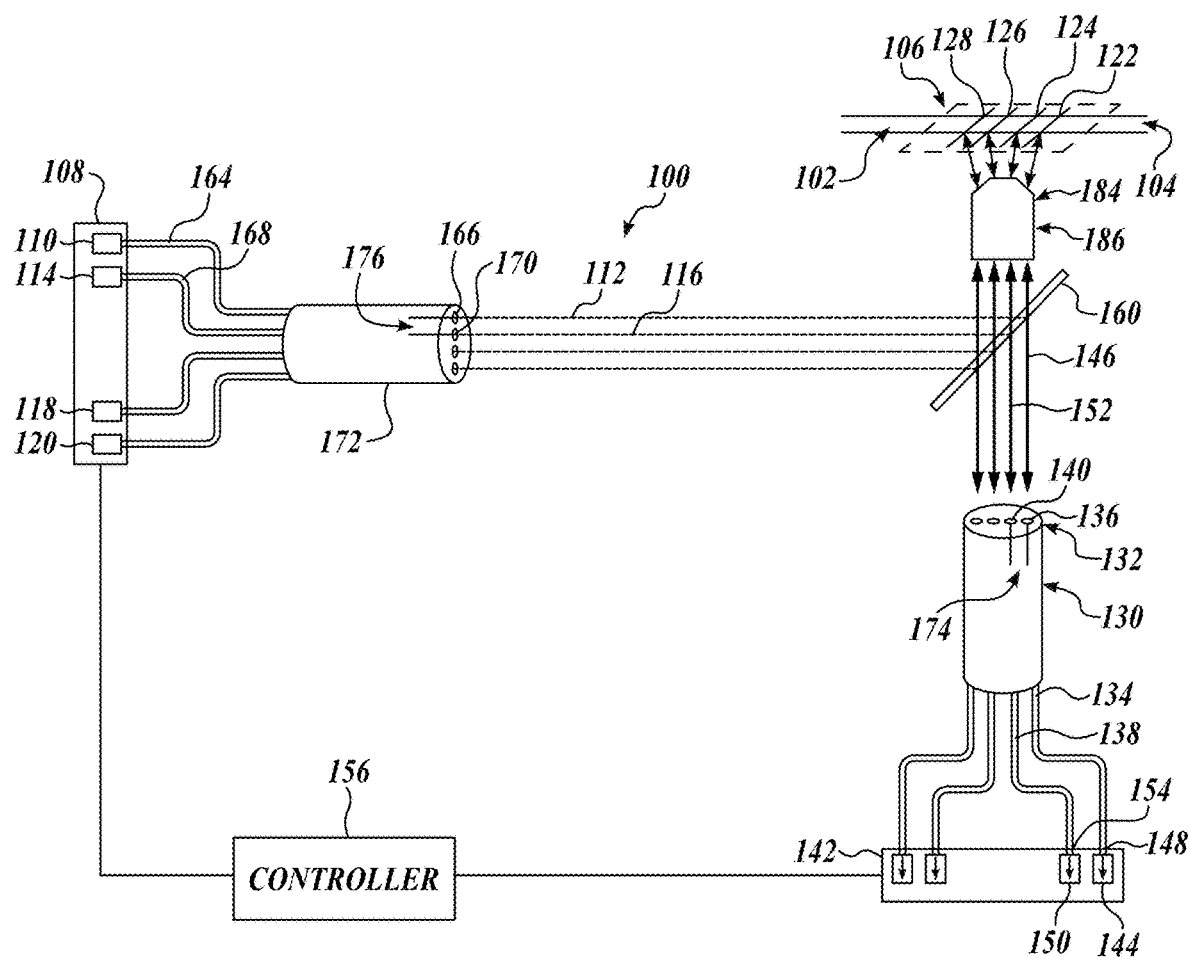
FIG. 1A is a schematic illustration of a flow-based, single-particle/molecule analysis system using a high-numeric aperture (NA) air objective, in accordance with an embodiment of the disclosure.
Figure 1B:
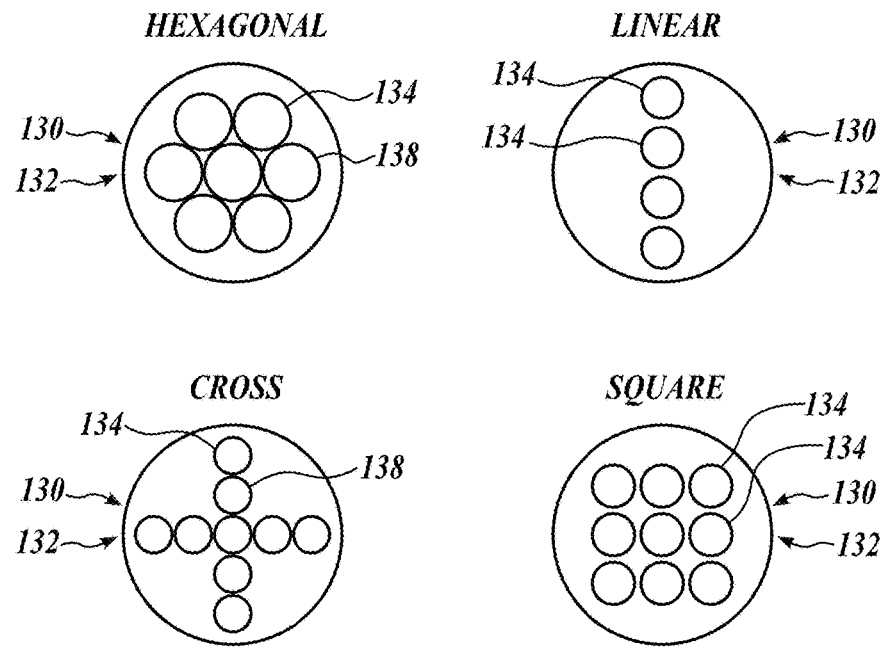
FIG. 1B is a schematic illustration of an emission fiber bundle head of the system of FIG. 1A, in accordance with an embodiment of the disclosure.

In that regard, attention is directed to FIGS. 1A and 1B, in which a system 100, in accordance with an embodiment of the present disclosure, is illustrated.

As shown, the system 100 includes a channel 102 configured to flow a particle and/or molecules through a lumen 104 of the channel 102, the channel 102 defining an interrogation window 106 configured to allow light to pass into and out of the lumen 104; a light engine 108 configured to output light into the interrogation window 106; an emission fiber bundle 130 positioned to receive emission light emitted from the interrogation window 106; and a detector system 142 positioned to receive the emission light emitted from the emission fiber bundle 130.

In an embodiment, the system 100 or a portion thereof including, for example, the channel 102 and interrogation window 106, includes a microfluidic chip. Microfluidic chips may be formed from substrates (e.g. silicon, glass, ceramic, plastic, organosilicon, quartz, polymeric materials, or a combination thereof) and may include a network of microfluidic channels through which fluid flows. Microfluidic devices can be used to process minute volumes of fluidic samples, and offer advantages over traditional macro-scale devices (e.g. by requiring substantially smaller volumes of fluidic samples, requiring less reagent use, and processing time is decreased in comparison to macro-scale devices). Microfluidic chips provide an attractive and versatile platform for the manipulation, isolation, sorting, and/or transport of particles and/or molecules. The case with which arrays of microfluidic channels can be pattered and integrated within microfluidic devices makes these microfluidic devices an attractive platform for applications involving particles and/or molecules. Microfluidic chips are planar devices and thus can facilitate the detection and analyses of particles and/or molecules by enabling the use of high light-collection-efficiency objectives, which enhances light collection and thus facilitate the detection, analyses, determination, and/or identification of the particles and/or molecules.

In some embodiments, the methods, systems, devices, and apparatuses of this disclosure include a microfluidic chip, which can facilitate the manipulation, detection, analyses, determination, and/or identification of the biological nanoparticles and/or single molecules in transit. Microfluidic chips can be used to process small volumes of fluidic samples, and offer advantages over traditional macro-scale devices (e.g., microfluidic chips require only minute volumes of fluidic samples, require less reagent, and are processed in a smaller amount of time, adding to efficiency in comparison to macro-scale devices). Microfluidic chips are planar devices and, thus, can facilitate the detection and analyses of bionanoparticles and/or by enabling the use of high-NA (numerical aperture) objectives (e.g. high-NA air objectives), such as an air objective having a NA of around 0.95 or between 0.91 and 0.99, lenses, or light collection systems with high numerical apertures, which enhances light collection and, thus, facilitates the detection, analyses, determination, and/or identification of the biological nanoparticles and/or molecules. In certain embodiment, microfluidic chips are planar devices, enhancing their compatibility with a microscope setup (e.g. with a translation stage on which the microfluidic chip is placed). Microfluidic chips additionally can allow for the design and generation of interconnected fluidic networks without having dead volumes, which in turn can facilitate the detection and manipulation of bionanoparticles and/or molecules (e.g., sorting using flow displacement at a junction of three or more fluidic channels). Dead volume is a portion of volume within the microfluidic chip that is outside of the flow path (e.g., a volume into which liquid, potentially carrying sample nanoparticles and/or molecules, can diffuse into, thus potentially decreasing accuracy). Microfluidic chips, through methods of microfabrication, can allow for the creation of channels with cross sections that are non-spherical or non-square (e.g., rectangular), which can facilitate the detection, analyses, determination, and/or identification of the biological nanoparticles and/or molecules in transit. Microfluidic chips can facilitate the creation of channels with different widths or heights along the length of the channel (e.g., a constriction or a step change in width and/or height of the channel) to facilitate the manipulation, detection, analyses, determination, and/or identification of the biological nanoparticles and/or molecules in transit. Microfluidic chips can be formed by bonding to a coverslip (e.g. made of glass or plastic) of a desirable thickness as well as having a desirable material property (e.g. refractive index) to enhance compatibility with high-efficiency light collection system (e.g., a high numerical aperture objective, such as high-NA air objective, requiring the appropriate substrate thickness for maximal light collection) to facilitate the manipulation, detection, analyses, determination, and/or identification of the biological nanoparticles and/or single molecules in transit. Microfluidic chips provide an attractive and versatile platform for the manipulation, isolation, sorting, and/or transport of bionanoparticles and/or single molecules.

Referring still to FIGS. 1A and 1B, in an embodiment, portions of the system 100, such as those including the channel 102, are fabricated from materials including, but not limited to, polymeric materials (polydimethylsiloxane (PDMS), polyurethane-methacrylate (PUMA), polymethylmethacrylate (PMMA), polyethylene, polyester (PET), polytetrafluoroethylene (PTFE), polycarbonate, parylene, polyvinyl chloride, fluoroethylpropylene, lexan, polystyrene, cyclic olefin polymers, cyclic olefin copolymers, polyestercarbonate, polypropylene, polybutylene, polyacrylate, polyurethane, polycaprolactone, polyketone, polyphthal amide, cellulose acetate, polyacrylonitrile, polysulfone, epoxy polymers, thermoplastics, fluoropolymer, and polyvinylidene fluoride, polyamide, polyimide), inorganic materials (glass, quartz, silicon, GaAs, silicon nitride), fused silica, ceramic, glass (organic), and/or other materials and combinations thereof. In an embodiment, the system 100 comprises porous membranes, woven or non-woven fibers (such as cloth or mesh) of wool, metal (e.g., stainless steel or Monel), glass, paper, or synthetic (e.g., nylon, polypropylene, polycarbonate, parylene, and various polyesters), sintered stainless steel and other metals, and porous inorganic materials such as alumina, silica or carbon.

The interrogation window 106 of the channel 102 allows excitation light, such as from the light engine 108, to pass into the lumen 104 of the channel 102 and emission light to pass out of the channel 102 for receipt by the detector system 142. Such excitation light and emission light can include light from a number of wavelength ranges, such as including but not limited to visible light, infrared light, near-infrared light, and ultraviolet light, and combinations thereof. In this regard, the interrogation window 106 is suitable to excite particles and/or molecules flowing through the channel 102 and to allow light emitted from the interrogation window 106 to be received by the detector system 142 for further analysis.

As discussed further herein, in an embodiment, the lumen 104 of the channel 102 within the interrogation window 106, or in certain embodiments adjacent to the interrogation window 106, defines a constriction or other narrowing of a cross section or diameter or other size feature of the lumen 104. Such a constriction or narrowing of the lumen 104 is configured to flow particles and/or molecules through the portion of the channel 102 including the interrogation window 106 on a particle-by-particle and/or molecule-by-molecule basis and under laminar flow conditions.

In an embodiment, the interrogation window 106 includes a portion of the channel within a field of view of the objective 186 and/or detectable by the detector system 142. In an embodiment, the interrogation window 106 includes a portion of the channel 102 defining a constriction relative to other portions of the channel 102. As described further herein, in such an embodiment, the constriction of the interrogation window 106 can have a dimension, such as a height, width, cross-sectional area, etc., that is smaller than other immediately adjacent portions of the channel 102.

In some embodiments, the constriction has a width smaller than the widest part of the microfluidic channel 102. In certain embodiments, the constriction has a width relative to the widest part of the microfluidic channel 102. In some embodiments, the constriction has a width less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% the maximum width of the microfluidic channel. As a non-limiting example, a microfluidic channel 102 having a maximum width of 100 μm can have a constriction that is less than 25% the value of the maximum width (i.e. less than 25 μm). In preferred embodiments, the constriction has a width less than 10% the width of the maximum width of the microfluidic channel 102.

In some embodiments, the maximum width of the microfluidic channel 102 has a value less than 900 μm and greater than 0.1 μm, less than 800 μm and greater than 0.5 μm, less than 700 μm and greater than 1 μm, less than 600 μm and greater than 5 μm, less than 500 μm and greater than 10 μm, less than 1,000 μm and greater than 10 μm, less than 900 μm and greater than 10 μm, less than 800 μm and greater than 10 μm, less than 700 μm and greater than 10 μm, less than 600 μm and greater than 10 μm, less than 500 μm and greater than 10 μm, less than 400 μm and greater than 10 μm, less than 300 μm and greater than 10 μm, less than 500 μm and greater than 0.1 μm, less than 500 μm and greater than 1 μm, less than 500 μm and greater than 2 μm, less than 500 μm and greater than 5 μm, less than 800 μm and greater than 0.1 μm, less than 700 μm and greater than 0.1 μm, less than 600 μm and greater than 0.1 μm, less than 500 μm and greater than 0.1 μm, less than 400 μm and greater than 0.1 μm, or less than 300 μm and greater than 0.1 μm. In preferred embodiments, the maximum width of the microfluidic channel 102 has a value less than 500 μm and greater than 10 μm.

In some embodiments, the constriction has a width smaller than the average width of the microfluidic channel. In certain embodiments, the constriction has a width relative to the average width of the microfluidic channel. In some embodiments, the constriction has a width less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% the average width of the microfluidic channel 102.

In some embodiments, the average width of the microfluidic channel 102 has a value less than 900 μm and greater than 0.1 μm, less than 800 μm and greater than 0.5 μm, less than 700 μm and greater than 1 μm, less than 600 μm and greater than 5 μm, less than 500 μm and greater than 10 μm, less than 1,000 μm and greater than 10 μm, less than 900 μm and greater than 10 μm, less than 800 μm and greater than 10 μm, less than 700 μm and greater than 10 μm, less than 600 μm and greater than 10 μm, less than 500 μm and greater than 10 μm, less than 400 μm and greater than 10 μm, less than 300 μm and greater than 10 μm, less than 500 μm and greater than 0.1 μm, less than 500 μm and greater than 1 μm, less than 500 μm and greater than 2 μm, less than 500 μm and greater than 5 μm, less than 800 μm and greater than 0.1 μm, less than 700 μm and greater than 0.1 μm, less than 600 μm and greater than 0.1 μm, less than 500 μm and greater than 0.1 μm, less than 400 μm and greater than 0.1 μm, or less than 300 μm and greater than 0.1 μm. In preferred embodiments, the average width of the microfluidic channel 102 has a value less than 500 μm and greater than 10 μm.

In some embodiments, the constriction has a height smaller than greatest height value (i.e., the maximum height) of the microfluidic channel 102. In certain embodiments, the constriction has a height relative to the maximum height of the microfluidic channel. In some embodiments, the constriction has a height less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% of the maximum height of the microfluidic channel. As a non-limiting example, a microfluidic channel 102 having a maximum height of 20 μm can have a constriction that is less than 10% the value of the maximum height (i.e., less than 2 μm). In preferred embodiments, the constriction has a height less than 25% the maximum height of the microfluidic channel 102.

In some embodiments, the maximum height of the microfluidic channel 102 has a value less than 900 μm and greater than 0.1 μm, less than 800 μm and greater than 0.5 μm, less than 700 μm and greater than 1 μm, less than 600 μm and greater than 5 μm, less than 500 μm and greater than 10 μm, less than 1,000 μm and greater than 10 μm, less than 900 μm and greater than 10 μm, less than 800 μm and greater than 10 μm, less than 700 μm and greater than 10 μm, less than 600 μm and greater than 10 μm, less than 500 μm and greater than 10 μm, less than 400 μm and greater than 10 μm, less than 300 μm and greater than 10 μm, less than 500 μm and greater than 0.1 μm, less than 500 μm and greater than 1 μm, less than 500 μm and greater than 2 μm, less than 500 μm and greater than 5 μm, less than 800 μm and greater than 0.1 μm, less than 700 μm and greater than 0.1 μm, less than 600 μm and greater than 0.1 μm, less than 500 μm and greater than 0.1 μm, less than 400 μm and greater than 0.1 μm, or less than 300 μm and greater than 0.1 μm. In preferred embodiments, the maximum height of the microfluidic channel 102 has a value less than 500 μm and greater than 10 μm.

In some embodiments, the constriction has a height smaller than the average height of the microfluidic channel. In certain embodiments, the constriction has a height relative to the average height of the microfluidic channel. In some embodiments, the constriction has a height less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% of the average height of the microfluidic channel.

In some embodiments, the average height of the microfluidic channel has a value less than 900 μm and greater than 0.1 μm, less than 800 μm and greater than 0.5 μm, less than 700 μm and greater than 1 μm, less than 600 μm and greater than 5 μm, less than 500 μm and greater than 10 μm, less than 1,000 μm and greater than 10 μm, less than 900 μm and greater than 10 μm, less than 800 μm and greater than 10 μm, less than 700 μm and greater than 10 μm, less than 600 μm and greater than 10 μm, less than 500 μm and greater than 10 μm, less than 400 μm and greater than 10 μm, less than 300 μm and greater than 10 μm, less than 500 μm and greater than 0.1 μm, less than 500 μm and greater than 1 μm, less than 500 μm and greater than 2 μm, less than 500 μm and greater than 5 μm, less than 800 μm and greater than 0.1 μm, less than 700 μm and greater than 0.1 μm, less than 600 μm and greater than 0.1 μm, less than 500 μm and greater than 0.1 μm, less than 400 μm and greater than 0.1 μm, or less than 300 μm and greater than 0.1 μm. In preferred embodiments, the average height of the microfluidic channel has a value less than 500 μm and greater than 10 μm.

In some embodiments, the constriction has a cross sectional area less than the greatest cross-sectional area (i.e., the maximum cross-sectional area) of the microfluidic channel. In certain embodiments, the constriction has a cross sectional area relative to the maximum cross-sectional area of the microfluidic channel. In some embodiments, the constriction has a cross sectional area less than 50%, less than 45%, less than 40%, less than 35%, less than 30%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, less than 1%, less than 0.5%, less than 0.2%, less than 0.1%, less than 0.05%, less than 0.02%, less than 0.01%, less than 0.005%, less than 0.002%, or less than 0.001% of the maximum cross sectional area of the microfluidic channel. As a non-limiting example, a microfluidic channel having a maximum cross-sectional area of 200 μm$^2$ can have a constriction that is less than 10% the value of the maximum cross-sectional area (i.e., less than 20 μm$^2$). In preferred embodiments, the constriction has a cross sectional area between 10% and 0.01% the maximum cross-sectional area of the microfluidic channel.

In some embodiments, maximum cross sectional area of the microfluidic channel has a value less than 1,000,000 μm$^2$ and greater than 10 μm$^2$, less than 750,000 μm$^2$ and greater than 25 μm$^2$, less than 500,000 μm$^2$ and greater than 100 μm$^2$, less than 250,000 μm$^2$ and greater than 250 μm$^2$, less than 900,000 μm$^2$ and greater than 100 μm$^2$, less than 800,000 μm$^2$ and greater than 100 μm$^2$, less than 700,000 μm$^2$ and greater than 100 μm$^2$, less than 600,000 μm$^2$ and greater than 100 μm$^2$, less than 400,000 μm$^2$ and greater than 100 μm$^2$, less than 300,000 μm$^2$ and greater than 100 μm$^2$, less than 200,000 μm$^2$ and greater than 100 μm$^2$, less than 100,000 μm$^2$ and greater than 100 μm$^2$, less than 50,000 μm$^2$ and greater than 100 μm$^2$, less than 25,000 μm$^2$ and greater than 100 μm$^2$, less than 10,000 μm$^2$ and greater than 100 μm$^2$, less than 1,000 μm$^2$ and greater than 100 μm$^2$, less than 2,000,000 μm$^2$ and greater than 250 μm$^2$, less than 1,000,000 μm$^2$ and greater than 250 μm$^2$, less than 900,000 μm$^2$ and greater than 250 μm$^2$, less than 800,000 μm$^2$ and greater than 250 μm$^2$, less than 700,000 μm$^2$ and greater than 250 μm$^2$, less than 600,000 μm$^2$ and greater than 250 μm$^2$, less than 400,000 μm$^2$ and greater than 250 μm$^2$, less than 300,000 μm$^2$ and greater than 250 μm$^2$, less than 200,000 μm$^2$ and greater than 250 μm$^2$, less than 100,000 μm$^2$ and greater than 250 μm$^2$, less than 50,000 μm$^2$ and greater than 250 μm$^2$, less than 25,000 μm$^2$ and greater than 250 μm$^2$, less than 10,000 μm$^2$ and greater than 250 μm$^2$, or less than 1,000 μm$^2$ and greater than 250 μm$^2$. In preferred embodiments, the maximum cross-sectional area of the microfluidic channel has a value less than 250,000 μm$^2$ and greater than 250 μm$^2$.

In some embodiments, the constriction has a cross sectional area less than the average cross-sectional area of the microfluidic channel. In certain embodiments, the constriction has a cross sectional area relative to the average cross-sectional area of the microfluidic channel. In some embodiments, the constriction has a cross sectional area less than 50%, less than 45%, less than 40%, less than 35%, less than 30%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, less than 1%, less than 0.5%, less than 0.2%, less than 0.1%, less than 0.05%, less than 0.02%, less than 0.01%, less than 0.005%, less than 0.002%, or less than 0.001% of the average cross sectional area of the microfluidic channel.

In some embodiments, average cross sectional area of the microfluidic channel has a value less than 1,000,000 μm$^2$ and greater than 10 μm$^2$, less than 750,000 μm$^2$ and greater than 25 μm$^2$, less than 500,000 μm$^2$ and greater than 100 μm$^2$, less than 250,000 μm$^2$ and greater than 250 μm$^2$, less than 900,000 μm$^2$ and greater than 100 μm$^2$, less than 800,000 μm$^2$ and greater than 100 μm$^2$, less than 700,000 μm$^2$ and greater than 100 μm$^2$, less than 600,000 μm$^2$ and greater than 100 μm$^2$, less than 400,000 μm$^2$ and greater than 100 μm$^2$, less than 300,000 μm$^2$ and greater than 100 μm$^2$, less than 200,000 μm$^2$ and greater than 100 μm$^2$, less than 100,000 μm$^2$ and greater than 100 μm$^2$, less than 50,000 μm$^2$ and greater than 100 µm², less than 25.000 µm² and greater than 100 µm², less than 10,000 µm² and greater than 100 µm², less than 1,000 µm² and greater than 100 µm², less than 2,000,000 µm² and greater than 250 µm², less than 1,000,000 µm² and greater than 250 µm², less than 900,000 µm² and greater than 250 µm², less than 800,000 µm² and greater than 250 µm², less than 700,000 µm² and greater than 250 µm², less than 600,000 µm² and greater than 250 µm², less than 400,000 µm² and greater than 250 µm², less than 300,000 µm² and greater than 250 µm², less than 200,000 µm² and greater than 250 µm², less than 100,000 µm² and greater than 250 µm², less than 50,000 µm² and greater than 250 µm², less than 25.000 µm² and greater than 250 µm², less than 10,000 µm² and greater than 250 µm², or less than 1,000 µm² and greater than 250 µm². In preferred embodiments, the average cross-sectional area of the microfluidic channel has a value less than 250,000 µm² and greater than 250 µm².

In some embodiments, the constriction has a height of less than 10 µm, a height of less than 9 µm, a height of less than 8 µm, a height of less than 7 µm, a height of less than 6 µm, a height of less than 5 µm, a height of less than 4 µm, a height of less than 3 µm, a height of less than 2 µm, or a height of less than 1 µm². In some embodiments, the constriction has a width of less than 10 µm, a width of less than 9 µm, a width of less than 8 µm, a width of less than 7 µm, a width of less than 6 µm, a width of less than 5 µm, a width of less than 4 µm, a width of less than 3 µm, a width of less than 2 µm, or a width of less than 1 µm.

In some embodiments, the at least one microfluidic channel comprises one, two, three, four, five, six, seven, eight, nine, ten, or more than ten constrictions. In some embodiments, the microfluidic chip comprises a plurality of microfluidic channels, at least a portion of which each comprise one, two, three, four, five, six, seven, eight, nine, ten, or more than ten constrictions. In some embodiments, the microfluidic chip comprises a plurality of microfluidic channels, the majority of which each comprise one, two, three, four, five, six, seven, eight, nine, ten, or more than ten constrictions. In some embodiments, the microfluidic chip comprises a plurality of microfluidic channels, each of which comprises one, two, three, four, five, six, seven, eight, nine, ten, or more than ten constrictions.

In some embodiments, at least a portion of at least one microfluidic channel 102 has a cross sectional area of less than 10,000 µm², a cross sectional area of less than 5,000 µm², a cross sectional area of less than 3,000 µm², a cross sectional area of less than 1,000 µm², a cross sectional area of less than 800 µm², a cross sectional area of less than 600 µm², a cross sectional area of less than 400 µm², a cross sectional area of less than 200 µm², or a cross sectional area of less than 100 µm². In preferred embodiments, at least a portion of at least one microfluidic channel has a cross sectional area of less than 100 µm², a cross sectional area of less than 90 µm², a cross sectional area of less than 80 µm², a cross sectional area of less than 70 µm², a cross sectional area of less than 60 µm², a cross sectional area of less than 50 µm², a cross sectional area of less than 40 µm², a cross sectional area of less than 30 µm², a cross sectional area of less than 20 µm², a cross sectional area of less than 10 µm², a cross sectional area of less than 5 µm², a cross sectional area of less than 2 µm², or a cross sectional area of less than 1 µm². In some embodiments, the at least one microfluidic channel has a maximum cross sectional area of less than 250,000 µm², less than 100,000 µm², less than 50,000 µm², less than 25,000 µm², less than 10,000 µm², less than 5,000 µm², less than 3,000 µm², less than 1,000 µm², less than 800 µm², less than 600 µm², less than 400 µm², less than 200 µm², or less than 100 µm². In some embodiments, the at least one microfluidic channel has a maximum cross sectional area of less than 100 µm², less than 90 µm², less than 80 µm², less than 70 µm², less than 60 µm², less than 50 µm², less than 40 µm², less than 30 µm², less than 20 µm², less than 10 µm², less than 5 µm², less than 2 µm², or less than 1 µm². In preferred embodiments, at least a portion of at least one microfluidic channel has a cross sectional area of between 1 µm² and 100 µm². In some embodiments, the at least one microfluidic channel has a maximum cross-sectional area of between 100 µm² and 10,000 µm².

In certain embodiments, at least a portion of at least one microfluidic channel comprises a discontinuous change in at least one of its width or height (e.g., achieved using techniques of microfabrication). The microfluidic chip used herein can comprise a microfluidic channel with a step gradient or a step change of at least one of its height or width, which is in contrast to a microfluidic channel comprising a continuous change in height or width. Channels comprising a continuous change in height or width is common in devices comprising, e.g., glass tubes, which can be achieved by pulling a heated tube. In specific embodiments, at least a portion of at least one microfluidic channel has a height and a width that are changed independently from one another. The independent change of height and width is in contrast to, for example, glass tubes, wherein fabrication of a decreased height is accompanied by a corresponding decrease of width (e.g., the drawing and thinning of a glass tube that has been heated close to its melting temperature).

As above, the system 100 includes a light engine 108. In the illustrated embodiment, the light engine 108 is shown to include a number of light sources 110, 114, 118, and 120 each positioned to emit or output excitation light onto respective and separate portions 122, 124, 126, and 128 of the channel 102 in the interrogation window 106. In this regard, the light engine 108 is shown to include a first light source 110 positioned to output first excitation light 112 onto a first portion 122 of the channel 102 in the interrogation window 106; and a second light source 114 positioned to emit or output second excitation light 116 onto a second portion 124 of the channel 102 in the interrogation window 106 separate from the first portion 122. The light engine 108 is shown to further include third light source 118 and fourth light source 120 positioned to output third excitation light and fourth excitation light, respectively, onto third portion 126 and fourth portion 128 of the channel 102 in the interrogation window 106.

In an embodiment, the portions 122, 124, 126, and 128 are defined by a width of excitation light after being focused by the objective 186 and impinging on the channel 102. For example, in an embodiment, portion 122 has a width defined by a width of excitation light 112 impinging upon channel 102. In an embodiment, a width of the portions 122, 124, 126, and 128 is less than 2.0 µm, 1.5 µm, 1.0 µm, 0.9 µm, 0.8 µm, 0.7 µm, 0.6 µm, 0.5 µm, 0.4 µm, 0.3 µm, or 0.2 µm. In an embodiment, the width of the portions 122, 124, 126, and 128 is in a range of about 2.0 µm to about 0.2 µm, 1.0 µm to about 0.2 µm, 0.9 µm to about 0.2 µm, 0.8 µm to about 0.2 µm, 0.7 µm to about 0.2 µm, or about 0.6 µm to about 0.2 µm. In an embodiment, a width of the portions 122, 124, 126, and 128 are defined a $1/e^2$ of a maximum of the excitation light intensity. In an embodiment, a width of the portions 122, 124, 126, and 128 are defined $1/e$ of a maximum of the excitation light intensity.

Where a width of the portions 122, 124, 126, and 128 is too wide, a signal-to-noise ratio will be too low for, for example, single molecule/particle detection and analysis. In this regard, excitation line widths that are too wide and too closely spaced (e.g. when there is substantial overlap of two excitation lines) will generate crosstalk between portions of the channel 102. Additionally, excitation line widths that are too wide will illuminate larger portions of the channel 102 creating larger amounts of background light that will lower a signal-to-noise ratio, especially where amounts of light emitted by a single particle/molecule may be relatively low.

As shown, the light sources 110 and 114 are optically coupled to optical fibers 164 and 168 such that excitation light 112 and 116 output therefrom is received and transmitted by the optical fibers 164 and 168. In the illustrated embodiment, the first light source 110 is optically coupled to a proximal end 166 of a first excitation optical fiber 164; and the second light source 114 is optically coupled to a proximal end 170 of a second excitation optical fiber 168.

While optically coupled light sources are shown, it will be understood that, in certain embodiments, the light sources 110, 114, 118, and 120 of the light engine 108 are free-space light sources, which are not optically coupled to excitation optical fibers. In this regard and in an embodiment, the free-space light sources do not have an optical fiber disposed between the free-space light sources and the interrogation window 106 positioned to receive the excitation light and output excitation light into free space. In this regard, spacing between excitation light of adjacent light sources is defined, at least in part, by additional optical components of the system 100, which direct and/or shape the excitation light emitted therefrom. Accordingly, in an embodiment, the excitation optical fibers, such as excitation optical fiber 164 and 168 of the excitation optical fiber bundle 172 are optional. And in some embodiment, the excitation optical fiber bundle 172 is absent.

The excitation light output by the light sources 110, 114, 118, and 120 of the light engine 108 can be of any wavelength. In an embodiment, the excitation light of one light source is the same as the excitation light output by another light source of the light engine 108. In an embodiment, the excitation light of one light source is different from the excitation light output by another light source of the light engine 108. In an embodiment, the first excitation light 112 has wavelengths in a first wavelength range, and wherein the second excitation light 116 has wavelengths in a second wavelength range distinct from the first wavelength range. In an embodiment, the first excitation light 112 has wavelengths in a first wavelength range, and wherein the second excitation light 116 has wavelengths in a second wavelength range common with the first wavelength range.

The first excitation light 112 and second excitation light 116 can be any excitation light suitable to optically excite a dye or other detectable agent in or on a particle or associated with a molecule. In an embodiment, the first excitation light 112 and/or second excitation light 116 includes coherent light, such as from a laser. In an embodiment, the first light source 110 and the second light source 114 are each independently selected from the group consisting of a solid state laser, a diode-pumped laser, a light-emitting diode (LED), a lamp, an arc discharge, and a natural light.

In an embodiment, the first excitation light 112 is in a wavelength range of about 350 nm to about 360 nm, in a wavelength range of about 400 nm to about 410 nm, in a wavelength range of about 480 nm to about 490 nm, in a wavelength range of about 530 nm to about 540 nm, in a wavelength range of about 555 nm to about 565 nm, or in a wavelength range of about 630 nm to about 690 nm. In an embodiment, the second excitation light 116 is in a wavelength range of about 350 nm to about 360 nm, in a wavelength range of about 400 nm to about 410 nm, in a wavelength range of about 480 nm to about 490 nm, in a wavelength range of about 530 nm to about 540 nm, in a wavelength range of about 555 nm to about 565 nm, or in a wavelength range of about 630 nm to about 690 nm.

As shown, a distal end of the first excitation optical fiber 164 and a distal end of the second excitation optical fiber 168 are arranged in an excitation fiber bundle head 172. As shown, the distal ends of the excitation optical fibers 164 and 168 are spaced apart by a spacing 176. In an embodiment, this spacing 176 defines, at least in part, a spacing of the excitation light 112 and 116 output by the excitation fiber bundle head 172 and the light engine 108. Correspondingly, in an embodiment, a spacing 176 between the distal end of the first excitation optical fiber 164 and the distal end of the second excitation optical fiber 168 corresponds to a spacing between the first portion 122 and the second portion 124. In this regard, excitation light can be output by disparately positioned light sources 110, 112, 118, and 120 of the light engine 108, brought together by the excitation fiber bundle head 172, and outputted onto positionally separate portions of the interrogation window 106 of the channel 102 according to a spacing 176 of the distal ends of the excitation optical fibers.

Such a configuration of the excitation fiber bundle head 172 can be further manipulated by excitation optics. Not shown, see for example, FIG. 3A. In an embodiment, the excitation optical fibers 164 and 168 are disposed adjacent to one another in the fiber bundle head, such as within one fiber diameter of each other (e.g. edge-to-edge distance). In an embodiment, a fiber bundle, such as an excitation fiber bundle 172, refers to optical fibers coupled or otherwise brought into proximity at an end of the optical fibers. As discussed further herein, by bringing ends of optical fibers into proximity to one another, such as within a fiber diameter width, light output from disparately positioned light sources coupled to optical fibers can be transmitted through the optical fibers and emitted therefrom in an orientation shaped or otherwise defined in part by an orientation of the optical fibers in the optical fiber bundle.

Figure 6:
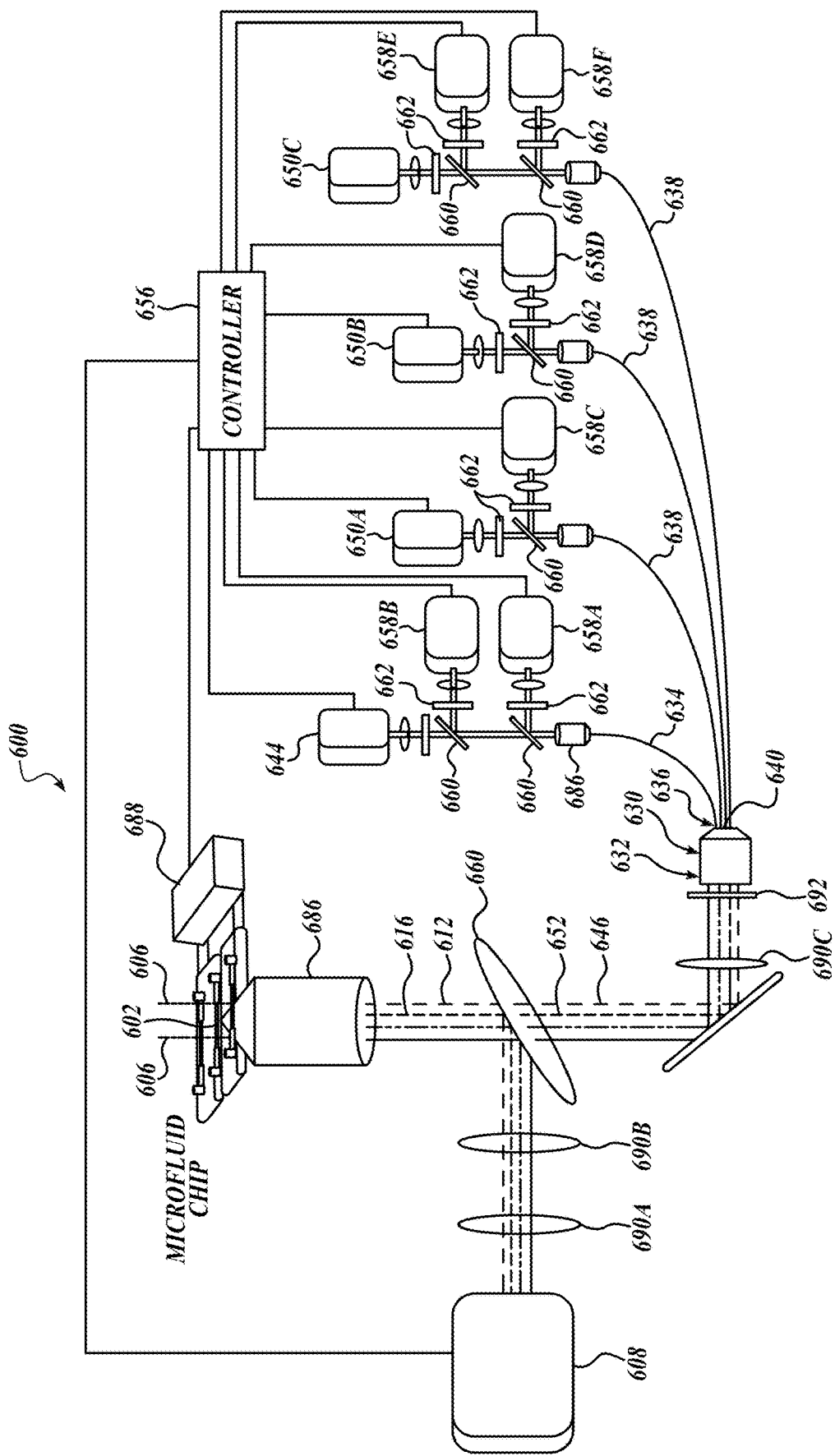
FIG. 6 is a schematic illustration of a flow-based, single-molecule/particle system using a high-NA air objective in accordance with an embodiment of the disclosure.

As above, while optically coupled light sources are illustrated, it will be understood that the light engine 108 can include free-space light sources, such as is discussed further herein with respect to FIG. 6. Further, it will be understood that portions of the interrogation window 106 illuminated by the light engine 108 and spacing therebetween are manipulated by optical elements positioned between the free-space light sources and the interrogation window 106.

As shown, the system 100 includes a dichroic mirror 160 positioned to reflect at least a portion of the excitation light 112 and 116 toward the interrogation window 106 of the channel 102. In the illustrated embodiment, the system 100 further includes an objective 186, such as an air objective 186, positioned to collect the excitation light reflected off the dichroic mirror 160 and configured to focus the excitation light 112 and 116 onto the channel 102. In this regard, excitation light from the light sources is output onto spatially separate portions of the channel 102 within the interrogation window 106. As above, in an embodiment, the interrogation window 106 is defined, at least in part, by the field of view of the objective 186.

While dichroic mirror 160 is illustrated, it will be understood that other optical components may be used to selectively or partially transmit and reflect light. In an embodiment, dichroic mirror 160 is replaced with a transmissive mirror, such as a 20% reflective/80% transmissive mirror, or other structure configured to selectively or partially transmit and reflect light.

As above, particles or molecules flowing through the channel 102, such as particles containing and/or molecules associated with one or more detectable agents, can be excited by the excitation light 112 and 116. Such excited particles/molecules can emit emission light 146 and 152, which is radiated or otherwise emitted out of the interrogation window 106 and through the dichroic mirror 160. As shown the emission light 146 and 152 has the same or similar relative spacing as the excitation light 112 and 116 impinging upon the interrogation window 106.

The emission light 146 and 152 is shown impinging upon the emission fiber bundle 130 of the system 100. In the illustrated embodiment, the emission fiber bundle 130 is shown to include four emission optical fibers closely coupled in space. Like the excitation fiber bundle 172, the emission optical fiber bundle 130 brings ends of optical fibers, here emission optical fibers 134 and 138, in close proximity and according to a particular orientation or arrangement. As discussed further herein, the particular arrangement of the emission optical fibers within fiber bundle head 132 is suitable to position the emission optical fibers 134 and 138 to receive the emission light 146 and 152.

While four emission optical fibers are shown in FIG. 1A, it will be understood that other numbers and configurations of emission optical fibers are possible. In an embodiment, the emission fiber bundle 130 comprises at least three emission optical fibers, at least four emission optical fibers, at least five emission optical fibers, at least six emission optical fibers, at least seven emission optical fibers, or more. In an embodiment, the emission fiber bundle 130 includes a first emission optical fiber 134 and a second emission optical fiber 138, wherein a proximal end 136 of first emission optical fiber 134 and second emission optical fiber 138 are arranged in an emission fiber bundle head 132, and wherein the proximal end 136 of the first emission optical fiber 134 is positioned to receive first emission light 146 emitted from the first portion 122 and the proximal end 140 of the second emission optical fiber 138 is positioned to receive second emission light 152 emitted from the second portion 124.

In an embodiment, proximal ends 136 and 140 of each emission optical fibers 134 and 138 of the emission fiber bundle 130 are disposed in the emission fiber bundle head 132. In an embodiment, proximal ends 136 and 140 of each emission optical fiber 134 and 138 of the emission fiber bundle 130 are positioned to receive emission light 146 and 152 emitted from a distinct portion 122 and 124 of interrogation window 106. In an embodiment, the proximal ends 136 and 140 of the emission optical fibers 134 and 138 are disposed adjacent to each other, such as within one fiber diameter of each other (e.g. a distance between an edge of one fiber to a nearest edge of the neighboring fiber is within one fiber diameter).

In an embodiment, the emission optical fibers of the emission fiber bundle head 132 are arranged to receive, such as to individually or separately receive, emission light that corresponds to distinct excitation regions or portions of the interrogation window 106. As above, in an embodiment, the portions of the interrogation window 106, such as portions 122 and 124, are defined by a width of the excitation light, such as a width of excitation light 112 and 116, as it impinges upon the interrogation window.

By placing proximal ends 136 and 140 of the emission optical fibers 134 and 138 closely adjacent in the emission fiber bundle head 132, the emission optical fibers 134 and 138 are positioned to receive emission light from different portions of the channel 102, such as portions of the channel 102 that are excited by different light sources of the light engine 108. In an embodiment, a spacing between proximal ends 136 and 140 of the emission optical fibers 134 and 138 is based upon a spacing of the portions 122 and 124 of the channel 102, such as based upon a spacing of excitation light 112 and 116 impinging upon the interrogation window 106.

In this regard, attention is directed to FIG. 1B, which is a schematic illustration of an emission fiber bundle head 132 of the system 100. FIG. 1B illustrates a number of configurations for the emission optical fibers of the emission fiber bundle head 132. In a preferred embodiment, the emission optical fibers 134 are arranged in a linear configuration within the emission fiber bundle head 132.

In an embodiment, a spacing 174 and/or arrangement of proximal ends 136 and 140 of the emission optical fibers 134 and 138 corresponds to a spacing and/or arrangement of portions of the interrogation window 106 excited by light sources of the light engine 108. As shown, the proximal ends 136 and 140 of the emission optical fibers 134 and 138 are arranged in a linear configuration. In this regard, the emission optical fibers 134 and 138 are arranged in the emission optical fiber bundle head 132 to receive emission light 146 and 152 from the channel 102 in which the light engine 108 is configured to emit or output excitation light into the interrogation window 106 in, for example, a linear configuration.

In an embodiment, the spacing 174 is within a range of about 1 μm and about 1,000 μm, within a range of about 100 μm and about 900 μm, within a range of about 1 μm and about 100 μm, within a range of about 10 μm and about 500 μm, within a range of about 50 μm and about 800 μm. In another embodiment, the distance between an edge of an emission optical fiber and the nearest edge of another emission optical fiber in the proximal end of the fiber bundle head is near zero (i.e. touching) or within the radius of the fiber.

In an embodiment, the spacing 174 is a distance between a center of one emission optical fiber and a center of a different emission optical fiber. In an embodiment, the spacing 174 is a distance between an edge of an emission optical fiber and the nearest edge of another emission optical fiber.

In an embodiment, a spacing 174 between the proximal end 136 of the first emission optical fiber 134 and the proximal end 140 of the second emission optical fiber 138 corresponds to a spacing between the first portion 122 and the second portion 124 of the interrogation window 106. In this embodiment, the spacing is the center-to-center distance. In an embodiment, such correspondence is a direct correspondence in which a spacing between proximal ends 136 and 140 of the emission optical fibers 134 and 138 and a spacing between the first portion 122 and the second portion 124 matches directly or closely after accounting for magnification of the optical system. In an embodiment, the correspondence is adjusted and/or modified according to optics of the system 100, such as the objective 186 and any other lenses, mirrors, and the like disposed between the interrogation window 106 and the emission fiber bundle head 132.

In an embodiment, a spacing 176 between the distal end 166 of the first excitation optical fiber 164 and the distal end 170 of the second excitation optical fiber 168 corresponds to a spacing between the first portion 122 and the second portion 124 of the interrogation window 106. In an embodiment, such correspondence is a direct correspondence in which a spacing between distal ends 166 and 170 of the excitation optical fibers 164 and 168 and a spacing between the first portion 122 and the second portion 124 matches directly or closely after accounting for magnification of the optical system. In this regard, a spacing between the first light source 110 outputting from distal end 166 and the second light source 114 outputting from distal end 170 corresponds to a spacing between the first portion 122 and the second portion 124. In an embodiment, the correspondence is adjusted and/or modified according to optics of the system 100, such as the objective 186 and any other lenses, mirrors, and the like disposed between the interrogation window 106 and the excitation fiber bundle head 172.

In an embodiment, a spacing 176 between the distal end 166 of the first excitation optical fiber 164 and the distal end 170 of the second excitation optical fiber 168 corresponds to a spacing 174 between the proximal end 136 of the first emission optical fiber 134 and the proximal end 140 of the second emission optical fiber 138. As above, such correspondence can be a direct correspondence, or a correspondence modified by any optical components that manipulate or direct emission light.

In an embodiment, the spacing 176 is within a range of about 1 μm and about 1,000 μm, within a range of about 1 μm and about 100 μm, within a range of about 250 μm and about 750 μm, within a range of about 1 μm and about 50 μm, within a range of about 10 μm and about 500 μm. In another embodiment, the distance between an edge of an optical fiber and the nearest edge of another optical fiber in the fiber bundle head is near zero (i.e. touching) or within the radius of the fiber.

As above, the system 100 includes a detector system 142 positioned to receive the emission light emitted from the emission fiber bundle 130. As shown, the emission optical fibers 134 and 138 fan out from the emission fiber bundle head 132 at their proximal ends 136 and 140, respectively, to terminate at their distal ends 148 and 154 adjacent and optically coupled to detector modules 144 and 150 of the detector system 142. As used herein, a "detector module" refers to a detection structure and/or collection of detection components configured to generate a signal or a set of signals based on light received by the detector module, such as received by one or more detection structures and/or components. The detector systems of the present disclosure, such as detector system 142, can include one or more detector modules and/or one or more individual detectors, such as one or more individual photodetectors.

In an embodiment, one or more of the detector modules 144 and 150 includes a single photodetector optically coupled and positioned to receive emission light 146 and 152. In another embodiment, one or more of the detector modules 144 and 150 includes a plurality of individual photodetectors, such as discussed further herein with respect to FIG. 2. In this regard, each of the detector modules 144 and 150 can be configured to receive emission light 146 and 152 and generate multiple signals based upon that emission light 146 and 152, such as based upon particular wavelength ranges within emission light 146 and 152.

In an embodiment, a distal end 148 and 154 of each emission optical fiber 134 and 138 is positioned to emit light onto at least one respective detector modules 144 and 150. In an embodiment, the detector system 142 is positioned to receive scattered emission light, luminescent emission light, fluorescent emission light, or a combination thereof from the interrogation window 106. In an embodiment, the scattered emission light is selected from backscattered light, side-scattered light, or forward-scattered light.

While photodetectors, such as photodetectors within detector modules 144 and 150, are discussed, it will be understood that other types of light detection structures and components are possible and within the scope of the present disclosure. In an embodiment the photodetectors within detector modules 144 and 150 are selected from the group consisting of a camera, an electron multiplier, a charge-coupled device (CCD) image sensor, a photomultiplier tube (PMT), a microchannel plate PMT (MCP), a hybrid PMT detector, an avalanche photodiode (APD), a single-photon avalanche diode (SPAD), a single-photon counting module (SPCM), a silicon photomultiplier (SiPM), and a complementary metal oxide semiconductor (CMOS) image sensor.

In the illustrated embodiment, the terminal end of each emission optical fiber is optically coupled to a detector module for receipt of emission light. In this regard, the detector system 142 is shown to include a first detector module 144 positioned to receive the first emission light 146 emitted from a distal end 148 of the first emission optical fiber 134; and a second detector module 150 positioned to receive the second emission light 152 emitted from a distal end 154 of the second emission optical fiber 138.

The system 100 is shown to further include a controller 156 operatively coupled to the light engine 108 and the detector system 142. Such a controller 156 includes logic configured to choreograph the operation of these components. While one controller 156 is shown directly coupled to these components, it will be understood that multiple controllers, such as those wirelessly coupled and/or in a distributed system, are possible and within the scope of the present disclosure.

In an embodiment, the controller 156 includes logic for performing some or all aspects of the methods described further herein. In an embodiment, the controller 156 includes logic for outputting excitation light with the light engine 108 into the interrogation window 106 and generating a signal with the detector system 142 based upon emission light emitted from the interrogation window 106 and received by the detector system 142. In an embodiment, the controller 156 includes logic that when executed by the controller 156, causes the system 100 to perform operations including outputting the first excitation light 112 with the first light source 110; outputting the second excitation light 116 with the second light source 114; generating a first emission signal with the first detector module 144 based upon the first excitation light 112 received from the first emission optical fiber 134; and generating a second emission signal with the second detector module 150 based upon the second excitation light 116 received from the second emission optical fiber 138.

In an embodiment, the controller 156 further includes logic that, when executed by the controller 156, causes the system 100 to perform operations including flowing a suspension of particles and/or a solution of molecules through the channel 102, such as a suspension in fluid communication with the channel 102. As used herein, a "particle" refers to a localized object or entity, such as within a surrounding medium. In an embodiment, the particle defines a phase discontinuity relative to its surroundings, such as where a solid particle is surrounded and suspended in a liquid or gas phase. As discussed further herein, in certain embodiments, the particle is a biological particle, such as a biological nanoparticle, from a subject, derived from a subject, from an organism, derived from an organism, from an environmental sample, and the like.

In an embodiment, flowing the suspension through the channel 102 comprises flowing the suspension through the channel 102 on a particle-by-particle basis or molecule-by-molecule basis. Such a particle-by-particle flow of the particles or molecule-by-molecule flow of the molecules is suitable to individually analyze the particles and/or molecules flowing through the channel 102. In an embodiment, the interrogation window 106 defines a constriction relative to other portions of the channel 102, which narrows the lumen 104. In an embodiment, the particle-by-particle flow and/or molecule-by-molecule flow occurs within the constriction of the lumen 104.

In an embodiment, the controller 156 includes logic that, when executed by the controller 156, causes the system 100 to perform operations including ranking particles and/or molecules in the channel 102. Such ranking can be based upon, for example, a presence or absence of emission light associated with the particle and/or molecule, such as emission light detected by the detector system 142. In an embodiment, the ranking is based upon an intensity of emission light and/or a wavelength of the emission light, such as detected by the detector system 142. In an embodiment, the ranking corresponds with measured emission spectra of the particle and/or molecule based upon one or more of the first emission light 146 and the second emission light 152. In an embodiment, the ranking corresponds with measured excitation spectra of the particle and/or molecule based upon one or more of the first excitation light 112 and the second excitation light 116.

As used herein, the term "assigning" refers to designating a quantitative property, qualitative property, or importance of a particle and/or molecule categorization to the particle and/or molecule subject of the assigning. In one embodiment, a size value can be assigned to a particle. In an embodiment, assigning is based upon light emitted from the particle or molecule and assigning is based upon the presence, absence, and/or intensity of such emission light. As used herein, the term "size value" refers to a relative size value or to an actual size value. The size value provides a true or relative measure of a linear distance. In certain embodiments, the assigning is performed by a computer and a software representing an assigning algorithm.

As used herein, the term "ranking" refers to assessing a quantitative property, qualitative property, or importance of a particle and/or molecule by categorization. In one embodiment, a particle and/or molecule may be ranked as either null (for example, when a nanoparticle and/or molecule has an emission intensity below a detectable threshold), or nonzero (for example, when a particle and/or molecule is detected). In some embodiments, the ranking is binary. For example, each particle and/or molecule having a detected light intensity above a threshold limit is assigned a value of 1, while each measured sample not having a detected light intensity above the threshold limit is assigned a value of 0, thus forming a binary ranking. In other embodiments, a particle and/or molecule may be ranked according to additional categories, e.g., which correlate with the identity of the particle and/or molecule, the presence of a detectable characteristic, the presence of a distinguishing feature, and the like. The rankings may be assigned an arbitrary number corresponding to one of a number of predetermined quantitative or qualitative categories. In other embodiments, the ranking is non-binary, for example, the value is assigned based on the amount of emitted light intensity measured from a particle and/or molecule. In certain embodiments, the ranking is performed by a computer and a software representing a ranking algorithm.

As used herein, a "detectable characteristic" refers to an observable property associated with a particle and/or molecule, for example, a photoactive, electroactive, bioactive, or magnetic property that is associated with the particle and/or molecule, or which is intrinsic to the nanoparticle and/or molecule. In certain embodiments, the "detectable characteristic" includes the association of the particle and/or molecule with a detectable agent, or a biomarker.

Examples of photoactive properties include, for example, alterations in optical intensity (optical reflection, scattering, deflection, transmission, absorbance, or emission) commonly induced by bioparticle morphology (particle size, internal subcellular structures), fluorescence, luminescence, immunofluorescence, and the like. Detection of the photoactive properties can, for example, report the size, mass, surface area, volume, protein content, membrane area, lipid content, enzyme content, metabolite content, carbohydrate content, peptide content, nucleic-acid content, protein identity, or nucleic-acid identity on, in, or associated with the nanoparticle.

In an embodiment, the ranking corresponds with a measured size value of the particle. In an embodiment, the measured size value is a relative size value. In an embodiment, the measured size value is measured by a difference in a detected emission light intensity. In an embodiment, the measured size value is an actual size value.

In an embodiment, the system 100 further comprises a flow director, such as including one or more valves, configured to direct flow of the particle and/or molecule in the channel 102. In an embodiment, the flow director is operatively coupled to the controller 156, and wherein the controller 156 includes logic that, when executed by the controller 156, causes the system 100 to perform operations including: directing flow of the particle and/or molecule based upon a presence or absence of emission light received from the interrogation window 106 and associated with the particle and/or molecule. In an embodiment, the flow director is operatively coupled to the controller 156, and wherein the controller 156 includes logic that, when executed by the controller 156, causes the system 100 to perform operations including directing flow of the particle and/or molecule based upon the ranking. In an embodiment, directing the flow of the particle and/or molecule includes directing the particle and/or molecule into one of two or more sorting channels. In an embodiment, the flow director is operatively coupled to the controller 156, and wherein the controller 156 includes logic that, when executed by the controller 156, causes the system 100 to perform operations including quantifying a number of particles and/or molecules associated with emission light from the interrogation; and determining a concentration of the particles and/or molecules associated with the emission light from the interrogation window 106. In an embodiment, the concentration is further based upon a measured flow volume, as discussed further herein with respect to FIGS. 11A and 11B.

In an embodiment, the flow director or flow directing mechanism for directing the flow of the particle and/or molecule comprises an electrode, a magnetic element, an acoustic element, an electro-actuated element, and optically actuated element, an electric field, or a magnetic field. In some embodiments, the mechanism for directing the flow of the particle and/or molecule comprises one or more electro-actuated valves or pistons, wherein the valves or pistons control the flow of a liquid in at least a first directional flow channel that intersects with the first input channel and the two exit channels at a first junction. In one embodiment, solenoid pistons are subcomponents of electro-actuated solenoid valves. In another embodiment, solenoid pistons are embedded in device by molding. In yet another embodiment, the embedded solenoid pistons may be replaced by solenoid valves in fluidic communication via tubings.

In one particular embodiment, an apparatus provided herein may comprise one or more electrodes for tracking and/or manipulating the trajectory or flow of a particle and/or molecule, particle, molecule, or fluid sample. In certain embodiments, the electrode may enhance the separation of a nanoparticle and/or molecule based on phenomena such dielectrophoresis or electro-osmotic flow or electrophoresis. In embodiments wherein the particle and/or molecule has a hydrodynamic diameter of less than 100 nm, sheath flow focusing or acoustic focusing may not be sufficient to adequately manipulate the trajectory of a particle for the methods and apparatus disclosed herein, such as to direct the trajectory of the particle within the channel 102. See, e.g.: Optics Express Vol. 15, Issue 10, pp. 6167-6176 (2007), which is incorporated herein by reference. Accordingly, in some embodiments, the mechanism for focusing the particle excludes sheath flow focusing, acoustic flow focusing, or a combination thereof. In some embodiments, the particle is directed, with the proviso that said directing does not use acoustic focusing, sheath flow focusing, or a combination thereof.

Self-Corrected, Flow-Based Particle Analysis

As above, in an embodiment, the system 100 includes a channel 102 configured to flow a particle through a lumen 104 of the channel 102, the channel 102 defining an interrogation window 106 configured to allow light to pass into and out of the lumen 104; a light engine 108 comprising: a first light source 110 positioned to output first excitation light 112 onto a first portion 122 of the channel 102 in the interrogation window 106; and a second light source 114 positioned to output second excitation light 116 onto a second portion 124 of the channel 102 in the interrogation window 106 separate from the first portion 122; and a detector system 142 comprising: a first detector module 144 positioned to receive first emission light 146 emitted from the first portion 122 of the channel 102; and a second detector module 150 positioned to receive second emission light 152 emitted from the second portion 124. Such an embodiment of the system 100 of the present disclosure are suitable for use in self-corrected, single-particle and/or single-molecule flow analysis. As discussed further herein, measurement of fluorescence emitted from single-particle and/or single molecules in a flow stream, is heavily influenced by the profile of flow and laser beams. The accurate quantification of fluorescent particles and/or molecules thus requires the deconvolution of the signal from the flow profile and/or laser-beam profile.

To overcome these challenges, the present disclosure provides systems and methods to analyze single molecules and particles, such as vesicles, viruses, lipoproteins, and macromolecular complexes, in a flow stream. Such systems and methods are suitable to accurately 1) colocalize biomarkers expressed on the same particle and/or molecule that flows through multiple interrogation windows or portions of a single interrogation window 106, 2) identify and enumerate single particles and/or molecule, 3) obtain the flow rate sampled by each individual particle and/or molecule, and 4) thus, determine a concentration of analyzed particles and/or molecules.

Figure 8:
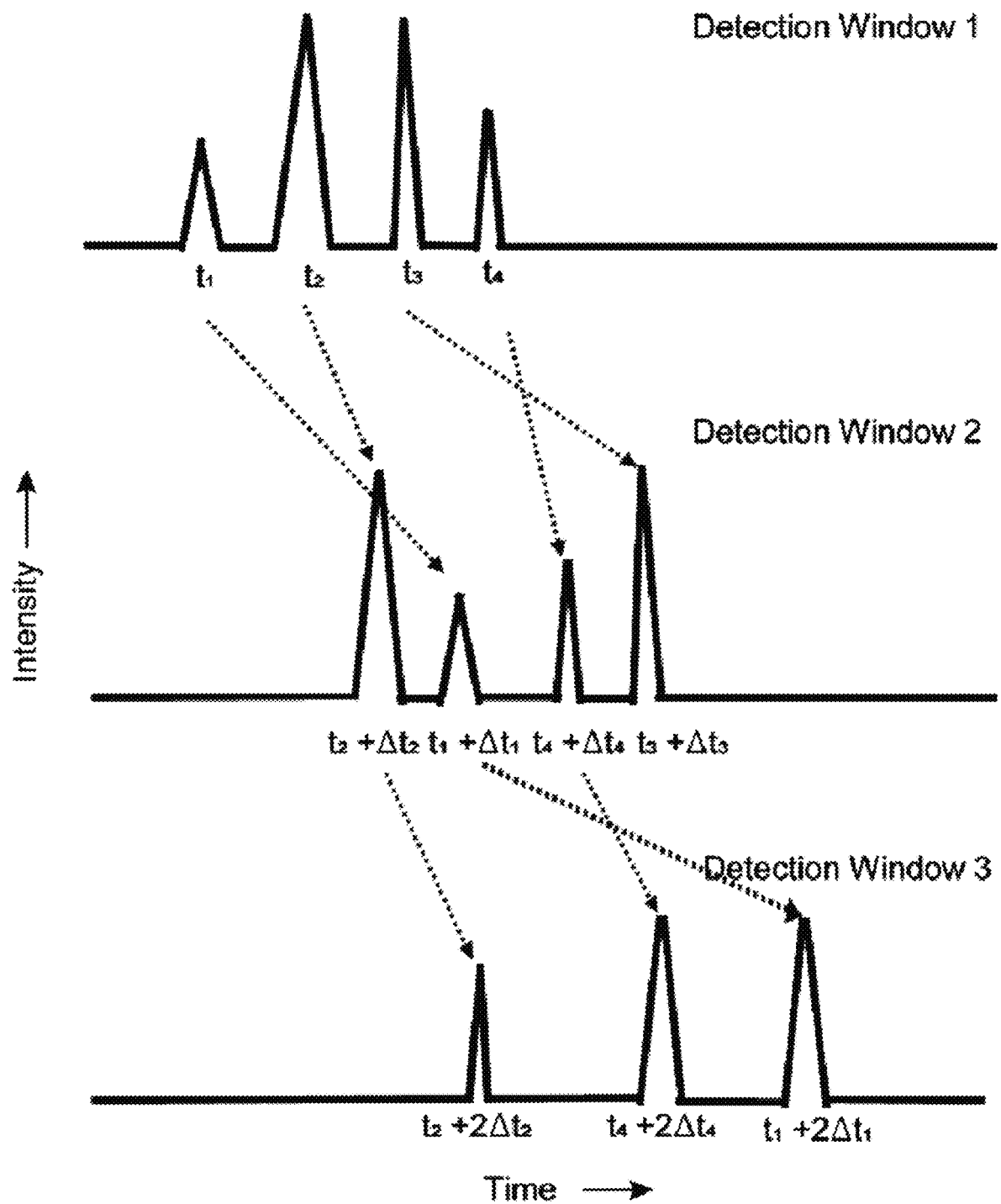
FIG. 8 graphically illustrates signals generated in three interrogation windows of a flow-based, single-molecule/particle system, in accordance with an embodiment of the present disclosure, over time.

Briefly, spatially separate portions of the interrogation window 106 are disposed with a known spatial pattern, and a property (e.g. fluorescence emission) of a particle and/or molecule is measured twice at two different portions of the interrogation window 106 (see for example FIG. 8). Under laminar flow, a transit time of a specific particle flowing through two adjacent portions or two different portions of the interrogation window 106 is proportional to a distance between these two portions. Also due to the nature of laminar flow, the position of a specific particle and/or molecule in the cross-section of channel 102 generally remains the same. This is particularly so where a distance between two such portions is small and the transit time is short such that diffusion of the particle within the channel is correspondingly small. Thus, this characteristic suggests that a particle and/or molecule interacts with different excitation light of different light sources at very similar positions in the cross section of the channel. Considering these properties, it is possible to identify single analytes (e.g. vesicles or virions or lipid nanoparticles or single molecules stained by fluorescent dyes) and use the extracted transit times or extracted locations or relative locations of the analytes in the cross section of the channel 102 to further colocalize fluorescent signals associated with other biological markers on the analyte, such as from different dye-tagged antibodies bound to their corresponding biological markers and/or from different nucleic-acid stains and/or other specific fluorescent stains of the analyte or biological nanoparticle (see FIG. 8).

Accordingly, in an embodiment, the system 100 for use in self-corrected, single-nanoparticle or single-molecule flow analysis includes logic for performing self-corrected, single-molecule/particle flow analysis methods of the present disclosure. In an embodiment, the system 100 includes a controller 156 operatively coupled to the light engine 108 and detector system 142 and including logic that, when executed by the controller 156, causes the system 100 to perform operations including measuring a characteristic of a particle/molecule at various portions of the interrogation window 106. In an embodiment, the system 100 includes a controller 156 operatively coupled to the first light source 110, the second light source 114, the first detector module 144, and the second detector module 150, including logic that, when executed by the controller 156, causes the system 100 to perform operations including: outputting the first excitation light 112 with the first light source 110; outputting the second excitation light 116 with the second light source 114; generating a first emission signal with the first detector module 144 based upon first emission light 146 received from the first portion 122; generating a second emission signal with the second detector module 150 based upon second emission light 152 received from the second portion 124; and determining a velocity of a particle in the channel 102 based on a time difference between generating the first emission signal and the second emission signal and a distance between the first portion 122 and the second portion 124. In an embodiment, the velocity of the particle is used to determine a volumetric flow rate through the lumen 104.

In traditional fluid dynamics, the average linear velocity ($\bar{u}$) is defined as, $\bar{u}=V/A$, where V is the volumetric flow rate, and A is the area of cross section. It is well known that, if the flow profile is parabolic, the average linear velocity is half of the velocity at the center line ($\nabla_{max}$), $\bar{u}=\bar{u}_{max}/2$ (eq. 1). Traditionally, volumetric flow rate is first measured, and average linear velocity is calculated accordingly.

In our system, because the volumetric flow is extremely slow (e.g. ~nl/min), in certain embodiments, it is impossible to directly measure the volumetric flow rate conveniently. Instead, in an embodiment, a flow profile in the channel is sampled by measuring a linear velocity of many individual particles (such as greater than 100, 500, 1,000, 5,000, 10,000 or more particles), to obtain a mean observed value ($\bar{u}_{obs}$). In an embodiment, because when we sample the flow profile, the observed linear velocities are influenced by the flow profile, Vobs is indeed different than the average velocity defined in traditional fluid dynamics $$\left(\text{i.e. } \overline{u} = \frac{u_{max}}{2}\right).$$

In laminar flow, the volume (ΔQ) that passes through the cross section in each lamina during unit time is ΔQ=u(r)·2πr·Δr. Thus, the number of particles with the same velocity (i.e.u(r)) that pass through the cross section during a particular unit time is, $$N(r) = C\frac{dQ}{dr} = Cu(r)2\pi r \quad \text{(eq. 1)}$$

where C is the concentration of particles. The average of observed linear velocities is, thus, $$\overline{u}_{obs} = \frac{\int_0^R N(r)u(r)dr}{N} = \frac{\int_0^R Cu^2(r)2\pi rdr}{N} \quad \text{(eq. 2)}$$

where r is the radial position at the cross section. In parabolic flow, $$u(r) = u_{max}\left(1 - \frac{r^2}{R^2}\right) \quad \text{(eq. 3)}$$

In this regard, eq. 2 can be reorganized to $$\overline{u}_{obs} = \frac{C\int_0^R \left(u_{max}\left(1 - \frac{r^2}{R^2}\right)\right)^2 2\pi rdr}{\frac{u_{max}}{2} \cdot \pi R^2} = \frac{2}{3}u_{max} \quad \text{(eq. 4)}$$

Figure 11B:
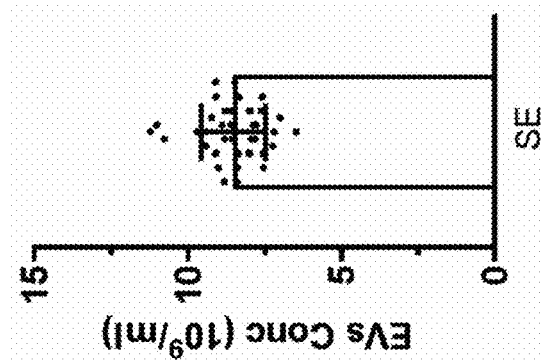
FIG. 11B shows results of measuring a concentration of extracellular vesicles in a fluid sample passing through a channel of a fluidic system, in accordance with an embodiment of the present disclosure, calculated using the comparison illustrated in FIG. 11A, in accordance with an embodiment of the present disclosure.
Figure 11A:
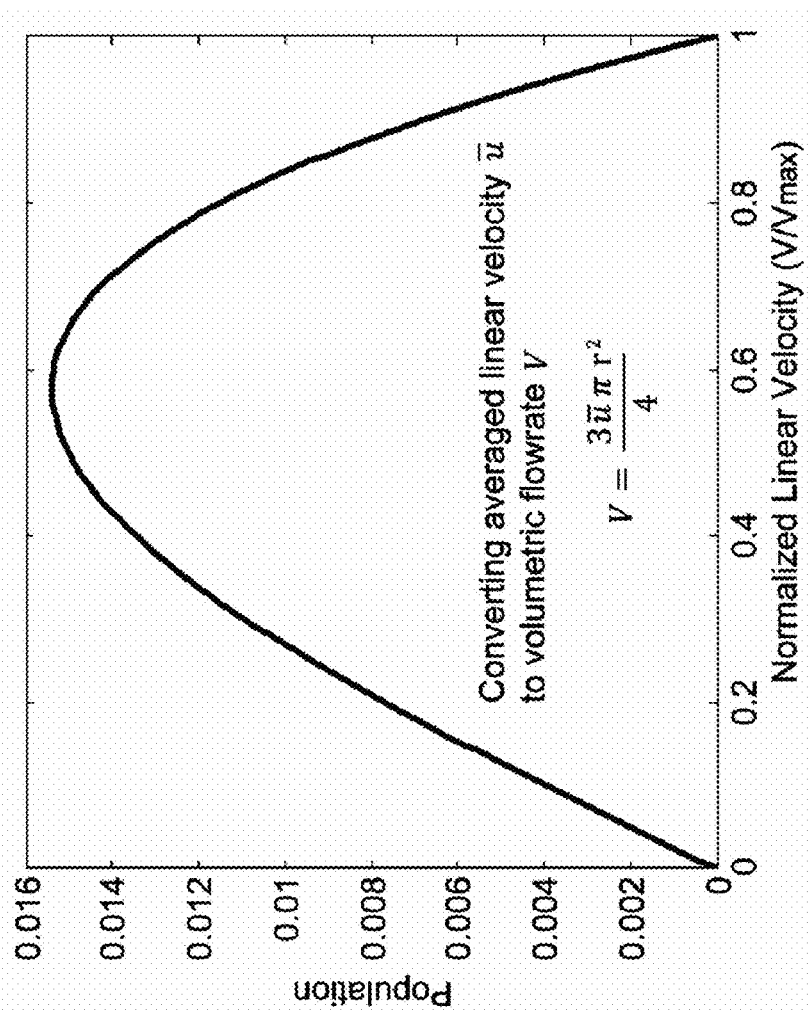
FIG. 11A shows a comparison between normalized linear velocity of particles in a channel of a fluidic system, in accordance with an embodiment of the present disclosure.

The relationship between $\overline{u}_{obs}$ and V is, $$V = \frac{3}{4}\overline{u}_{obs}\pi R^2,$$

as shown in FIG. 11A.

Accordingly, in an embodiment, the volumetric flow rate is determined by the following formula, $$V = \frac{3}{4}\overline{u}_{obs}\pi R^2,$$

wherein $\overline{u}_{obs}$ is the mean observed linear velocity of many individual particles through the channel, and R is a radius of the channel. The above analysis assumes a channel with a cylindrical geometry, but can be easily adjusted to one with a rectangular geometry or square geometry or any other geometries.

In an embodiment, the controller 156 further includes logic that, when executed by the controller 156, causes the system 100 to perform operation include correlating the first emission signal and the second emission signal based on an excitation or emission signal characteristic or relationship shared by the first emission signal and the second emission signal.

Air Objectives

In an embodiment, the system 100 further includes a light collection system 184 positioned to collect emission light, such as the first emission light 146 and the second emission light 152, from the channel 102 and direct the collected emission light onto the detector system 142, the light collection system 184 comprising an air objective 186 having a numerical aperture in a range of greater than 0.91 and less than 0.99. In an embodiment, the objective 186, such as an air objective 186, has a numerical aperture of about 0.95.

As used herein, an "air objective" refers to an optical objective or lens wherein a space between the objective and its focal plane or focus is occupied, at least in part, by a gas, such as air, and not occupied by an immersion liquid, such as an oil or water. In this regard, an air objective is in contrast to an oil-immersion lens or water-immersion lens in which the lens is immersed in an oil or water disposed between the lens and the sample, usually between the lens and the coverslip or sample holder.

As used herein, a "high NA (numerical aperture) air objective" refers to an air objective with a NA of between 0.91 and 0.99, preferably between 0.92 and 0.98, more preferably between 0.93 and 0.97, and even more preferably between 0.94 and 0.96. In an embodiment, the air objective has a NA of about 0.95. As discussed further herein, such high NA air objectives are suitable to perform single-molecule and/or single particle analyses, such as in determining the presence, absence, or concentration of particles/molecules passing through the devices and systems of the present disclosure. As noted elsewhere herein, high NA air objectives provide numerous advantages over conventional objectives, such as oil-immersion objectives or water-immersion objectives, such as high light collection efficiency, the ability to scanning accurately and efficiently, among many others.

Air objectives are generally easier to scan and more stable than, for example, oil-immersion objectives. Further, in certain embodiments, the objective 186 is not used for high image quality (e.g. high resolution), but rather for its high light-collection efficiency. In this regard, as well, air objectives are superior to oil-immersion objectives. Accordingly, an air objective 186 having a lower numerical aperture, such as in a range of greater than 0.91 and less than 0.99, is suitable for detection of single particles and/or single molecules in a flow channel 102.

Emission Multiplexing

In an embodiment, a detector module of the systems of the present disclosure includes two or more photodetectors each positioned to receive emission light from a distal end of an emission optical fiber. In this regard, attention is directed to FIG. 2 in which a schematic illustration of a detector module 242 of a system, in accordance with an embodiment of the disclosure, is shown. In an embodiment, the detector module 242 shown is an example of a detector module 144 or 150 of detector system 142 illustrated in FIG. 1A.

In the illustrated embodiment, the detector module 242 is shown to include a number of photodetectors 244, 250A, 250B, and 250C positioned to receive emission light 246A or portions thereof, shown here as fluorescence emission light 246A, from a distal end 248 of an emission optical fiber 234. As shown, the detector module 242 includes a number of dichroic mirrors 260 positioned to receive emission light 246A emitted from the distal end 248 of the emission optical fiber 234. Such dichroic mirrors 260 are configured to reflect a portion (e.g. one wavelength range) of the emission light 246A and to allow a different portion of the emission light (e.g. a different wavelength range) to pass through the dichroic mirrors 260. In the illustrated embodiment, each dichroic mirror 260 is positioned to reflect a portion of the emission light 246A toward a photodetector 244, 250A, 250B, 250C configured to generate a signal based upon this reflected or transmitted portion of the emission light 246A.

In this regard, the detector module 242 is shown to include a dichroic mirror 260 disposed between the distal end 248 of the first emission optical fiber 234 and the first photodetector 244 and positioned to reflect a portion 246B of the first emission light 246A onto a first photodetector 244. In an embodiment, a detector of a system according to the embodiments of the present disclosure further includes a second detector module optically coupled to a second emission optical fiber, as illustrated in FIG. 1A, such as a second detector module including a second photodetector. In the illustrated embodiment of FIG. 2, the detector module 242 is shown to include a third, fourth, and fifth photodetectors 250A, 250B, and 250C, respectively. In an embodiment, the first photodetector 244 is configured to generate a first emission signal based upon a first emission wavelength range of the first emission light 246B, such as including emission light 246B, and wherein the third, fourth, and fifth photodetectors 250A, 250B, and 250C are configured to generate third, fourth, and fifth emission signals based upon a third, fourth, and fifth emission wavelength range in emission light 246C. 246D, and 246E different or substantially different from the first emission wavelength range of emission light 246B.

While the detector module 242 is shown to include 4 photodetectors 244, 250A, 250B, and 250C, it will be understood that any number of photodetectors are possible. In an embodiment, the detector modules include 1, 2, 3, 4, 5, 6, 7, 8, 9, 10, 15, 20, 25 or more photodetectors.

Figure 2:
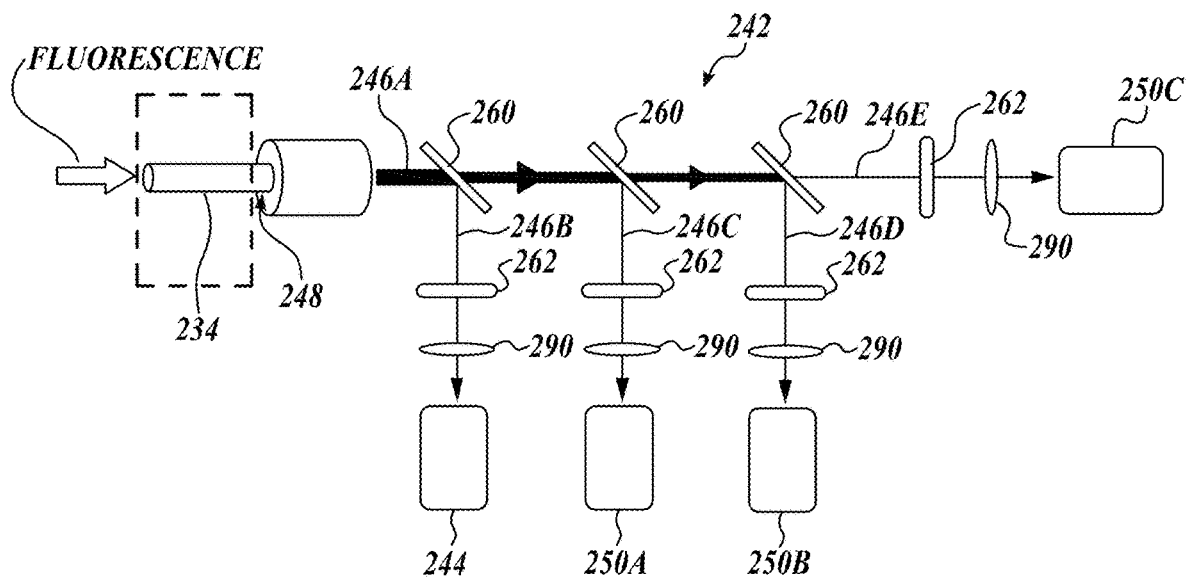
FIG. 2 is schematic illustration of a detector module of a flow-based, single-molecule/particle system, in accordance with an embodiment of the disclosure.

In the illustrated embodiment, the detector module 242 further includes filters 262, such as bandpass filters 262, configured to filter a portion of the reflected emission light 246B-246E. In this regard, the photodetectors 244 and 250A-250C are configured and positioned to generate signals based upon a filtered portion 246B-246E of the emission light 246A. As discussed further herein, in an embodiment, the light engine excites particles and/or molecules in the channel with light of different wavelengths. As also discussed further herein, in an embodiment, the particles and/or molecules themselves can be impregnated or associated with one or more detectable agents configured to emit fluorescence having different wavelength ranges and configured to be excited by different wavelength light. Accordingly, the detector module 242 configuration illustrated in FIG. 2 is suitable to generate signals based on emission light having wavelengths in one or more wavelength ranges with the arrayed photodetectors and corresponding filters. In this regard, the illustrated detector module 242 is suitable to perform emission multiplexing of particles and/or molecules, which emit light onto the portion of the detector module 242. As used herein, "emission multiplexing" refers to systems or methods suitable for analyzing particles, molecules, or other analytes by analyzing different wavelength ranges of light emitted from such particles, molecules, or other analytes.

In an embodiment, the distal end 248 of the first emission optical fiber 234 is configured to emit the first emission light 246A onto at least 2, at least 3, at least 4, at least 5, at least 6, at least 7, at least 8, at least 9, at least 10, or more photodetectors. In an embodiment, each of the photodetectors is configured to receive a substantially different spectral portion of the emission light, such as when received through one or more dichroic mirrors or optical filters.

The portion of the detector module 242 illustrated in FIG. 2 is shown to further include lens 290 shaped and positioned to focus reflected and/or transmitted emission light onto their respective photodetectors.

In an embodiment, the systems of the present disclosure include multiple detector modules, such as one or more detector modules 242 as illustrated in FIG. 2. In an embodiment, each of the distal ends of the emission optical fibers are configured to emit emission light into a detector module, such as is illustrated in FIG. 2.

Excitation Multiplexing

As discussed further herein, light engines of the systems of the present disclosure can include light sources configured to output light of various wavelength ranges, such as in wavelength ranges suitable to excite one or more detectable agents disposed in or on particles flowing through the channel. In some embodiments, such light wavelength ranges overlap. In some embodiments, the light wavelength ranges are separate. In this regard, attention is directed to FIGS. 3A-3F, in which embodiments of a light engine 308 and channel 302 illuminated by the light engine 308, in accordance with an embodiment of the present disclosure, are illustrated.

Figure 3A:
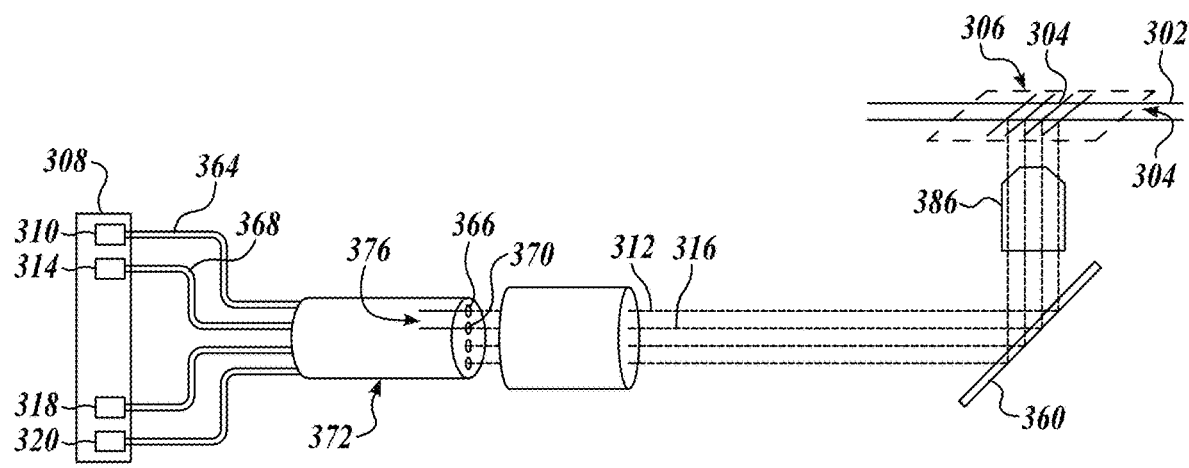
FIG. 3A is a schematic illustration of a light engine and channel of a flow-based, single-molecule/particle system, in accordance with an embodiment of the disclosure.

FIG. 3A is a schematic illustration of a light engine 308 and channel 302 of a system, in accordance with an embodiment of the disclosure. In an embodiment, the light engine 308 and channel 302 are examples of a light engine 108 and channel 102 of the system 100 of FIGS. 1A. In an embodiment, the light engine 308 and channel 302 are suitable for use in conjunction with the portion of the detector module 242 of FIG. 2.

In the illustrated embodiment, the light engine 308 is shown to include four light sources each coupled to distal ends of excitation optical fibers. While four light sources are illustrated, it will be understood that more or fewer light sources are possible and within the scope of the present disclosure. It will also be understood that free-space light sources may be used within the scope of the present disclosure, as discussed further herein. The excitation optical fibers are shown to terminate in an excitation fiber bundle positioned to output the excitation light. As shown, the excitation fiber bundle head 372 is positioned to output the excitation light onto dichroic mirror 360 and into the objective 386. The excitation light is shown emitted from the objective 386 and onto respective portions of the channel 302 within the interrogation window 306.

Figure 3B:
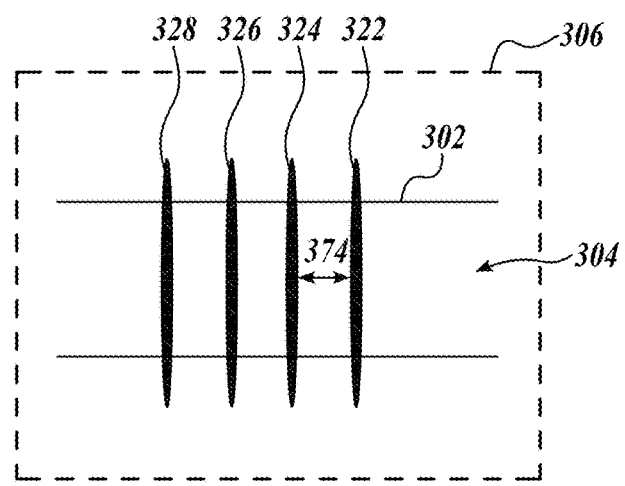
FIG. 3B is a schematic illustration of an interrogation window of the channel of FIG. 3A, in accordance with an embodiment of the present disclosure.
Figure 3C:
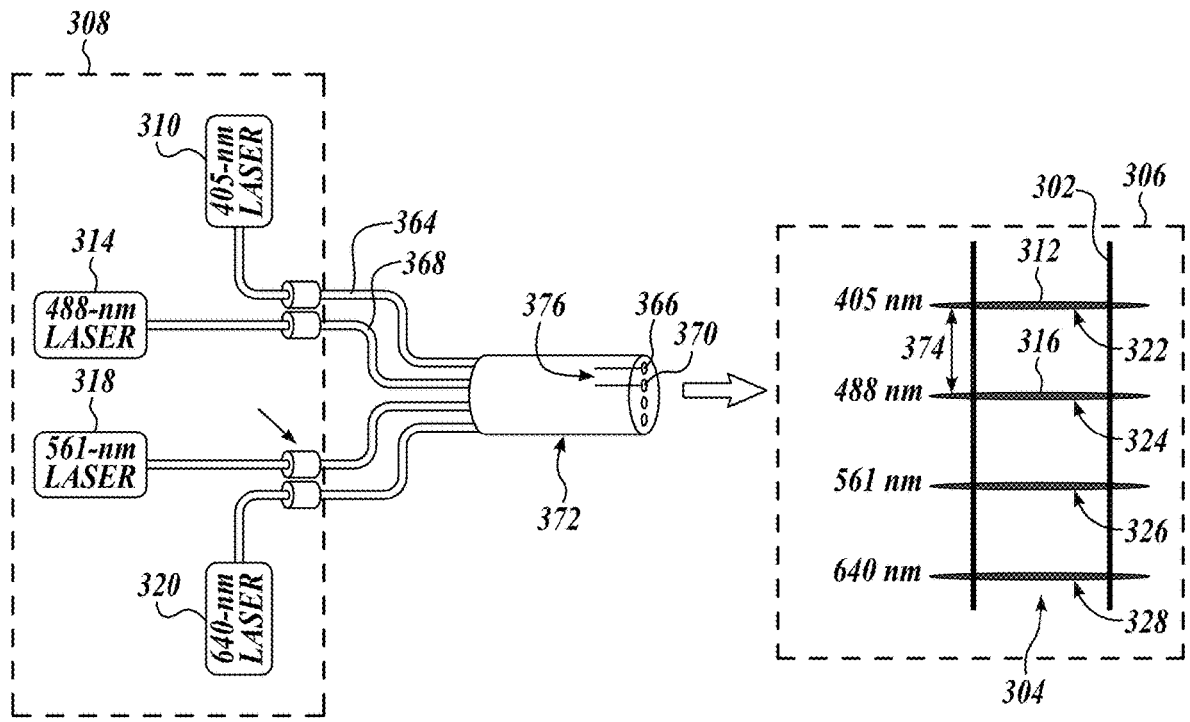
FIG. 3C is a schematic illustration of an example of the light engine and the channel of FIG. 3A, in accordance with an embodiment of the disclosure.
Figure 3D:
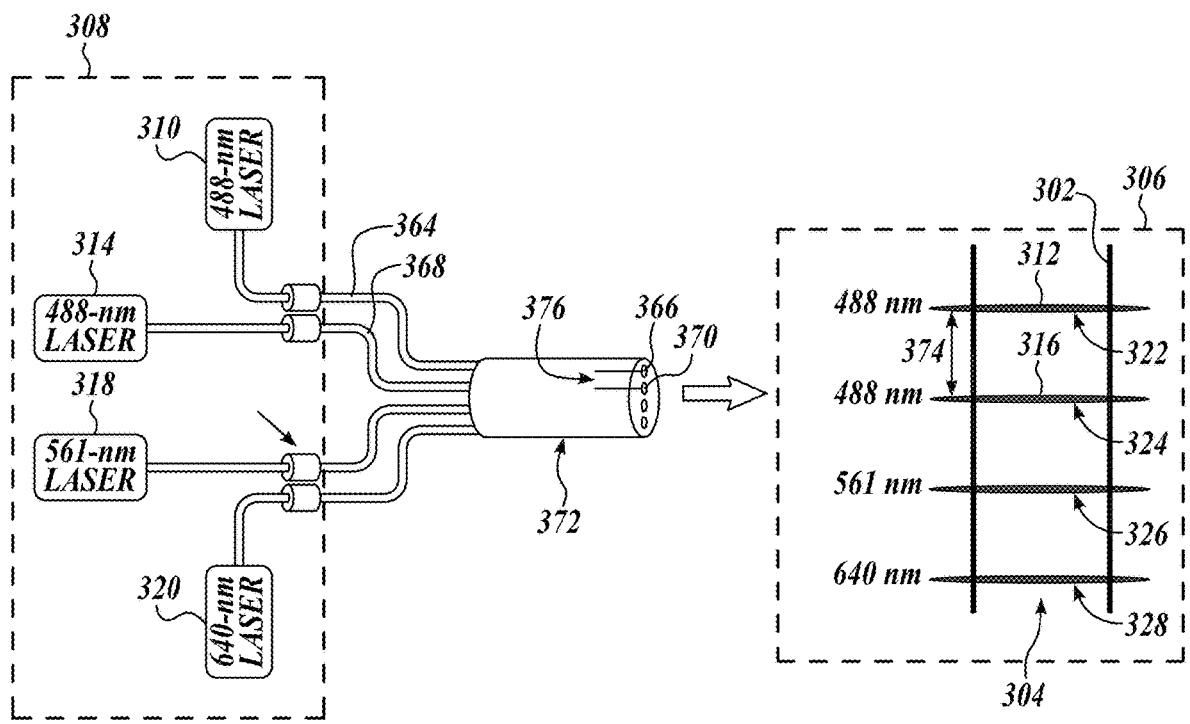
FIG. 3D is a schematic illustration of an example of the light engine and the channel of FIG. 3A, in accordance with an embodiment of the disclosure.
Figure 3E:
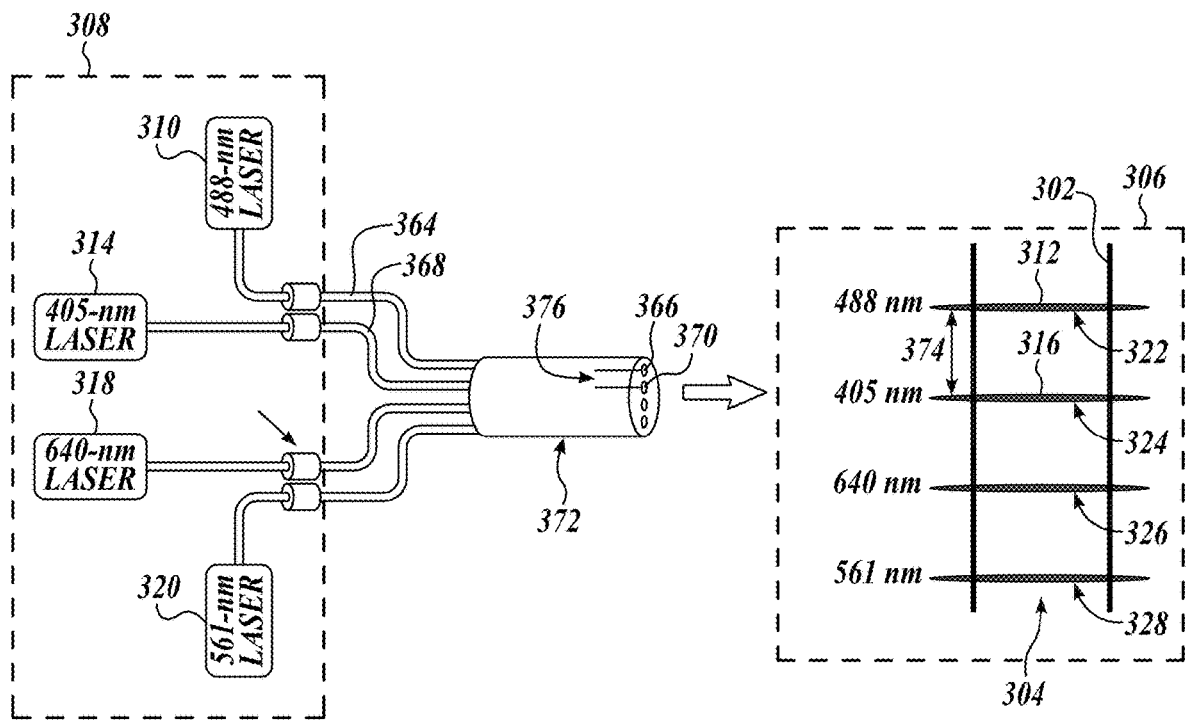
FIG. 3E is a schematic illustration of an example of the light engine and the channel of FIG. 3A, in accordance with an embodiment of the disclosure.
Figure 3F:
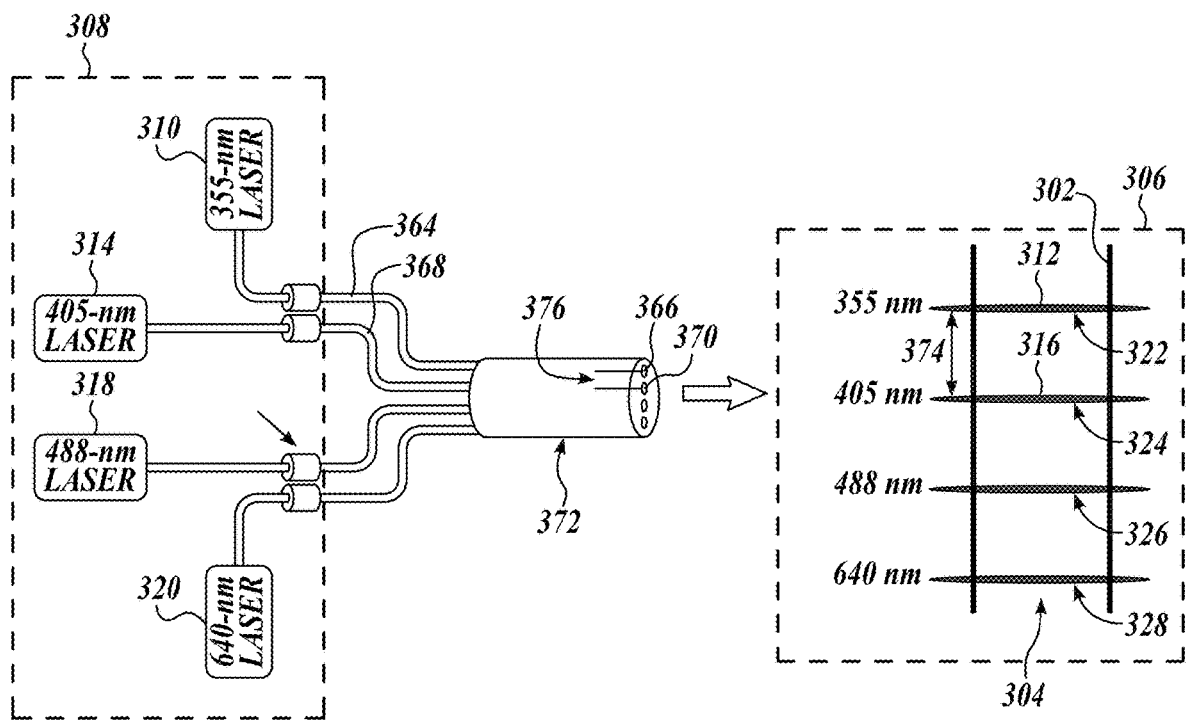
FIG. 3F is a schematic illustration of an example of the light engine and the channel of FIG. 3A, in accordance with an embodiment of the disclosure.

FIG. 3B is a schematic illustration of an interrogation window 306 of the channel 302 defining a lumen 304 through which particles and/or molecules are configured to flow. As shown, first excitation light 312 is directed to a first portion 322 of the channel 302, second excitation light 316 is directed to a second portion 324 of the channel 302 separate from the first portion 322, third excitation light is directed to a third portion 326 of the channel 302 separate from the first portion 322 and second portion 324 of the channel 302, and fourth excitation light is directed to a fourth portion 328 of the channel 302 separate from the first, second, and third portions 322, 324, and 326 of the channel 302. The first portion 322 and the second portion 324 of the channel 302 are shown separated by a spacing 374. In an embodiment, the spacing 374 of the first portion 322 and the second portion 324 corresponds to and is defined, at least in part, by a spacing 376 between the distal ends 366 and 370 of the first excitation optical fiber 364 and the second excitation optical fiber 368. In this regard, a spacing 376 between the distal ends 366 and 370 of the excitation optical fibers 364 and 368 determines a spacing 374 between portions 322 and 324 of the channel 302 illuminated by light sources of the light engine 308. This is further illustrated by FIG. 4, which is a fluorescence image of a channel 302 illuminated by a light engine 308, according to an embodiment of the present disclosure.

As above, portions 322, 324, 326, and 328 are separated by a spacing 374. In an embodiment, such a spacing is in a range of about 100 nm to about 100 microns, about 10 nm to about 10 microns, about 500 nm to about 10 microns, about 1 micron to about 20 microns, 3 microns to about 30 microns, or 2 microns to about 8 microns.

In an embodiment, spacing 374 is based upon distance between a center of one excitation light, such as excitation light 312, impinging upon the interrogation window 306, and a center of another excitation light, such as excitation light 316, impinging upon the interrogation window 306. In another embodiment, the spacing 374 is based upon a distance between edges of excitation light, such as an edge of excitation light 312 and an opposing edge of excitation light 316, impinging upon interrogation window 306.

As discussed further herein with respect to FIG. 1A, in an embodiment, portions 322, 324, 326, and 328 have a width defined by a width of excitation light, such as excitation light 312 and 316, impinging upon the interrogation window 306 after passing through or being focused by the high-NA air objective 386. In an embodiment, a ratio of the spacing 374 to a width of one or more of portions 322, 324, 326, and 328 is greater than 1:1, 2:1, 3:1, 4:1, 5:1, 6:1, 7:1, 8:1, 9:1, 10:1, 20:1 or greater. In an embodiment, a ratio of the spacing 374 to a width of one or more of portions 322, 324, 326, and 328 is in a range of about 1:1 to about 20:1, 2:1 to about 20:1, 2:1 to about 10:1, 2:1 to about 5:1. Such ratios are sufficiently large to generate excitation light from the various portions with, for example, minimal cross-talk between emission from the distinct portions 322, 324, 326, and 328, such as detected by detector modules of the systems of the present disclosure.

FIGS. 3C-3F are schematic illustrations of a light engine 308 and a channel 302, in accordance with the present disclosure. In an embodiment, the light engines 308 and channels 302 are examples of the light engine 308 and channel 302 of FIG. 3A. As shown, the light engine 308 includes a first light source 310, a second light source 314, a third light source 318, and a fourth light source 320. In the illustrated embodiments, the light sources 310, 314, 318, and 320 are optically coupled to excitation optical fibers 364, 368, etc., the distal ends of which are coupled together in an excitation fiber bundle 372. The distal ends 366 and 370 of the first excitation optical fiber 364 and the second excitation optical fiber 368 are arranged to provide a spacing 376.

In the illustrated embodiments, the light sources 310, 314, 318, and 320 include a number of lasers having noted wavelengths. As shown, in certain embodiments, two or more of the lasers 310, 314, 318, and 320 are configured to output light having a common wavelength. In certain other embodiments, the lasers 310, 314, 318, and 320 are configured to output light having different wavelengths.

In this regard, the light engines 308 can be configured to analyze or manipulate particles and/or molecules passing through the channel 302 with the same wavelengths of light, such as in tracking a particular particle as it moves through the channel 302. Likewise, in an embodiment, the light engine 308 can be configured to analyze or manipulate a particle with different wavelengths of light to help determine the presence or absence of particular detectable agents associated with different markers.

As discussed further herein, the variable arrangements and wavelength ranges of the light sources of the light engine 308 are suitable to perform excitation and emission multiplexing. As used herein, "excitation multiplexing" refers to methods of analyzing particles, molecules, or other analytes including exciting detectable agents associated with such particles, molecules, or other analytes with excitation light having different wavelength ranges. As discussed further herein, by exciting the detectable agents with excitation light having different wavelength ranges, different qualities or characteristics of the particle, molecule, or other analyte associated with the detectable agent can be determined.

Covers

In an embodiment, the system of the present disclosure includes a cover coupled to the emission fiber bundle. In this regard, attention is directed to FIGS. 5A-5C in which covers, according to embodiments of the present disclosure are illustrated.

Figure 5A:
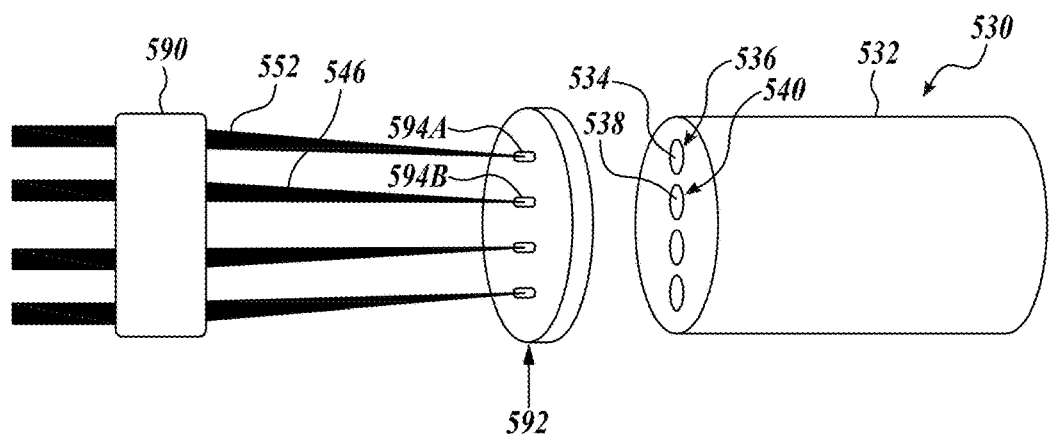
FIG. 5A schematically illustrates emission light passing through apertures of an optically opaque cover and onto an emission fiber bundle head of a detector system, in accordance with an embodiment of the present disclosure.
Figure 5B:
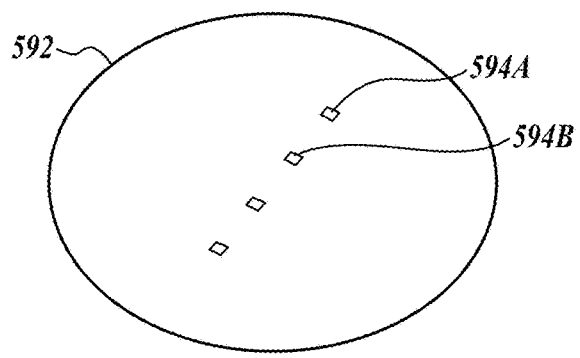
FIG. 5B illustrates an example of the optically opaque cover of FIG. 5A, in accordance with an embodiment of the present disclosure.

FIG. 5A schematically illustrates emission light passing through apertures 594A and 594B of an optically opaque cover 592 and onto an emission fiber bundle 530 of a system, in accordance with an embodiment of the present disclosure. FIG. 5B illustrates an example of the optically opaque cover 592 of FIG. 5A. In an embodiment, the emission fiber bundle 530 is an example of the emission fiber bundle 130 of FIG. 1A.

As shown, lens 590 directs first emission light 552 and second emission light 546 to emission fiber bundle head 532. In the illustrated embodiment, the cover 592 defines an aperture 594A shaped to allow passage of the first emission light 552 onto the proximal end 536 of the first emission optical fiber 534. In this regard, the first emission light 552 is allowed to pass through the aperture 594A and onto a proximal end 536 of the first emission optical fiber 534. In an embodiment, the cover 592 is optically opaque. In this regard, light, such as light that is not the first emission light 552, is less likely to enter the first emission optical fiber 534.

In the illustrated, partially exploded embodiment, the cover 592 is shown separated from the emission fiber bundle head 532. In an embodiment and in use, the optically opaque cover 592 is coupled to the emission fiber bundle head 532 to prevent or mitigate stray light from entering emission optical fibers. In this regard, the optically opaque cover 592 is suitable to increase a signal-to-noise ratio of a detector system and/or minimize or eliminate crosstalk (e.g. a portion of the first emission light 552 entering the proximal end 540 of the second emission optical fiber 538 and vice versa) between the different emission lights.

As shown, the optically opaque cover defines a second aperture 594B shaped to allow passage of the second emission light 546 onto the proximal end 540 of the second emission optical fiber 538. In this regard, second emission light 546 is allowed to pass through the cover 592 and into the second emission optical fiber 538.

While four apertures, including apertures 594A and 594B, in a linear arrangement are illustrated, it will be understood that any number of apertures of the cover 592 can be arranged in various configurations to correspond to emission optical fibers of the emission fiber bundle 530, such as those discussed further herein with respect to FIGS. 1A and 1B.

Figure 5C:
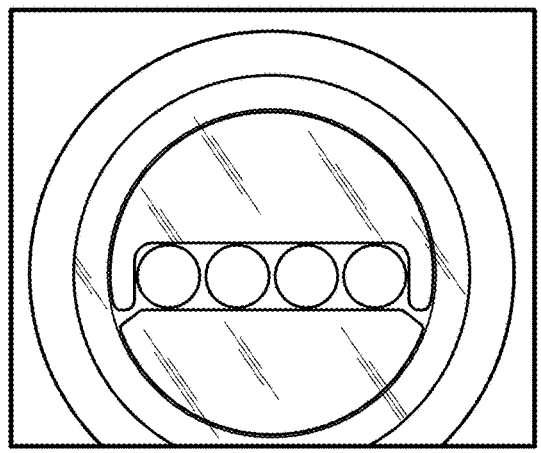
FIG. 5C is an image of an emission fiber bundle head of a flow-based, single-molecule/particle system, in accordance with an embodiment of the present disclosure.

FIG. 5C is an image of the proximal end of the fiber bundle head 532 of a system, in accordance with an embodiment of the present disclosure. As shown, the optical fibers are arranged in a linear configuration, such that when the cover 592 of FIGS. 5A and 5B is coupled thereto, the apertures 594A and 594B are in registry with the optical fibers of the fiber bundle head.

FIG. 6 is a schematic illustration of a system 600, in accordance with an embodiment of the disclosure, which will now be described. As shown, the system 600 includes a channel 602 configured to flow a particle or molecule through a lumen 604 of the channel 602, the channel 602 defining an interrogation window 606 configured to allow light to pass into and out of the lumen 604; a light engine 608; an emission fiber bundle 630 shaped and positioned to receive emission light emitted from the interrogation window 606; and a detector system configured to generate signals based on the collected emission lights.

In the illustrated embodiment, the light engine 608 includes four light sources positioned to output light onto the channel 602. In this regard, in an embodiment, the light engine 608 includes a first light source positioned to output first excitation light 612 onto a first portion of the channel 602 in the interrogation window 606; and a second light source positioned or configured to output second excitation light 616 onto a second portion of the channel 602 in the interrogation window 606 separate from the first portion. In an embodiment, the light sources are free-space light sources, which are not coupled to excitation optical fibers. In this regard in an embodiment, a spacing of excitation light is defined, at least in part, by a spacing of the free-space light sources. In another embodiment, an excitation spacing from free-space light sources is defined, at least in part, by the way in which excitation light output therefrom is combined, such as with dichroics and/or lenses and other optical components. In an embodiment, the light engine 608 includes fiber-coupled light sources as discussed further herein with respect to FIG. 1A.

As shown, the excitation light is directed through lenses 690 and impinges upon a dichroic mirror 660, which reflects the excitation light to an objective 686. The objective 686 collects the excitation light and directs it into the interrogation window 606 of the channel 602.

Emission light emitted from the channel 602 passes back through the objective 686 and the dichroic mirror 660 to an emission fiber bundle 630. As discussed further herein, while a dichroic mirror is illustrated, other partially reflective/transmissive structures are possible within the scope of the present disclosure.

In the illustrated embodiment, the system 600 is shown to further include a mirror positioned to reflect the light onto the emission fiber bundle 630 and a cover 692 configured to occlude light other than the emission light from entering the emission fiber bundle 630.

The system 600 is shown to include a number of photodetectors optically coupled to the emission optical fibers. In this regard, the system 600 is shown to include an emission fiber bundle 630 comprising a first emission optical fiber 634 and a second emission optical fiber 638, wherein a portion of proximal end 636 of first emission optical fiber 634 and second emission optical fiber 638 are arranged in an emission fiber bundle head 632, and wherein the proximal end 636 of the first emission optical fiber 634 is positioned to receive first emission light 646 emitted from the first portion and the proximal end 640 of the second emission optical fiber 638 is positioned to receive second emission light 652 emitted from the second portion. Proximal ends of emission optical fibers can refer to portions of such fibers disposed in emission fiber bundle, such as emission fiber bundle 630, and portions adjacent to the emission fiber bundle.

The system 600 is shown to include a first photodetectors 644, 658A, and 658B positioned to receive the first emission light 646 emitted from a distal end of the first emission optical fiber 634; and second photodetectors 650A and 650C positioned to receive the second emission light 652 emitted from a distal end of the second emission optical fibers 638.

As discussed further herein with respect to FIG. 2 and shown here, the system 600 further includes a dichroic mirror 660 disposed between the distal end of the first emission optical fiber 634 and the first photodetector 644 and positioned to reflect a portion of the first emission light 646 onto third photodetectors 658A and 658B. In the illustrated embodiment, each emission optical fiber is optically coupled to dichroic mirrors 660 as well as band pass filters 662, which are in turn optically coupled to second photodetectors 650A, 650B, and 650C and third photodetectors 658B, 658C, 658D, 658E, and 658F. In an embodiment, the first photodetector 644 is configured to generate a first signal based on a first wavelength range of the first emission light 646, the third photodetectors 658A and 658B are configured to generate a set of signals based on a different set of wavelength ranges of the first emission light 646. In an embodiment, the second photodetectors 650A-650C are configured and positioned to generate a set of signals based on emission light other than first emission light 646, such as based upon second emission light 652 . . . . In this regard, emission light received by each emission optical fiber is configured to be spectrally analyzed by a number of photodetectors.

As shown, each emission optical fiber is optically coupled to a number of photodetectors. For example, first emission optical fiber 634 is optically coupled to photodetectors 644, 658A, and 658B. In an embodiment, photodetectors 644, 658A, and 658B comprise a detector module, such as a detector module as discussed further herein with respect to FIG. 2. Likewise, in an embodiment, photodetectors 650A and 658C are group in a second detector module. In an embodiment, such detector modules comprise a box or other enclosure encapsulating the various photodetectors of the detector module.

The system 600 is shown to further include a controller 656 operatively coupled to the light engine 608 and the photodetectors. As discussed further herein with respect to FIGS. 1A, in an embodiment, the controller 656 is configured to choreograph the operation of the light engine 608 and photodetectors system, such as to perform one or more methods of the present disclosure.

The controller 656 is also shown operatively coupled to a moveable stage 688 physically coupled to the channel 602. The channel 602 is shown to be part of a microfluidic chip defining a number of channels. In an embodiment, the controller 656 includes logic that, when executed by the controller 656, causes the system 600 to move the microfluidic chip with the moveable stage 688. Accordingly, a focus of the objective 686 is changed from a first channel 602 to a second channel of the microfluidic chip. In this regard, the system 600 can be used to analyze particles and/or molecules flowing through a number of channels, such as a number of channels flowing different suspensions of particles and/or solutions of molecules.

Auto-Focussing

Figure 7A:
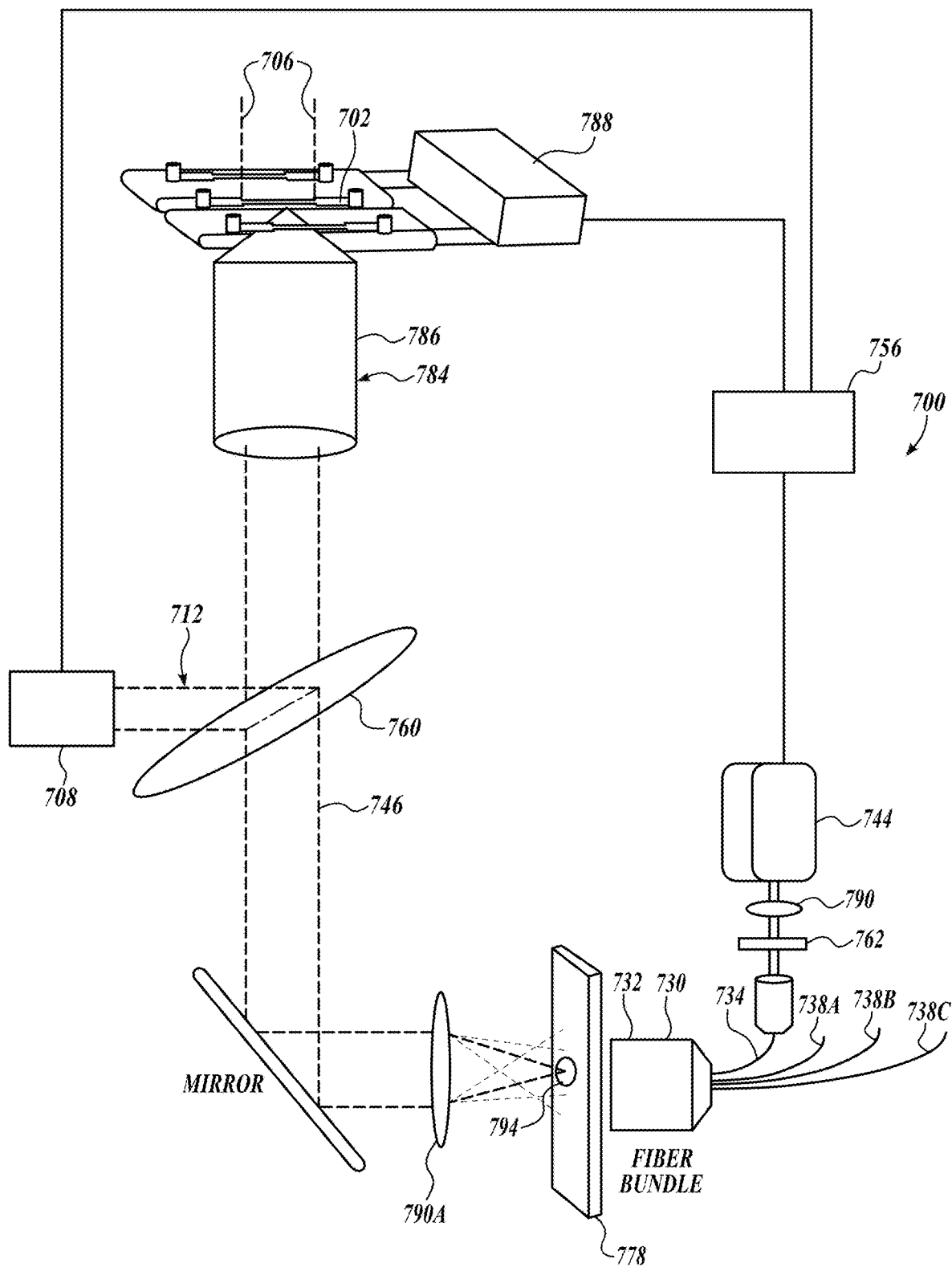
FIG. 7A is a schematic illustration of a flow-based, single-molecule/particle system in accordance with an embodiment of the disclosure.
Figure 7B:
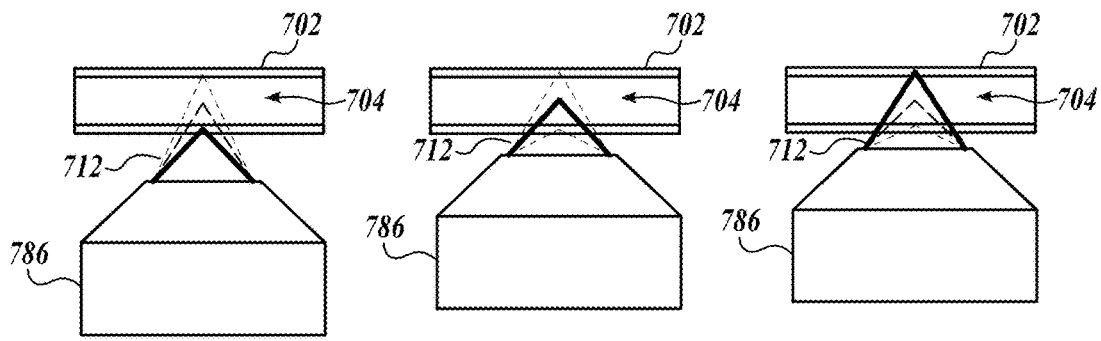
FIG. 7B is a schematic illustration of focusing a high-NA air objective relative to the sample of the system of FIG. 7A on a channel of the system, in accordance with an embodiment of the present disclosure.

In an embodiment, the systems of the present disclosure are suitable to analyze particles or molecules flowing therethrough, such as with an automatic focusing process. In this regard, attention is directed to FIGS. 7A and 7B in which a system 700, in accordance with an embodiment of the disclosure, is illustrated. FIG. 7A is a schematic illustration of the system 700. FIG. 7B is a schematic illustration of focusing a high-NA air objective 786 of the system 700 on a channel 702 of the system 700. In an embodiment, the system 700 is an example of the system 100 of FIG. 1A or an example of the system 600 of FIG. 6.

As shown, the system 700 includes a channel 702 configured to flow a particle and/or molecule through a lumen of the channel 702, the channel 702 defining an interrogation window 706 configured to allow light to pass into and out of the channel 702; a moveable stage 788 coupled to the channel 702 and configured to move the channel 702 relative to a light collection system 784; a light engine 708; a detector system; a controller 756 operatively coupled to the light engine 708, the moveable stage 788, and the detector system. As shown, the channel 702 defines a constriction within the interrogation window 706. As discussed further herein, such a constriction is suitable to provide particle-by-particle flow of particles and/or molecule-by-molecule flow of molecules through the channel 702.

In the illustrated embodiment, the light engine 708 is shown outputting excitation light 712 onto a dichroic mirror 760 which is reflected into the light collection system 784 and into the interrogation window 706 of the channel 702. Emission light 746 is shown emitted from the interrogation window 706, through the dichroic mirror 760, lens 790A, and an aperture 794 of optically opaque cover 778 to be received by emission fiber bundle 730 including emission fiber bundle head 732. A distal end of one of the emission optical fibers 734 of the emission fiber bundle 730 is shown to terminate adjacent to photodetector 744 of the detector system. Emission light passes through lens 790 and bandpass filter 762 before impinging upon photodetector. The photodetector 744 is configured to generate a signal based upon the received emission light 746.

In an embodiment, the controller 756 includes logic that, when executed by the controller 756, causes the system 700 to perform operations. In an embodiment, such operations include one or more of the methods of focusing optical components on a fluidic channel 702, in accordance with an embodiment of the disclosure. In an embodiment, the operations include illuminating an interrogation window 706 of a fluidic channel 702 with light from a light source; focusing the light onto the interrogation window 706 with optical components disposed between the channel 702 and the photodetector 744; generating a lock signal with the photodetector 744 based on the focused light back reflected from the interrogation window 706 at a first time; generating a test signal with the photodetector 744 based on the focused light back reflected from the interrogation window 706 at a second time after the first time; determining whether the test signal is within a predetermined percentage of the lock signal; and moving the fluidic channel 702 relative to the high-NA air objective 786 if the test signal is outside of the predetermined percentage of the lock signal. As shown in FIG. 7B, the high-NA air objective 786 can be moved relative to the channel 702 to focus the excitation light 712 within the lumen 704 of the channel 702. In an embodiment, such movement of the air objective 786 is controlled with the moveable stage 788, such as in response to instructions received from the controller 756, as discussed further herein with respect to FIG. 6.

Figure 7C:
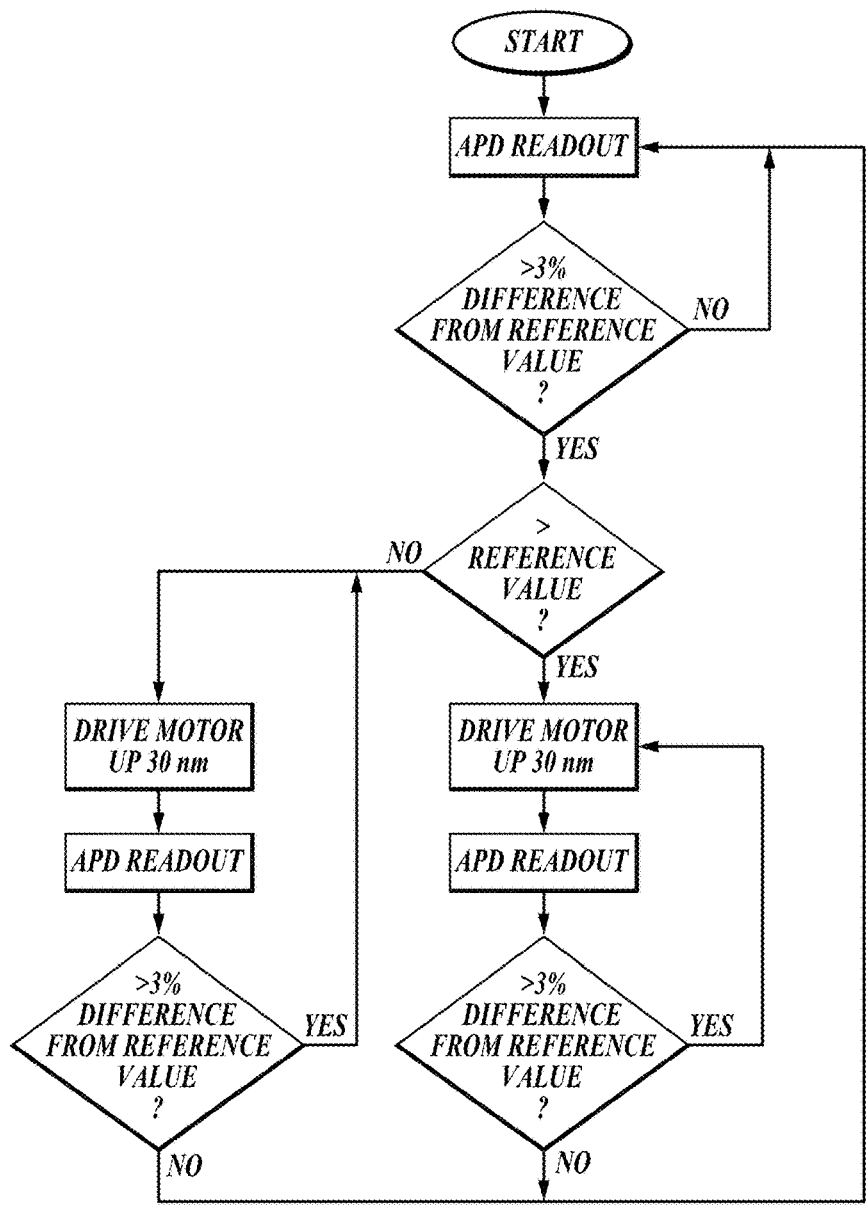
FIG. 7C is a block diagram illustrating a method of focusing a high-NA air objective of a flow-based, single-molecule/particle system, in accordance with an embodiment of the present disclosure.

FIG. 7C is a block diagram illustrating a method of focusing a high-NA air objective 786 of a system 700, in accordance with an embodiment of the present disclosure. As shown, the block diagram illustrates a feed-back loop that controls the motion of objective lens 786 by comparing the current value of reflection, with the value at previous time point (e.g. 200 ms ago), as well as the reference value. Where a difference between a measured value and a reference or lock value is above a predetermined threshold, a motor is driven to move the fluidic channel 702 relative to the high-NA air objective 786.

In an embodiment, the objective is positioned to collect the focused light back reflected from the interrogation window with a light collection system 784. In an embodiment, the light collection system 784 comprises an air objective having a numerical aperture in a range of about 0.91 to less than 0.99, or about 0.95.

In an embodiment, the light is in a non-visible wavelength range. In an embodiment, the light is infrared light, such as in a range of about 700 nm to about 2000 nm.

In an embodiment, the controller 756 includes logic that, when executed by the controller 756, causes the system 700 to perform operations including imaging the channel 702 with a camera and determining an amount of defocus in the image, such as by determining an amount of defocus in the image based on a structure in the channel 702, such as a wall of the channel 702, having a known shape and/or dimension. In an embodiment, the structure can be a separate structure adjacent to the channel 702 and which is designed for performing this image-based auto-focusing and/or stage movement for positioning the channel within the interrogation window. In an embodiment, the operations further include moving the fluidic channel 702 relative to the light collection system 784 if the amount of defocus is outside a predetermined range.

In an embodiment, the operations include illuminating an imaging area of the system 700 with light from a light source; generating an image of the imaging area with a camera or other image sensor; determining an amount of defocus of the image; determining whether the amount of defocus is within a predetermined amount of defocus; and moving the fluidic channel 702 relative to the high-NA air objective 786 if the test signal is outside of the predetermined range. In an embodiment, the channel is moved relative to the high-NA air objective with the moveable stage 788. In an embodiment, the operations are iterative in that, for example, the camera periodically generates images to confirm focus and/or move the channel 702 relative the high-NA air objective to adjust focus. In an embodiment, the light source is in a non-visible wavelength range. In an embodiment, the light is near-infrared light, such as in a range of about 700 nm to about 2000 nm. In an embodiment, the objective is an air objective. In an embodiment, the objective is an air objective with a NA between 0.91 and 0.99. In an embodiment, the objective is an air objective with a NA between 0.92 and 0.98. In an embodiment, the objective is an air objective with a NA between 0.93 and 0.97. In an embodiment, the objective is an air objective with a NA between 0.94 and 0.96. In an embodiment, the objective is an air objective with a NA of around 0.95.

Methods

In another aspect, the present disclosure provides methods of interrogating a particle and/or molecule. In an embodiment, the methods include use of the systems described herein.

Use of a High-Na (Numerical Aperture) Air Objective for Single-Molecule Detection In an embodiment, the method is a method for single-molecule detection. In an embodiment, the method includes the use of, such as light collection with, a light collection assembly including a high-NA air objective.

In an embodiment, the method includes flowing a plurality of molecules associated with a detectable agent through a channel. In an embodiment, such flow includes flowing the plurality of molecules associated with the detectable agent through the channel comprises flowing molecules of the plurality of molecules through the channel on a molecule-by-molecule basis. In this regard, as discussed elsewhere herein, in an embodiment, molecules of the plurality of molecules pass through the channel, such as a portion of the channel including a constriction, one at a time. In this regard, the method is suitable to individually illuminate the molecules flowing through the channel.

As above, the molecules are associated with a detectable agent. In an embodiment, individual molecules are associated with one or more detectable agents. In an embodiment, a molecule of the plurality of molecules is associated with 1, 2, 3, 4, 5, 6, 7, 8, 9, 10, or more detectable agents. As discussed elsewhere herein, such detectable agents are configured to generate a signal, such as a fluorescent signal, in response to excitation light.

In an embodiment, the molecules are selected from the group consisting of cell-signaling molecules, cytokines, chemokines, antibodies, proteins, nucleic acids, nucleic-acid binding proteins, RNA-binding proteins, peptides, carbohydrates, drug molecules, and therapeutic molecules.

In an embodiment, the method further comprises illuminating in the channel a molecule of the plurality of molecules. In an embodiment, illuminating the molecules includes illuminating on molecule of the plurality of molecules, as the molecules flow through the channel on a molecule-by-molecule basis. In an embodiment, illuminating the plurality of molecules includes illuminating the molecules with multiple light sources whose light is in one or more wavelength ranges. In an embodiment, such one or more light sources are positioned to illuminate spatially distinct portions of the channel, such as different portions of an interrogation window, as discussed elsewhere herein.

In an embodiment, the method comprises collecting the emission light from more than 99%, 95%, 90%, 85%, 80%, 75%, 70%, 65%, 60%, 55%, 50% of the single molecules flowing through the channel. By flowing the plurality of molecules through the channel on a molecule-by-molecule basis, molecules can be individually detected and assessed. In this regard, and as discussed further herein with respect to FIGS. 12A-12C, particles, such as molecules, may be efficiently and accurately detected by the methods and systems of the present disclosure. Such efficient and accurate detection is suitable to accurately determine concentration of particles and molecules in a large population of particles/molecules. This is particularly important where, for example, assigning a value to a molecule or particle is based upon detection of signals from a number of detectable agents. If each different detectable agent associated with a molecule or particle is not detected, then accurately identifying that molecule or particle is not possible.

In an embodiment, "single-molecule sensitivity" refers to the ability to detect more than 99%, 95%, 90%, 85%, 80%, 75%, 70%, 65%, 60%, 55%, 50% of the single molecules flowing through the channel, preferably more than 90% of the single molecules flowing through the channel. In an embodiment, "single-molecule sensitivity" refers to a detection efficiency of more than 99%, 95%, 90%, 85%, 80%, 75%, 70%, 65%, 60%, 55%, 50%, preferably, more than 90%.

In an embodiment, "detection efficiency" of single molecules and/or particles under flow is the number of molecules/particles detected versus the number of molecules/particles that flow through the channel (e.g. through the excitation regions). In an embodiment, "single-molecule detection efficiency" refers to a detection efficiency of more than 99%, 95%, 90%, 85%, 80%, 75%, 70%, 65%, 60%, 55%, 50%, preferably, more than 90%. In an embodiment, "single-molecule detection efficiency" refers to the ability to detect more than 99%, 95%, 90%, 85%, 80%, 75%, 70%, 65%, 60%, 55%, 50% of the single molecules flowing through the channel, preferably more than 90% of the single molecules flowing through the channel. For a given type of fluorescent molecule/particle, having "single-molecule sensitivity" or "single-molecule detection efficiency" is a direct indicator of the sensitivity of flow system or apparatus, and thus an important metric to evaluate the sensitivity and performance of the apparatus or instrument.

In an embodiment, illuminating in the channel the molecule of the plurality of molecules comprises outputting excitation light through an interrogation window onto a portion of the channel using line illumination. In an embodiment, illuminating in the channel the molecule of the plurality of molecules comprises outputting excitation light through an interrogation window onto a portion of the channel using confocal detection geometry or line confocal detection geometry.

In an embodiment, illuminating the channel is achieved with a tightly focused laser line that covers the entire cross section of the channel to ensure every molecule that passes through the channel is illuminated and excited with very high probability, such as over 90% probability, and preferably close to 100% probability. In an embodiment, confocal detection geometry is achieved by using an aperture (e.g. fiber opening or slit aperture), which improves detection sensitivity by increasing the signal-to-noise ratio and by minimizing cross talk between different excitation regions or laser lines. In an embodiment, an apparatus that employs a high-NA air objective, line illumination using tightly focused laser lines, and confocal detection geometry was used to ensure every or close to every molecule or particle that flow through the channel is detected with high detection efficiency and high single-molecule sensitivity and high throughput.

In an embodiment, the method includes collecting emission light emitted from the channel with a light collection system comprising a high-NA air objective having a numerical aperture in a range of 0.91 to less than 0.99, preferably around 0.95. As discussed elsewhere herein, a high-NA air objective is especially suitable to collective relatively large amounts of light. Additionally, such an air objective is suitable to accurately scan a device while maintaining a consistent distance between the air objective and imaged device. Frequently, an oil-immersion or water-immersion objective will drag oil or water over the imaged device and, thus, is not able to maintain a consistent distance between the objective and imaged device while scanning.

In an embodiment, the air objective has a numerical aperture between 0.91 and less than 0.99. In an embodiment, the air objective has a numerical aperture in a range of about 0.92 and about 0.98, in a range of about 0.93 and about 0.97, in a range of about 0.94 and about 0.96. In an embodiment the air objective has a numerical aperture of about 0.95.

In an embodiment, the method includes generating an emission signal based on the collected emission light emitted from the channel based on the molecule. In an embodiment, the signal is generated using one or more detector systems, detector modules, and/or photodetectors, as described elsewhere herein.

In an embodiment, the method includes assigning a value to the particle and/or molecule based on the signal. In an embodiment, the value is based upon one or more fluorescent signal emitted from the particle/molecule. Such a value can be used, for example, for sorting particles/molecules of the plurality of particles/molecules, such as in sorting based upon the presence and/or absence of one or more detectable moieties disposed on the particle/molecule.

As described herein above, in an embodiment, the methods, systems, devices, and apparatuses of this disclosure include a microfluidic chip comprising a microfluidic channel which can facilitate the manipulation, detection, analyses, determination, and/or identification of the biological nanoparticles and/or single molecules. Microfluidic chips comprising a microfluidic channel can be used to process small volumes of fluidic samples, and offer advantages over traditional macro-scale devices (e.g., microfluidic chips require only minute volumes of fluidic samples, require less reagent, and are processed in a smaller amount of time, adding to efficiency in comparison to macro-scale devices). In certain embodiments, the microfluidic chips are planar devices and, thus, can facilitate the detection and analyses of bionanoparticles and single molecules and/or by enabling the use of high-NA (numerical aperture) objectives (e.g. high-NA air objectives), lenses, or light collection systems with high numerical apertures, which enhances light collection and thus facilitates the detection, analyses, determination, and/or identification of the biological nanoparticles and/or molecules in transit. In certain embodiments, the microfluidic chips are planar devices, enhancing their compatibility with a microscope setup (e.g. with a translation stage on which the microfluidic chip is placed). Microfluidic chips additionally can allow for the design and generation of interconnected fluidic networks without having dead volumes, which in turn can facilitate the detection and manipulation of bionanoparticles and/or molecules (e.g., sorting using flow displacement at a junction of three or more fluidic channels). Dead volume is a portion of volume within the microfluidic chip that is outside of the flow path (e.g., a volume into which liquid, potentially carrying sample nanoparticles and/or molecules, can diffuse into, thus potentially decreasing accuracy). Microfluidic chips, through methods of microfabrication, can allow for the creation of channels with cross sections that are non-spherical or non-square (e.g., rectangular), which can facilitate the detection, analyses, determination, and/or identification of the biological nanoparticles and/or molecules in transit. Microfluidic chips can facilitate the creation of channels with different widths or heights along the length of the channel (e.g., a constriction or a step change in width and/or height of the channel) to facilitate the manipulation, detection, analyses, determination, and/or identification of the biological nanoparticles and/or molecules in transit. Microfluidic chips can be formed by bonding to a coverslip (e.g. made of glass or plastic) of a desirable thickness as well as having a desirable material property (e.g. refractive index) to enhance compatibility with high-efficiency light collection system (e.g., a high numerical aperture objective, such as high-NA air objective, requiring the appropriate substrate thickness for maximal light collection) to facilitate the manipulation, detection, analyses, determination, and/or identification of the biological nanoparticles and/or single molecules in transit. Microfluidic devices make possible the generation of many channels on the same device (e.g. 96 or 384 channels for 96 or 384 samples) for high-throughput analysis of a larger number of samples (e.g. 96 or 384 in a format compatible with multi-channel pipettors). Microfluidic chips provide an attractive and versatile platform for the manipulation, isolation, sorting, and/or transport of bionanoparticles and/or single molecules.

Fiber-Bundled Emission Detection

In an embodiment, the method comprises flowing a particle and/or molecule through a channel; outputting first excitation light through an interrogation window onto a first portion of the channel; outputting second excitation light through the interrogation window onto a second portion of the channel distinct from the first portion; generating a first emission signal with a first photodetector based on first emission light received through a proximal end of a first emission optical fiber; and generating a second emission signal with a second photodetector based on second emission light received through a proximal end of a second emission optical fiber, wherein the proximal end of the first emission optical fiber and the proximal end of the second emission optical fiber are arranged in an emission fiber bundle head.

In an embodiment, outputting first excitation light and second excitation light includes outputting light with a light engine as discussed further herein. In an embodiment, the first and/or second excitation light includes coherent light, such as from a laser. In an embodiment, the first light source and the second light source are each independently selected from the group consisting of a solid-state laser, a diode-pumped laser, a light-emitting diode (LED), a lamp, an arc discharge, and a natural light.

In an embodiment, the first and second photodetectors are each optically coupled to an emission fiber bundle, as described elsewhere herein. In an embodiment, the first photodetector is part of a first detector module, such as a detector module described further herein with respect to FIG. 2, optically coupled to a first emission optical fiber of the emission fiber bundle. In an embodiment, the second photodetector is part of a second detector module, as described further herein with respect to FIG. 1A, optically coupled to a second emission optical fiber of the emission optical fiber bundle.

In an embodiment, the method includes receiving first emission light and second emission light with an emission fiber bundle comprising a first emission optical fiber and a second emission optical fiber, wherein a proximal end of first emission optical fiber and second emission optical fiber are arranged in an emission fiber bundle head, and wherein the proximal end of the first emission optical fiber is positioned to receive first emission light emitted from the first portion and the proximal end of the second emission optical fiber is positioned to receive second emission light emitted from the second portion.

In an embodiment, flowing the particle and/or molecule through the channel includes flowing a suspension of particles and/or solution of molecules including the particle and/or the molecule through the channel. In an embodiment, the suspension of particles or solution of molecules is or is derived from a biological sample. In an embodiment, the suspension of particles or solution of molecules comprises or is based upon a bodily fluid or is based upon a fluid from or associated with a cell. In an embodiment, the particle is selected from the group consisting of an extracellular vesicle, a biological nanoparticle, an organelle, a microvesicle, a cell-derived vesicle, a lipoprotein, a macromolecular complex, an exomere, an RNA binding protein, a nucleic acid binding protein, a biological aggregate comprising a protein or nucleic acid, a protein aggregate, a nucleic acid aggregate, a lipid aggregate, a single biological molecule, a cytokine, a chemokine, an antibody, a cell-signaling molecule, a therapeutic molecule, a nucleic acid, a virus, a bacterium, and an exosome. In an embodiment, the particle is an extracellular vesicle. In an embodiment, the bodily fluid comprises serum, plasma, spinal fluid, saliva, nasalpharyngeal fluid, tear, whole blood, urine, sputum, or lymph fluid. In an embodiment, the particle is isolated. In an embodiment, the molecule is isolated. In an embodiment, the particle is associated with at least one biomarker.

In an embodiment, flowing the suspension of particles and/or the solution of molecules through the channel includes flowing the suspension and/or solution through the channel on a particle-by-particle and/or molecule-by-molecule basis. In some embodiments, at least some of the plurality of particles are detected on a particle-by-particle basis. In some embodiments, at least some of the plurality of molecules are detected on a molecule-by-molecule basis. In some embodiments, at least some of the plurality of particles and/or molecules are illuminated on a particle-by-particle and/or molecule-by-molecule basis. A particle-by-particle or molecule-by-molecule basis describes the observation of a plurality of particles or molecules passing through a region (e.g., a light beam having a given width) individually (i.e., one at a time). As a non-limiting example of a particle-by-particle or molecule-by-molecule basis, a fluid sample comprising a plurality of particles or molecules can flow through a constriction of a microfluidic channel and pass through a light beam, such that at least some of the plurality of particles or molecules pass through the light beam individually (i.e., in the absence of any of the other particles of the plurality). As another non-limiting example of particles or molecules on a particle-by-particle or molecule-by-molecule basis, a fluid sample comprising a plurality of particles or molecules can flow through a microchannel and pass through a light beam, such that no more than one particle or molecule passes through the light beam at a time, without any overlap with other particles or molecules of the plurality. In some specific embodiments, a majority of the particles or molecules pass through the light beam, such that no more than one particle or molecule passes through the light beam at a time, without overlap with other particles or molecule of the plurality. In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the particles or molecules in the plurality of the illuminated particles or molecules are illuminated on a particle-by-particle or molecule-by-molecule basis. In preferred embodiments, greater than 90% of the illuminated particles or molecules in the plurality of particles or molecules are illuminated on a particle-by-particle or molecule-by-molecule basis. In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the particles or molecules in the plurality of the detected particles or molecules are detected on a particle-by-particle or molecule-by-molecule basis. In preferred embodiments, greater than 90% of the particles or molecules in the plurality of detected particles or molecules are detected on a particle-by-particle or molecule-by-molecule basis.

The illumination of an individual particle or molecule can refer to a particle or molecule that is in a fluid sample comprising a plurality of particles or molecules and is illuminated absent any of the other particles or molecules of the plurality. The illumination of an individual particle or molecule is distinct from the illumination of two or more particles or molecules that are randomly co-localized to the illumination region. The illumination of an individual particle or molecule is distinct from the illumination of an aggregation of particles or molecules. As a non-limiting example, an individual particle or molecule can pass through a light beam, and is thus illuminated. The individual particle or molecule can pass through the light beam in the absence of any of the other particles or molecules of the plurality, the individual particle or molecule thus being illuminated by itself. In some embodiments, the individual particle or molecule is a singular nanoparticle or molecule that can be interrogated by a light source in the absence of any of the other particles or molecules present in the fluidic sample (e.g., for a given light beam width, a single particle or molecule is present in the beam, thus allowing it to be illuminated absent any of the other particles or molecules of the plurality).

While flowing particles through the channel and detecting the particles on a particle-by-particle basis is described, it will be understood that the same concepts apply by analogy to flow and detection of molecules with the methods and systems of the present disclosure on a molecule-by-molecule basis. Accordingly, in an embodiment, the methods of the present disclosure include flowing molecules through a channel, such as through an interrogation window of the channel, on a molecule-by-molecule basis. In this regard, molecules of interest, such as those associated with one or more detectable agents, pass through the interrogation window one at a time. Accordingly, in an embodiment, there is only one molecule associated with a detectable agent within the interrogation window at a time. Likewise, in an embodiment, there are not two or more molecules of interest associated with respective detectable agents within the interrogation window at the same time. In an embodiment, other molecules are within the interrogation window of the channel with the molecule of interest associated with the detectable agent. Such molecules can include, for example, solvent molecules assisting in the flow of the molecule of interest In an embodiment, such molecules that can pass through the interrogation window on a molecule-by-molecule basis are selected from the group consisting of proteins, peptides, antibodies, cytokines, chemokines, signaling molecules, therapeutic molecules, drug molecules, RNA binding proteins, macromolecular complexes, nucleic acids, DNAs, RNAs, synthetic molecules, aptamers, and the like. In an embodiment, the molecules are selected from the group consisting of a single dye molecule, a single protein dye molecule, a single polymer dye molecule, single Pdot, single fluorescent probe, single fluorescent unit, a single antibodies conjugated with one or more dyes, a single protein conjugated with one or more dyes, a single nucleic acid molecules conjugated with one or more dyes.

In an embodiment, the first emission light and the second emission light are independently selected from the group consisting of scattered emission light, luminescent emission light, fluorescent emission light, and a combination thereof.

In an embodiment, the particle is a biological particle. In an embodiment, the biological particle is a biological nanoparticle. In an embodiment, the particle is selected from the group consisting of an extracellular vesicle, an organelle, a microvesicle, a cell-derived vesicle, a lipoprotein, a macromolecular complex, an exomere, an RNA binding protein, a nucleic acid binding protein, a biological aggregate comprising a protein or nucleic acid, a protein aggregate, a nucleic acid aggregate, a lipid aggregate, a single biological molecule, a cytokine, a chemokine, an antibody, a cell-signaling molecule, a therapeutic molecule, a nucleic acid, a nucleic-acid binding protein, an RNA binding protein, a DNA binding protein, a therapeutic molecule, a virus, a bacterium, and an exosome.

As above, in an embodiment, the methods of the present disclosure are suitable to analyze relatively small particles flowing through a channel. In certain embodiments, a size of the particle is a hydrodynamic diameter. In specific embodiments, the hydrodynamic diameter is less than 1,000 nanometers, less than 900 nanometers, less than 800 nanometers, less than 700 nanometers, less than 600 nanometers, less than 500 nanometers, less than 400 nanometers, less than 300 nanometers, less than 200 nanometers, less than 150 nanometers, less than 100 nanometers, less than 90 nanometers, less than 80 nanometers, less than 70 nanometers, less than 60 nanometers, less than 50 nanometers, less than 40 nanometers, or less than 30 nanometers. In preferred embodiments, the hydrodynamic diameter is less than 100 nanometers. In certain embodiments, the hydrodynamic diameter is determined by measuring dynamic light scattering (DLS), and refers to the size of a hard sphere that diffuses light in the same fashion as that of the biological nanoparticle being measured.

In some embodiments, the hydrodynamic diameter is between 1,000 nanometers and 1 nanometers, between 900 nanometers and 1 nanometers, between 800 nanometers and 1 nanometers, between 700 nanometers and 1 nanometers, between 600 nanometers and 1 nanometers, between 500 nanometers and 1 nanometers, between 400 nanometers and 1 nanometers, between 300 nanometers and 1 nanometers, between 200 nanometers and 1 nanometers, between 100 nanometers and 1 nanometers, between 90 nanometers and 1 nanometers, between 80 nanometers and 1 nanometers, between 70 nanometers and 1 nanometers, between 60 nanometers and 1 nanometers, between 50 nanometers and 10 nanometers, or between 40 nanometers and 1 nanometers. In certain embodiments, the hydrodynamic diameter is between 1,000 nanometers and 800 nanometers, between 800 nanometers and 600 nanometers, between 600 nanometers and 400 nanometers, between 400 nanometers and 200 nanometers, or between 200 nanometers and 10 nanometers. In preferred embodiments, the hydrodynamic diameter is between 200 nanometers and 2 nanometers. In another preferred embodiment, the hydrodynamic diameter is between 200 nanometers and 10 nanometers. In a more preferred embodiment, the hydrodynamic diameter is between 100 nanometers and 20 nanometers.

In certain embodiments, a size of the particle is a diameter. In specific embodiments, the diameter is less than 1,000 nanometers, less than 900 nanometers, less than 800 nanometers, less than 700 nanometers, less than 600 nanometers, less than 500 nanometers, less than 400 nanometers, less than 300 nanometers, less than 200 nanometers, less than 150 nanometers, less than 100 nanometers, less than 90 nanometers, less than 80 nanometers, less than 70 nanometers, less than 60 nanometers, less than 50 nanometers, less than 40 nanometers, or less than 30 nanometers. In preferred embodiments, the diameter is less than 100 nanometers. In certain embodiments, the diameter is determined by measuring using electron microscopy (TEM) or super-resolution imaging.

In some embodiments, the diameter is between 1,000 nanometers and 1 nanometers, between 900 nanometers and 1 nanometers, between 800 nanometers and 1 nanometers, between 700 nanometers and 1 nanometers, between 600 nanometers and 1 nanometers, between 500 nanometers and 1 nanometers, between 400 nanometers and 1 nanometers, between 300 nanometers and 1 nanometers, between 200 nanometers and 1 nanometers, between 100 nanometers and 1 nanometers, between 90 nanometers and 1 nanometers, between 80 nanometers and 1 nanometers, between 70 nanometers and 1 nanometers, between 60 nanometers and 1 nanometers, between 50 nanometers and 10 nanometers, or between 40 nanometers and 1 nanometers. In certain embodiments, the diameter is between 1,000 nanometers and 800 nanometers, between 800 nanometers and 600 nanometers, between 600 nanometers and 400 nanometers, between 400 nanometers and 200 nanometers, or between 200 nanometers and 10 nanometers. In preferred embodiments, the diameter is between 200 nanometers and 2 nanometers. In another preferred embodiments, the diameter is between 200 nanometers and 10 nanometers. In a more preferred embodiment, the diameter is between 100 nanometers and 20 nanometers.

In an embodiment, the method further comprises directing flow of the particle or molecule. In an embodiment, directing flow of the particle or molecule is based upon a presence or absence of emission light received from the interrogation window and associated with the particle or molecule. In an embodiment, directing flow of the particle or molecule is based upon an intensity of emission light received by the detector system from the interrogation window. In this regard, the method is suitable to separate particles or molecules that, for example, emit fluorescence and/or scatter excitation light from those particles or molecules that do not.

In an embodiment, directing the flow of the particle or molecule includes directing the particle or molecule into one or two or more sorting channels, such a two or more channels including a channel for those particles or molecules that provide a fluorescent signal or an emission signal over a predetermined threshold and a channel for those that do not. In some embodiments, the method comprises sorting the particle or molecule into an enriched population. In some embodiments, the sorting comprises flow-displacement sorting. In some embodiments, the sorting does not include acoustic focusing or the use of physical barriers. In some embodiments, the sorting is determined by the size value, the presence of a biomarker, the absence of a biomarker, the detected light intensity, an emitted wavelength, a plurality of emitted wavelengths, an identification of the particle or molecule, or a combination thereof. In some embodiments, the sorting is determined by the presence of a combination of biomarkers. In some embodiments, the sorting is determined by the presence of one or more biomarkers and the absence of one or more other biomarkers, such as based upon an immune phenotype or immuno-phenotype (phenotype based on the presence, absence, or amount of markers as measured by the binding of a combination of antibodies). In some embodiments, the phenotype is determined, at least in part, by the presence or absence of two or more biomarkers on the particle (e.g. immuno-phenotype), and may be further informed or determined by physical characteristics, such as particle size or whether the particle contains nucleic acid or the amount of lipid molecules that comprise the particle. See, for example, Example 9 discussed further herein. In some embodiments, the sorting is determined by the number or type of biomarkers present by setting a sorting threshold.

In an embodiment, the method includes quantifying or counting a number of particles and/or molecules associated with emission light from the interrogation; and determining a concentration of the particles and/or molecules associated with the emission light from the interrogation window. See, for example, Example 13 discussed further herein.

In an embodiment, the method includes ranking particles or molecules in the channel based on a presence or absence of emission light from the interrogation window. In an embodiment, the ranking corresponds with measured emission spectra of the particle or molecule based upon one or more of the first emission light and the second emission light. In an embodiment, the ranking corresponds with a measured size value of the particle. In an embodiment, the measured size value is a relative size value. In an embodiment, the measured size value is measured by a difference in a detected light intensity In an embodiment, the particle or molecule is associated with a detectable agent. In an embodiment, a detectable agent can, for example, be a molecule of interest present on or in a particle to be analyzed (e.g., a protein on or in an extracellular vesicle, or a nucleic acid, or a biomarker). Alternatively, a detectable agent can be a molecule (e.g. an antibody conjugated with fluorescent probe or a nucleic-acid probe) that associates with a molecule of interest (e.g., the protein on or in an extracellular vesicle or biological nanoparticle or macromolecular complex, or the nucleic acid molecule, or the biomarker) associated with the particle, thereby allowing the nanoparticle to be detected. In some embodiments, the detectable agent is fluorescent and, thus, can be detected by fluorescence-based detection methods known in the art.

In an embodiment, the particle comprises at least one biomarker, such as a biomarker associated with one or more detectable agents. In an embodiment, the method comprises determining at least one copy number of the at least one biomarker, such as discussed further herein with respect to Example 10.

As used herein, "associated" includes interaction via covalent and/or non-covalent interactions. For example, the detectable agent can be covalently attached to the particle. Alternatively, the detectable agent can, for example, be embedded in the membrane of a particle and/or in the hydrophobic interior of a particle. In particular embodiments, the detectable agent can be embedded in the membrane of a particle via non-covalent interactions, such as van der Waals forces or electrostatic forces.

In specific embodiments, a detectable agent is associated with the surface of the particle. In some embodiments, a detectable agent can be covalently and/or non-covalently attached to the surface of the particle. In other embodiments, a detectable agent can be embedded within the surface of the particle. In specific embodiments, a detectable agent is surrounded by the surface of the particle, e.g., a membrane dye embedded into the lipid layer of an extracellular vesicle. The relation of detectable agents associated with the surface of a particle provides information on the size of the particle. For example, a particle having a large surface area will associate with a large number of detectable agents, while a particle having a small surface area will associate with a smaller number of detectable agents. The relation of the number of detectable agents associated with the particle surface provides a correlation between light intensity and nanoparticle surface area. In this manner, the amount of emitted light intensity corresponds with the size of the particle, and specifically corresponds with the surface area of the particle.

As discussed further herein with respect to Example 11, the determined size of the particles, such as through an intensity of fluorescence from a membrane dye, in conjunction with a copy of number of detectable agents associated with analyte on a surface of the particle can be used to determine whether the particle is an intact particle.

In other embodiments, a detectable agent is associated with the interior of the particle. In some embodiments, the detectable agent is embedded within the particle (e.g. lipophilic dyes embedded within a lipoprotein). In some embodiments, the detectable agent is not associated with the surface of the particle, and is embedded within the particle, or otherwise is surrounded by the particle. In specific embodiments, the detectable agent is encompassed by the particle, but does not associate with the internal surface, e.g., a dye floating freely within an extracellular vesicle that does not associate internally with its lipid membrane. Internal detectable agents, such as those embedded in the particle (e.g. lipophilic dyes embedded in a lipoprotein) or encompassed by the particle without associating with the internal surface (e.g. free floating dyes within a vesicle) are also referred to herein as "volume dyes". The relation of a volume dye embedded or surrounded by a particle provides information on the size of the particle. For example, a particle having a large volume will comprise a large number of volume dyes, while a particle having a small volume will comprise fewer volume dyes. The relation of the number of volume dyes within the particle provides a correlation between light intensity and nanoparticle volume. In this manner, the amount of emitted light intensity corresponds with the size of the particle, and specifically corresponds with the volume of the particle.

In some embodiments, a particle comprises both a volume dye and a detectable agent associated with the surface. A nanoparticle comprising both a volume dye and surface-associated detectable agent can provide information relating to both the surface area and the volume of the particle. In some embodiments, the volume dye and the surface area detectable agent are the same. In other embodiments, the volume dye and the surface area detectable agent are different. In certain embodiments, the volume dye can provide information regarding the identity or type of particle being detected or isolated. In some embodiments, the use of a volume dye that is a fluorogenic substrate can provide information regarding the identity or type of particle being detected or isolated. In a specific embodiment, the use of a volume dye that is a fluorogenic substrate of an enzyme specific to a particle, such as an exosome, can further provide information regarding the identity or type of particle being detected or isolated.

In some embodiments, the particle is labelled with a membrane dye and a membrane-permeant nucleic acid dye, such as a membrane-permeant RNA dye. As described further herein with respect to Example 11, such a combination of detectable agents is suitable to determine whether the particle includes nucleic acids, such as RNA or DNA, and whether the particle includes a membrane or contains lipid molecules. Such particles can be further labelled with a detectable agent, such as a fluorescently labelled antibody, configured to selectively bind to a surface marker, such as to determine a immuno-phenotype of the particle in addition to whether it includes a membrane and/or nucleic acid, that is, the overall phenotype, which includes physical characteristics (e.g. if lipid membrane and/or nucleic acids are present) and immuno-phenotype (e.g. if certain biomarkers are present or absent or of different amounts as reported by antibodies).

In an embodiment, the detectable agent is selected from a fluorescently labeled antibody, a fluorescently labeled protein, a fluorescently labeled nucleic acid, a fluorescently labeled lipid, a membrane dye, a fluorogenic dye, a dye, a polymer dot, and a combination thereof. In an embodiment, the detectable agent is selected from the group consisting of a luminescent dye, a fluorescent dye, a fluorescently labeled antibody, a fluorescently labeled protein, a fluorescently labeled nucleic acid, a fluorescently labeled lipid, a fluorescently labeled carbohydrate, a fluorescently labeled small molecule, a membrane dye, a fluorogenic dye, a dye, a polymer dot, a fluorogenic substrate of an enzyme, a membrane-permeant nucleic acid dye (such as a membrane-permeant RNA dye), or a combination thereof.

In some embodiments, detectable agents specifically bind to one or more binding targets associated with a particle. In certain aspects, the binding target is a polypeptide, such as a protein, and the detectable agent is a fluorescently labeled antibody that specifically binds to the target polypeptide. The phrase "specifically (or selectively) binds" to an antibody or "specifically (or selectively) immunoreactive with," when referring to a biological nanoparticle, refers to a binding reaction that is determinative of the presence of the bionanoparticle of interest, or of the presence of the biomarker associated with the bionanoparticles of interest, often in a heterogeneous population of nanoparticles and other biologies. Thus, under designated immunoassay conditions, the specified antibodies bind to a particular biological nanoparticle at least two times greater than the background and more typically more than 10 to 100 times greater than the background. Specific binding to an antibody under such conditions requires an antibody that is selected for its specificity for a particular biological nanoparticle or for a particular biomarker or for a particular molecule (e.g. cytokine, chemokine, antibodies, nucleic acids). For example, polyclonal antibodies can be selected to obtain only those polyclonal antibodies that are specifically immunoreactive with the selected antigen and not with other proteins. This selection may be achieved by subtracting out antibodies that cross-react with other molecules.

In an embodiment, the detectable agent is a first detectable agent, and wherein the particle is associated with a second detectable agent. In an embodiment, the detectable agent is a first detectable agent, and wherein the molecule (e.g. cytokine or cell signaling molecule) is associated with a second detectable agent. In an embodiment, the first detectable agent has a first emission spectrum in a first emission wavelength range and the second detectable agent has a second emission spectrum in a second emission wavelength range different than the first emission wavelength range. In an embodiment, the first detectable agent has a first excitation spectrum in a first excitation wavelength range and the second detectable agent has a second excitation spectrum in a second excitation wavelength range. In an embodiment, the first and second detectable agents have similar, the same, and/or overlapping emission spectra. In an embodiment, the first and second detectable agents have different emission spectra. In an embodiment, the first and second detectable agents have similar, the same, and/or overlapping excitation spectra. In an embodiment, the first and second detectable agents have different excitation spectra.

In some embodiments, the detectable agent is attached to the surface of the particle, the detectable agent is in the surface of the particle, the detectable agent is within the interior of the particle, the detectable agent is within the matrix of the particle, or a combination thereof. In some embodiments, the detectable agent is fluorescent, the detectable agent is luminescent, or any combination thereof. In some embodiments, the particle is associated with a plurality of detectable agents. In some embodiments, at least one of the plurality of detectable agents is attached to the surface of the particle. In some embodiments, at least one of the plurality of detectable agents is attached to the surface of the particle and at least one of the plurality of detectable agents is in the surface of the particle. In some embodiments, at least one of the plurality of detectable agents is attached to the surface of the particle and at least one of the plurality of detectable agents is within the interior of the particle. In some embodiments, at least one of the plurality of detectable agents is attached to the surface of the particle and at least one of the plurality of detectable agents is within the matrix of the particle. In some embodiments, at least one of the plurality of detectable agents is attached to the surface of the particle, at least one of the plurality of detectable agents is in the surface of the particle, at least one of the plurality of detectable agents is within the interior of the particle, or a combination thereof. In some embodiments, detectable agents of the plurality of detectable agents have overlapping emission profiles. In some embodiments, detectable agents of the plurality of detectable agents have the same emission profiles. In some embodiments, the emission profiles have the same peak wavelengths. In some embodiments, detectable agents of the plurality of detectable agents have overlapping excitation profiles. In some embodiments, detectable agents of the plurality of detectable agents have the same excitation profiles. In some embodiments, the excitation profiles have the same peak wavelengths. In some embodiments, detectable agents of the plurality of detectable agents comprise the same detectable agent. In some embodiments, detectable agents of the plurality of detectable agents comprise more than one type of detectable agent.

In certain aspects, detectable agents of the plurality of detectable agents have different emission profiles. In some embodiments, the emission profiles have different peak wavelengths. In this regard, the detectable agents are suitable for use in emission multiplexing, whereby the different emission spectra are used in detecting different detectable agents. In an embodiment, the detectable agents having different emission lifetimes. In an embodiment, the detectable agents have different emission intensities at common wavelengths.

In an embodiment, the first detectable has a first excitation spectrum in a first excitation wavelength range and the second detectable agent has a second excitation spectrum in a second excitation wavelength range different than the first excitation wavelength range. In this regard, the detectable agents are suitable for use in excitation multiplexing, whereby different detectable agents can be used by exciting them with different excitation wavelength ranges.

In an embodiment, the detectable agent is configured to be excited by light in different wavelength ranges. In an embodiment, the detectable agent is configured to be excited by a first amount by first excitation light in a first wavelength range and by a second amount by second excitation light in a second wavelength range different than the first wavelength range. In this regard, the detectable agent is configured to emit emission light of a first intensity in response to the first excitation light and emission light of a second intensity in response to the second excitation light. A ratio of the first and second emission light can be used to track or otherwise identify a particle associated with the detectable agent.

In some embodiments, the peak wavelengths are separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, or by more than 700 nanometers.

In another aspect, the present disclosure provides a method for analyzing a particle in a fluid sample. In an embodiment, the method includes flowing a fluid sample comprising a plurality of particles and/or molecules through a channel; illuminating in the channel a particle of the plurality of particles or a molecule of the plurality of molecules; collecting emission light emitted from the channel with a light collection system comprising a high-NA air objective having a numerical aperture in a range of about 0.91 to less than 0.99; and generating a signal based on the collected emission light emitted from the channel based on the particle or molecule; and assigning a value to the particle or molecule based on the signal.

In some embodiments, detection or imaging employing the fluidic device uses light collection systems with a numerical aperture equal to or greater than 0.91, equal to or greater than 0.92, equal to or greater than 0.93, equal to or greater than 0.94, equal to or greater than 0.95, equal to or greater than 0.96, equal to or greater than 0.97, or equal to or greater than 0.98. In preferred embodiments, the light collection system includes an air objective having a numerical aperture of about 0.95. As discussed further herein, high-NA air objectives are suitable for single-molecule flow detection. Such air objectives are generally more stable and easier to scan than oil-immersion objectives. This is particularly so where light collection efficiency is more important than image quality, such as in flow-based analysis and single-molecule flow detection. In many embodiments, the methods of the present disclosure include generating a signal based upon emission from an interrogation channel. Such a signal is frequently not a conventional image signal, such as one generating an image of a particle or molecule in the channel or immobilized on a surface or in a matrix. Rather, in many embodiments, the methods of the present disclosure rely instead on a presence, absence, or intensity of light emitted from the channel. In this regard, light collection efficiency and emission light intensity are more important to the methods of the present disclosure. This is in contrast with conventional imaging applications where image resolution and lack of optical aberrations (e.g. spherical aberration or chromatic aberration) can be as important or more important than simply light-collection efficiency. Accordingly, a high-NA air objective is frequently appropriate, and an oil-immersion or water-immersion objective is unnecessary and frequently inappropriate for the methods of the present disclosure.

In an embodiment, the method is a method of determining a size of the particle, and wherein the value is a size value. In an embodiment, ranking particles in the channel is based on a presence or absence of emission light from the interrogation window. In an embodiment, ranking particles in the channel is based on an intensity of emission light from the interrogation window. In an embodiment, the ranking corresponds with measured emission spectra of the particle is based upon one or more of the first emission light and the second emission light. In an embodiment, the ranking corresponds with a measured size value of the particle. In an embodiment, the measured size value is a relative size value. In an embodiment, the measured size value is measured by a difference in a detected light intensity.

In an embodiment, the particle or molecule is associated with a detectable agent. In an embodiment, the detectable agent is a first detectable agent, and wherein the particle or molecule is associated with a second detectable agent. In an embodiment, the first detectable agent has a first emission spectrum in a first emission wavelength range and the second detectable agent has a second emission spectrum in a second emission wavelength range different than the first emission wavelength range. In an embodiment, the detectable agent is a fluorescent detectable agent. In an embodiment, the first detectable has a first emission spectrum in a first emission wavelength range and the second detectable agent has a second emission spectrum common with, the same as, similar to, and/or overlapping with the first emission wavelength range.

Self-Corrected, Flow Based Analysis

In another aspect, the present disclosure provides a method of self-corrected single-molecule/particle flow analysis. The measurement of fluorescence emitted from single molecules or particles in a flow stream is heavily influenced by the profile of flow and/or laser beams. Accordingly, in an embodiment, the accurate quantification of fluorescent molecules requires deconvolution of signal(s) from the flow profile, which is often difficult if not impossible. The complicated nature of the observed signal(s) and interpretation thereof poses a number of challenges to the analysis of particles (e.g. extracellular vesicles (EVs), lipoproteins, RNA-binding proteins, and virus) or molecules (e.g. cytokines, antibodies, nucleic acid molecules, proteins, peptides and cell signaling molecules) in a flow stream. The challenges include: i) colocalization of biomarkers, important to the phenotyping of EVs or other biological nanoparticles, ii) measurement of a concentration of the particles, iii) examination of biological heterogeneity, often described by the copy number of biomarkers, iv) determining of the copy number of biomarkers associated with EVs or other biological nanoparticles, and v) characterization of physical properties, such as the size of vesicles or particles stained with membrane dye.

To overcome these challenges, the present disclosure provides methods suitable to analyze single molecules and particles in a flow stream in a self-correct manner. With such a "self-corrected, single-molecule/particle" method it is possible to accurately: 1) co-localize biomarkers expressed on the same particle that flows through multiple excitation regions or portions of a channel within an interrogation window, 2) identify and enumerate single particles and/or molecules, 3) obtain the flow rate sampled by each individual particle and/or molecules, and 4) thus, measure the concentration of analyzed particles and/or molecules. With such a "self-corrected, single-molecule/particle" method, it is also possible to accurately determine the copy number of biomarkers associated with EVs or other biological nanoparticles. Sec, for example, Example 10.

Briefly, in this method, the multiple excitation regions or portions of a channel within an interrogation window are configured with a known spatial pattern. A particle or molecule is measured twice at two different portions of the microchannel through which the particle is flowing (see, for example, FIG. 8). Because flow through a microfluidic channel is typically laminar, the transit time of a specific particle flowing through any two adjacent or closely spaced excitation regions or portions of a channel is generally proportional to a distance between these two excitation regions or portions of a channel and the velocity of the particle. Also due to the nature of laminar flow and the small separation distance between excitation regions or portions of a channel, the position of a specific particle in the cross-section of channel generally remains the same during the transit time. Accordingly, that particle generally interacts with different laser beams focused on different portions of the channel at very similar positions in the cross-section of the channel. Considering these properties, it is possible to identify single analytes (e.g. vesicles stained by fluorescence dyes or bionanoparticles labeled with antibodies), and use the extracted transit time or particle velocity to further colocalize other biological markers (see, for example, FIG. 8).

Accordingly, in an embodiment, the method includes flowing a particle through a lumen of a channel, the channel defining an interrogation window configured to allow light to pass into and out of the lumen; outputting first excitation light with a first light source into a first portion of the channel or interrogation window; outputting second excitation light with a second light source into a second portion of the channel or the interrogation window separate from the first portion; generating a first emission signal with a first photodetector based upon first emission light received from the first portion; generating a second emission signal with a second photodetector based upon second emission light received from the second portion; and determining a velocity of a particle in the channel based on a time difference between the first emission signal and the second emission signal and a distance between the first portion and the second portion. In an embodiment, the method includes use of any of the systems of the present disclosure. As discussed elsewhere herein, in an embodiment, the first photodetector is part of a first detector module and the second photodetector is part of a second detector module.

In an embodiment, the method includes detecting light, such as first and second emission light, using time bins. The disclosed apparatus and methods for determination of biological nanoparticle characteristics can be conducted swiftly, with a short signal-integration time, or fast bin time. A bin time can be used to assess, for example, a start-stop time of interrogation of fluorescence, in order to aid in the sorting of information. Time bins (also referred to herein as signal integration times) can disclose a time range in a histogram that an event takes place, or is observed. In some embodiments, the detection, measuring, and/or interrogation of a biological nanoparticle uses time bins. In some embodiments, the time bins have a range of less than 10 ms, less than 5 ms, less than 1 ms, less than 0.5 ms, less than 0.1 ms, less than 90 µs, less than 80 µs, less than 70 µs, less than 60 µs, less than 50 µs, less than 40 µs, less than 30 µs, less than 20 µs, less than 10 µs, less than 5 µs, or less than 1 µs. In some embodiments, the time bins have a value between 10 ms and 0.1 ms, between 5 ms and 0.1 ms, between 1 ms and 0.1 ms, between 0.5 ms and 0.1 ms, between 0.1 ms and 1 µs, between 90 µs and 1 µs, between 80 ns and 1 µs, between 70 ns and 1 µs, between 60 ns and 1 µs, between 50 ns and 1 µs, between 40 ns and 1 µs, between 30 ns and 1 µs, between 20 ns and 1 µs, between 10 µs and 0.1 µs, between 5 µs and 0.1 µs, or between 1 µs and 0.1 µs. In preferred embodiments, the time bins have a range of between 1 µs and 2 ms.

In an embodiment, the method includes correlating the first emission signal and the second emission signal based on an emission signal characteristic or particle characteristic shared by the first emission signal and the second emission signal. In an embodiment, the correlating the first emission signal and the second emission signal is based on an emission signal characteristic or on a particle characteristic. As shown in FIG. 8, signals detected in a first detection window or a first portion of a channel or a first excitation line can be detected downstream in a second detection window or second portion of a channel or second excitation line. In this regard, a particle can be tracked as it proceeds through a channel. Additionally, the particle can also be interrogated for various different biomarkers. In an embodiment, a detection window includes and/or is defined at least in part by a portion of the channel, as discussed further herein, or an excitation line of the excitation light.

In an embodiment, the methods include correlating the first emission signal and the second emission signal based on an emission signal characteristic or based on a particle characteristic. In an embodiment, correlating the first emission signal and the second emission signal includes comparing an intensity of the first emission signal with an intensity of the second emission signal. In an embodiment, the method further comprises enumerating a number of particles passing through the channel based upon correlating the first emission signal and the second emission signal. In an embodiment, the method further comprises colocalizing target molecules on a particle based upon correlating the first emission signal with the second emission signal. In an embodiment, the method further comprises determining a particle concentration based upon correlating the first emission signal with the second emission signal. Such a concentration may be further defined, at least in part, based upon a volumetric flow rate through the channel, as discussed further herein with respect to FIGS. 11A and 11B. In an embodiment, the method further comprises determining a detection efficiency and recovery rate based upon correlating the first emission signal with the second emission signal.

In an embodiment, the particles are associated with one or more detectable agents. In an embodiment, the one or more detectable agents are configured to generate one or more signals in response to excitation light. In an embodiment, the particles are associated with one or more membrane dyes. In an embodiment, the particles are associated with one or more volume dyes. Such detectable agents can be used in detecting the presence or absence of markers in the particles, as discussed further herein with respect to FIGS. 9A-9D.

In an embodiment, the method comprises the detection of each particle and/or molecule and the tagging of the particle and/or molecule with its own flow information, such as the transit time of the particle and/or molecule and/or the velocity of the particle and/or molecule. In an embodiment, tagging or assigning the detect detected particle or molecule with the corresponding flow information (e.g. transit time and/or velocity) allows for self-corrected flow analysis.

Figure 9A:
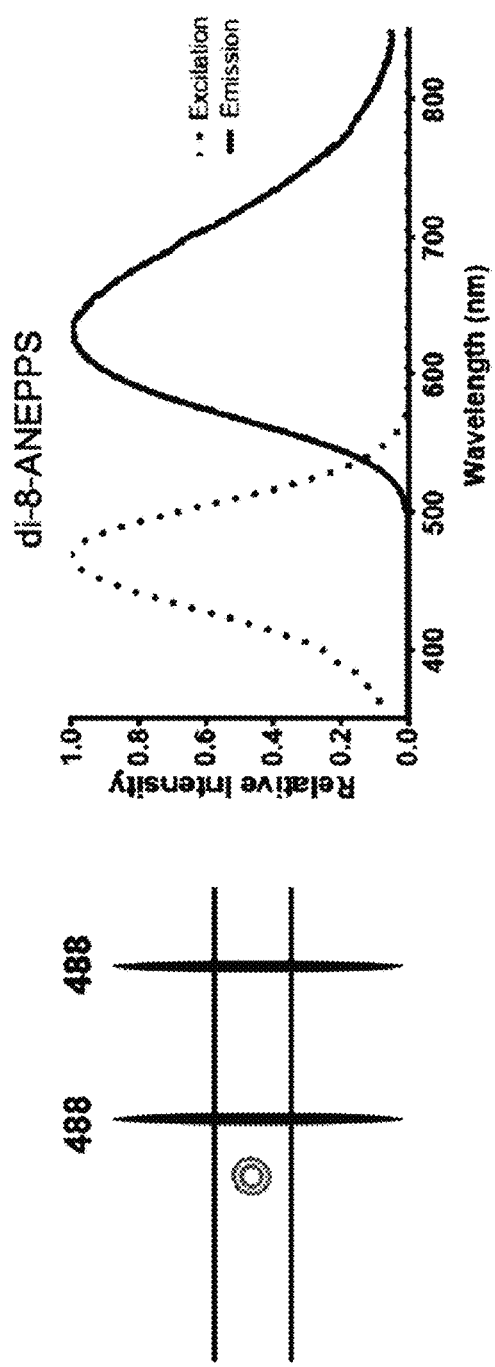
FIG. 9A graphically illustrates (left) a particle passing through an interrogation window of a flow-based, single-molecule/particle system, in accordance with an embodiment of the present disclosure and (right) shows the absorption and emission spectra of the particle stained with one type of membrane dye and excited twice at the same excitation wavelength, in accordance with an embodiment of the present disclosure.

FIG. 9A graphically illustrates (left) a particle passing through two excitation regions or portions of the channel of a fluidic device, in accordance with an embodiment of the present disclosure and (right) shows absorption and emission spectra of the membrane dye that labeled the particle, in accordance with an embodiment of the present disclosure. In the illustrated embodiment, particles (e.g. extracellular vesicles or liposomes) are labeled with a membrane dye (e.g. di-8-ANEPPS), and excited by two laser lines with the same wavelength (e.g. 488 nm). In this regard, the particles can be tracked by measuring a time between signals emitted from the two illustrated portions of the channel. As discussed, such tracking is useful in enumerating particles in a population of particles by accurately sampling flow rate of suspension of particles in the channel, enumerating particles passing through the channel, and in the calculation of a concentration of certain types of particles in the suspension flowing through the channel. As discussed, such tracking is also useful in co-localizing different biomarkers on the particle labeled with different fluorescent probes.

Figure 9B:
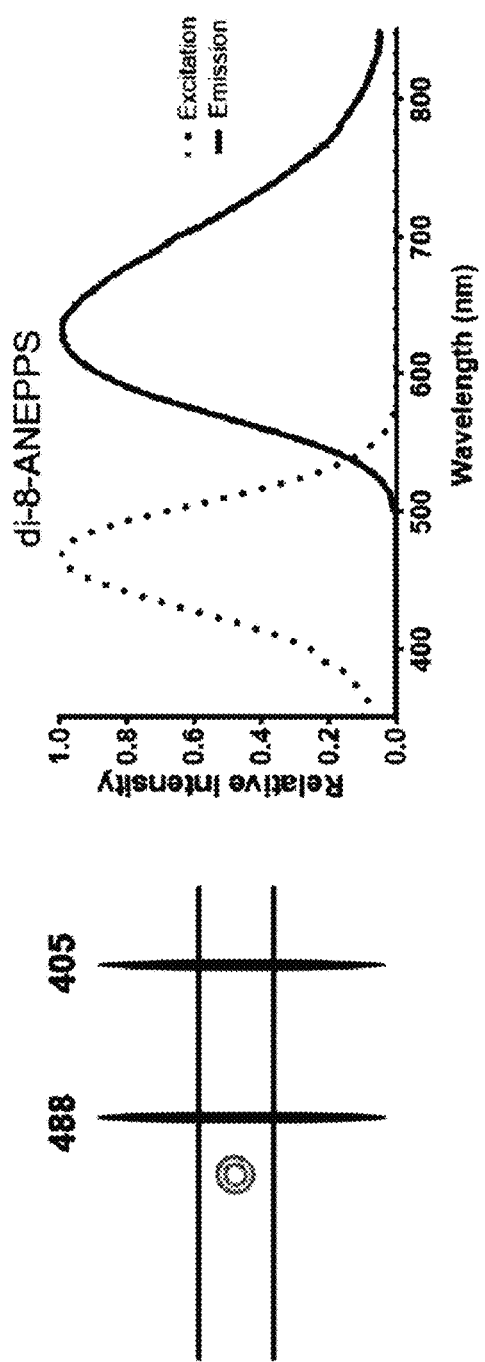
FIG. 9B graphically illustrates (left) a particle passing through an interrogation window of a flow-based, single-molecule/particle system, in accordance with an embodiment of the present disclosure and (right) shows the absorption and emission spectra of the particle stained with one type of membrane dye excitable at two excitation wavelengths, in accordance with an embodiment of the present disclosure.

FIG. 9B graphically illustrates (left) a particle passing through two excitation regions or portions of the channel of a fluidic device, in accordance with an embodiment of the present disclosure and (right) shows absorption and emission spectra of the membrane dye that labeled the particle, in accordance with an embodiment of the present disclosure. In the illustrated embodiment, particles (e.g. extracellular vesicles or liposomes) are labeled with a membrane dye (e.g. di-8-ANEPPS), and excited by two laser lines with different wavelengths (e.g. 405 and 488 nm). In an embodiment, the membrane dye is excited by both the first wavelength and the second wavelength, although to different degrees. In an embodiment, the dye emits a signal of a first intensity in response to the first excitation light (e.g. 405 nm laser light) and a second signal of a second intensity different than the first intensity in response to the second excitation light (e.g. 488 nm laser light). Accordingly, in an embodiment, the method includes measuring a ratio of the signals generated, such as a ratio of the signal intensity, at different positions of the channel or excitation regions. So long as the dye is present in or on the particle above a certain level, this ratio can be used to accurately identify the particle.

Figure 9C:
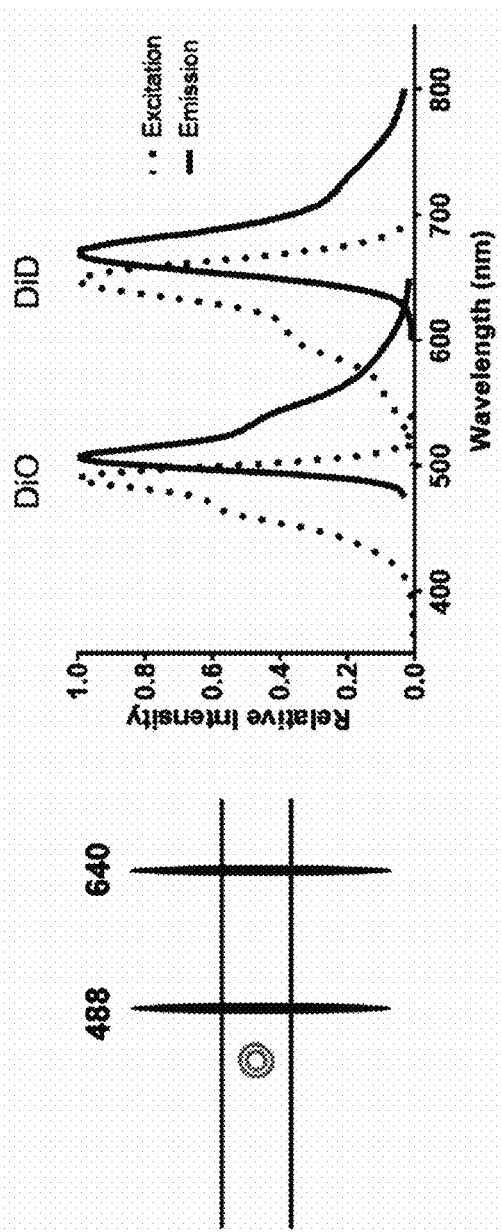
FIG. 9C graphically illustrates (left) a particle passing through an interrogation window of a flow-based, single-molecule/particle system, in accordance with an embodiment of the present disclosure and (right) shows the absorption and emission spectra of the particle stained with two membrane dyes and excited at two different excitation wavelengths, in accordance with an embodiment of the present disclosure.

FIG. 9C graphically illustrates (left) a particle passing through two excitation regions of a fluidic device, in accordance with an embodiment of the present disclosure and (right) shows absorption and emission spectra of the particle, in accordance with an embodiment of the present disclosure. In the illustrated embodiment, particles (e.g. extracellular vesicles or liposomes) are labeled with a combination of two membrane dyes (e.g. DiO and DiD), and excited by two laser lines with different wavelengths (e.g. 488 and 640 nm). As shown, the dyes provide separate emission signals based upon excitation light in distinct wavelength ranges. In this regard, the particles can be tracked by measuring a time between the two signals emitted by the two dyes from the two detection windows, that is, two illustrated portions or excitation regions of the channel.

Figure 9D:
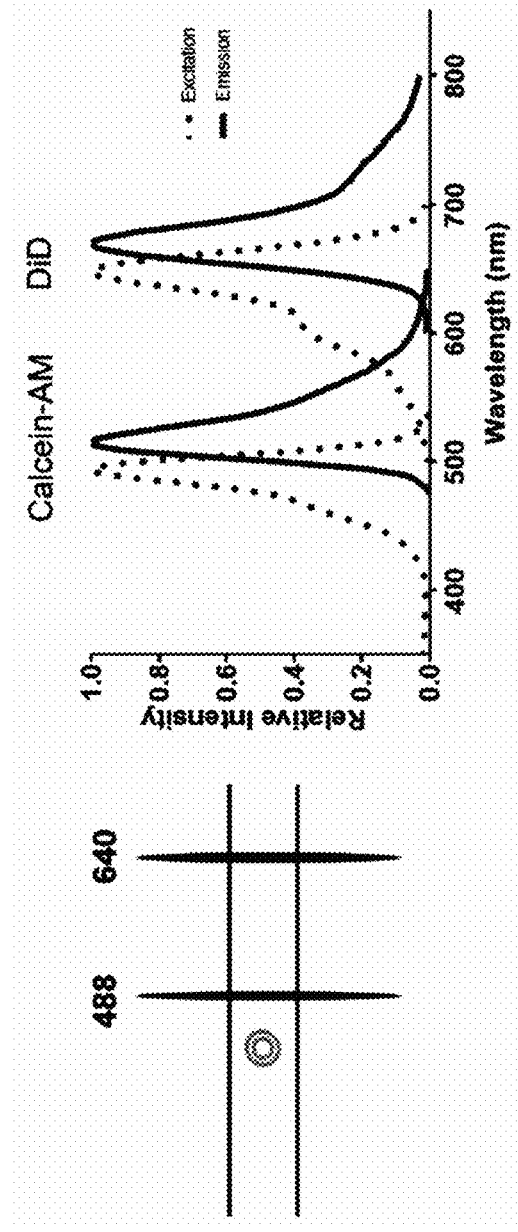
FIG. 9D graphically illustrates (left) a particle passing through an interrogation window of a flow-based, single-molecule/particle system, in accordance with an embodiment of the present disclosure and (right) shows the absorption and emission spectra of the particle stained with a membrane dye and a volume dye and excited at two different excitation wavelengths, in accordance with an embodiment of the present disclosure.

FIG. 9D graphically illustrates (left) a particle passing through two detection windows of a fluidic device, in accordance with an embodiment of the present disclosure and (right) shows absorption and emission spectra of the particle, in accordance with an embodiment of the present disclosure. In the illustrated embodiment, particles (e.g. extracellular vesicles or liposomes) are labeled with a membrane dye (e.g. DiD) combined with a volume dye (e.g. Calcein AM). As shown, the dyes provide separate emission signals based upon excitation light in distinct wavelength ranges. In this regard, the particles can be tracked by measuring a time between the two signals emitted by the two dyes from the two illustrated portions or excitation regions (detection windows) of the channel.

The self-corrected, single-molecule/particle counting method provides numerous advantages with much improved quality of results, compared to other traditional methods, as described immediately below.

Accurate Enumeration and Colocalization.

Figure 14A:
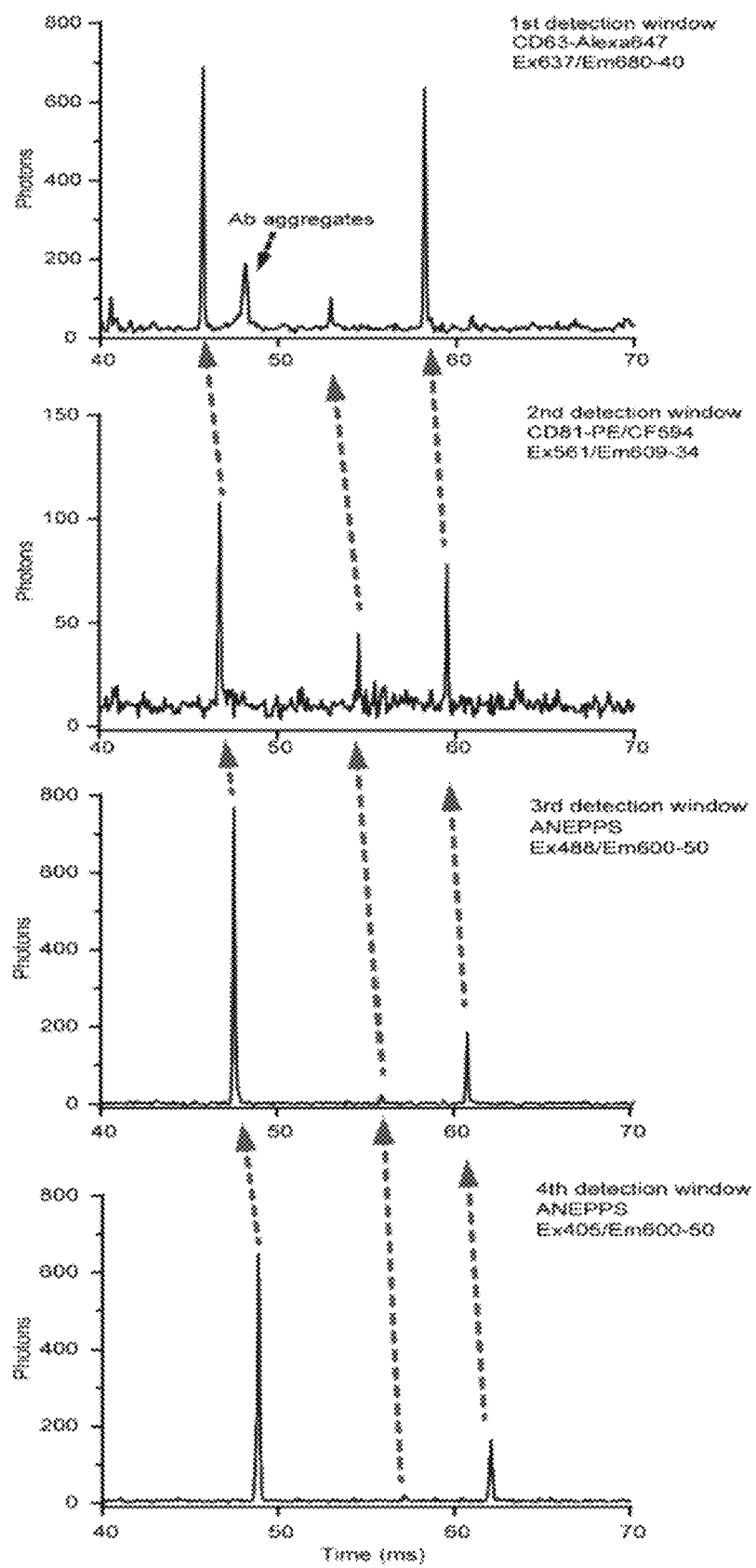
FIG. 14A shows multi-color co-localization of semen extracellular vesicles labeled with di-8-ANEPPS membrane dye, anti-CD63-Alexa647 antibody, and anti-CD81-PE/CF594 antibody, where 4 laser excitation regions or laser lines were used in the experiment, and the direction of flow was first encountering the 640 nm, then 561 nm, 488 nm, and finally the 405 nm excitation region or laser lines wherein the direction of peak searching was in the opposite direction to the flow, because the last two laser lines were used to detect signals from di-8-ANEPPS, in accordance with an embodiment of the present disclosure.
Figure 14B:
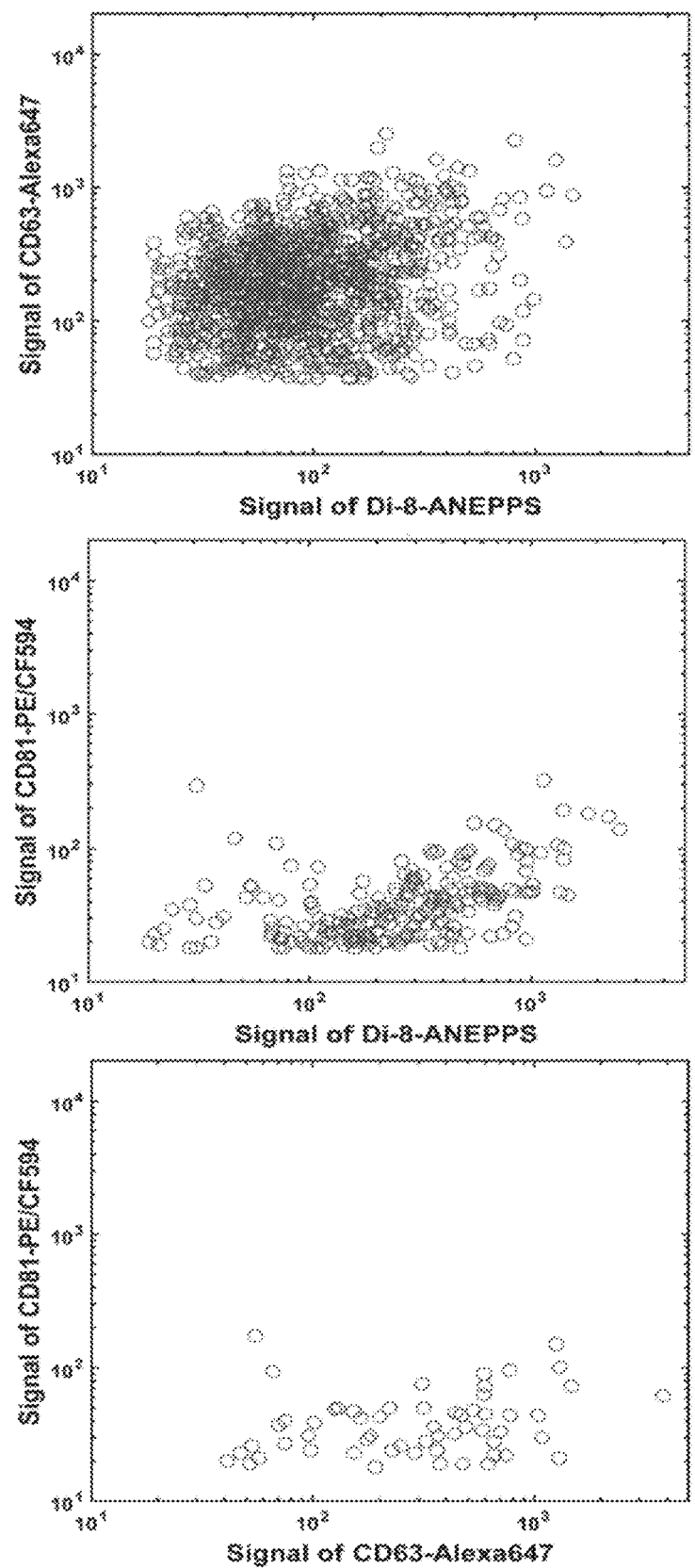
FIG. 14B shows sub-populations or sub-types of semen extracellular vesicles based on the co-localization of the di-8-ANEPPS membrane dye, anti-CD63-Alexa647 antibody, and anti-CD81-PE/CF594 antibody, in accordance with an embodiment of the present disclosure.
Figure 15:
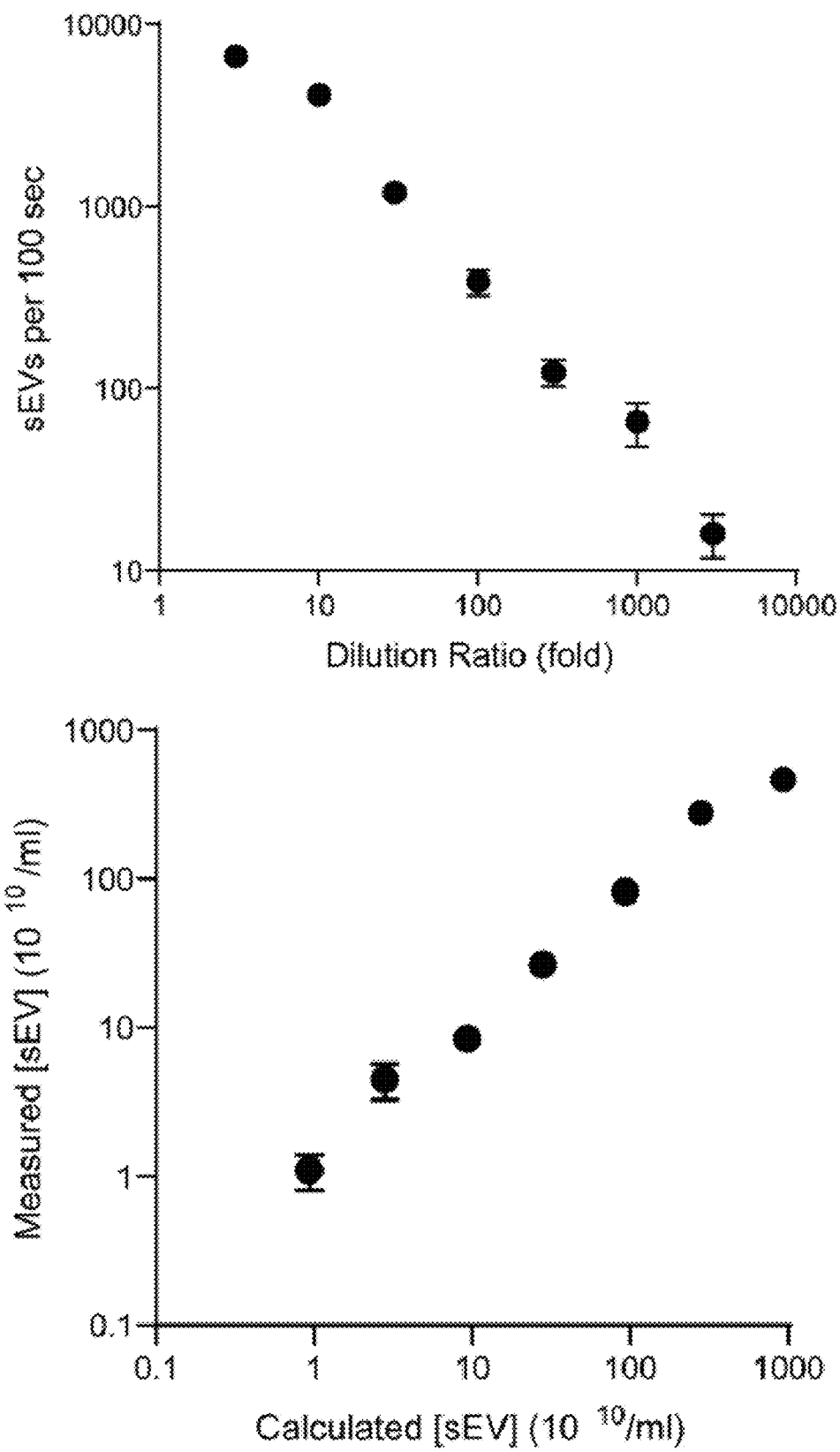
FIG. 15 shows measurements of the concentrations of semen extracellular vesicles (sEVs) after generating a series of dilutions of the original stock sEV sample, in accordance with an embodiment of the present disclosure.

Because the Methods of the Present Disclosure Remove or Decrease Many Interfering signals, such as background fluctuation and small aggregates of dyes, in the identification of real events (e.g. extracellular vesicles or biological nanoparticles), the present methods are suitable to obtain or determine more accurate numbers of analytes (e.g. extracellular vesicles or biological nanoparticles or molecules). (See, for example, FIGS. 10A, 10B, 11B. 12, 14, and 15). Colocalization of single-molecule events in a flow stream by statistical methods (e.g. cross-correlation function) often suffers from interference by spatially close events, contaminates, fluctuation in background, and especially a difference in linear velocity between particles induced by the laminar flow profile. Using the present method, it is possible to minimize these interferences, and, thus, improve the quality of enumeration and colocalization. FIG. 14A shows multi-color co-localization of semen extracellular vesicles labeled with di-8-ANEPPS membrane dye, anti-CD63-Alexa647 antibody, and anti-CD81-PE/CF594 antibody, in accordance with an embodiment of the present disclosure. FIG. 14B shows sub-populations or sub-types of semen extracellular vesicles based on the co-localization of the di-8-ANEPPS membrane dye, anti-CD63-Alexa647 antibody, and anti-CD81-PE/CF594 antibody, in accordance with an embodiment of the present disclosure. FIG. 15 shows measurements of the concentrations of semen extracellular vesicles (sEVs), in accordance with an embodiment of the present disclosure.

Accurate colocalization of biomarkers, such as those expressed on the same biological nanoparticle, is the foundation of many important applications (e.g. immuno-phenotyping for identifying sub-types of biological nanoparticles or molecules-see Example 9). When multiple particles and/or molecules in close proximity in the flow stream pass through the excitation regions or detection windows, it can be challenging to correctly assign signals observed at different detection windows or from different excitation regions to a given particle and/or molecule, because particles/molecules may flow with a broad range of velocities in microfluidic channel due to the laminar nature of the microfluidic flow environment and the parabolic flow profile. Using the methods of the present disclosure address these difficulties to allow for accurate colocalization of biomarkers on a single biological nanoparticle or molecule (See, for example, FIGS. 10A, 10B, 11, 12, 14, and 15 and the related Examples).

Accurately Sampling the Flow Rate.

The self-corrected methods of the present disclosure provide a transit time of each particle that flows through different positions in the cross section of the channel. With known spacing between portions of the channel or detection window illuminated by different spatially separated excitation lights, it is possible to calculate the linear velocity of each examined particle, and determine the volumetric flow rate sample accordingly. As shown in FIG. 11A, it is possible to convert an averaged liner velocity to a volumetric flow rate through a channel.

Knowing the volumetric flow rate in microfluidic based analysis is often required to determine the volume of sample that has been analyzed during an experiment. The absolute concentration of single particles/molecules can thus be measured based on the counts of analytes/molecules/nanoparticles and the analyzed volume. Volumetric flow rate is also a useful parameter to evaluate the throughput and consumption of samples. Although important, direct measurement of volumetric flow rate is often challenging in microfluidic environment, especially when the volumetric flow rate is extremely low (e.g. pL-nL per see), due to the ultra-small volumes of sample being interrogated by the excitation regions. Using the methods of the present disclosure, volumetric flow rate can be determined using the transit time of each molecule and/or particle that flow through the laser lines or excitation regions, based on the fact that the flow is laminar in this microfluidic environment. Consequently, the linear velocity of each particle and/or molecule can be calculated, knowing the distance between these laser lines or excitation regions. From the measured average particle and/or molecule velocity and by knowing the area of the channel cross section, volumetric flow rate can be measured.

Using the methods of the present disclosure, therefore, volumetric flow rate can be determined by using the measured single-particle and/or single-molecule transit times and/or velocities (See, for example, FIGS. 10, 11, 15 and related Examples).

Accurate Measurement of Concentration.

Because it is possible with the present methods to accurately determine a number of single analytes examined in a given time period and obtain the analyzed volume of sample (often on the level of nanoliters) by knowing the volumetric flow rate, the present methods are also suitable to measure the concentration of analytes accurately. FIG. 11B shows measurements of a concentration of extracellular vesicles in a fluid sample passing through a channel of a system, in accordance with an embodiment of the present disclosure, calculated using the comparison illustrated in FIG. 11A. Because the methods of the present disclosure provide an absolute counting of analytes in a given volume, without relying on parameters obtained from bulk sample (e.g. extinction coefficient), and any external calibration curves, a more accurate determination of analyte concentration is possible. FIG. 15 shows measurements of the concentrations of semen extracellular vesicles (sEVs), in accordance with an embodiment of the present disclosure.

Accurate Determination of Detection Efficiency and Recovery Rate.

Detection efficiency may be defined as a fraction of analytes counted, such as by the methods of the present disclosure, in the analytes that flow through the channel or excitation region(s) or detection region(s) or detection window(s). If the distribution of signal associated with analytes flowing through the channel follows a known statistic model (e.g. lognormal distribution commonly seen in flow analysis), it is possible to quantify detection efficiency by knowing the Cumulative distribution function (CDF) at cut-off values.

Figure 12A:
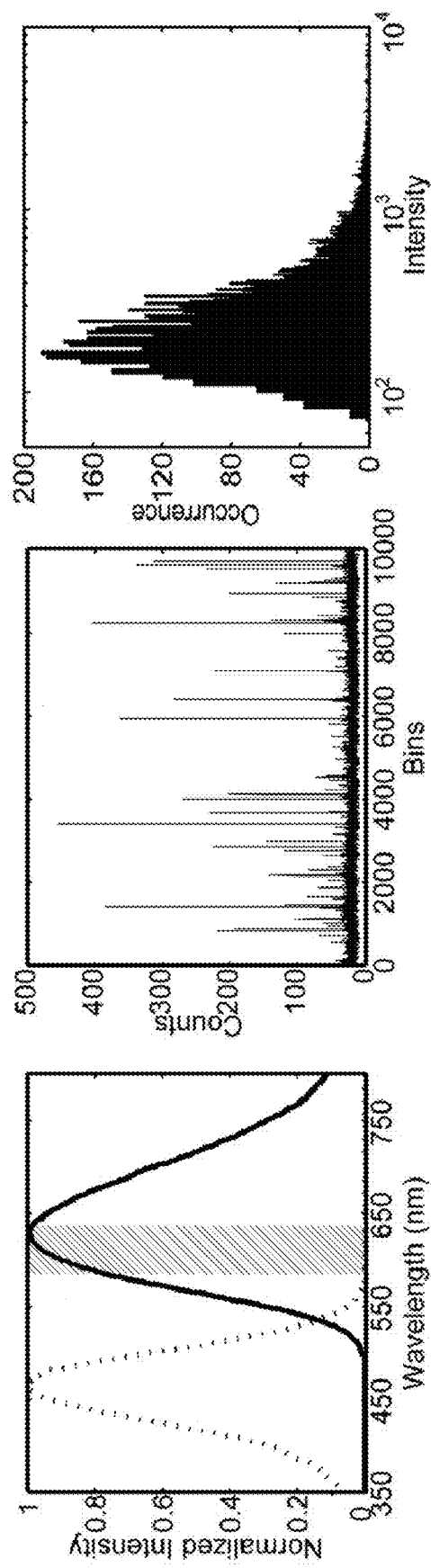
FIGS. 12A-12C show fluorescence spectra (left), sample traces in flow (center), and the distribution of signal intensity (right) of human semen exosome stained by (12A) di-8-ANEPPS. (12B) single R-phycoerythrin (PE), and (12C) single Alexa 647, in accordance with an embodiment of the present disclosure.
Figure 12B:
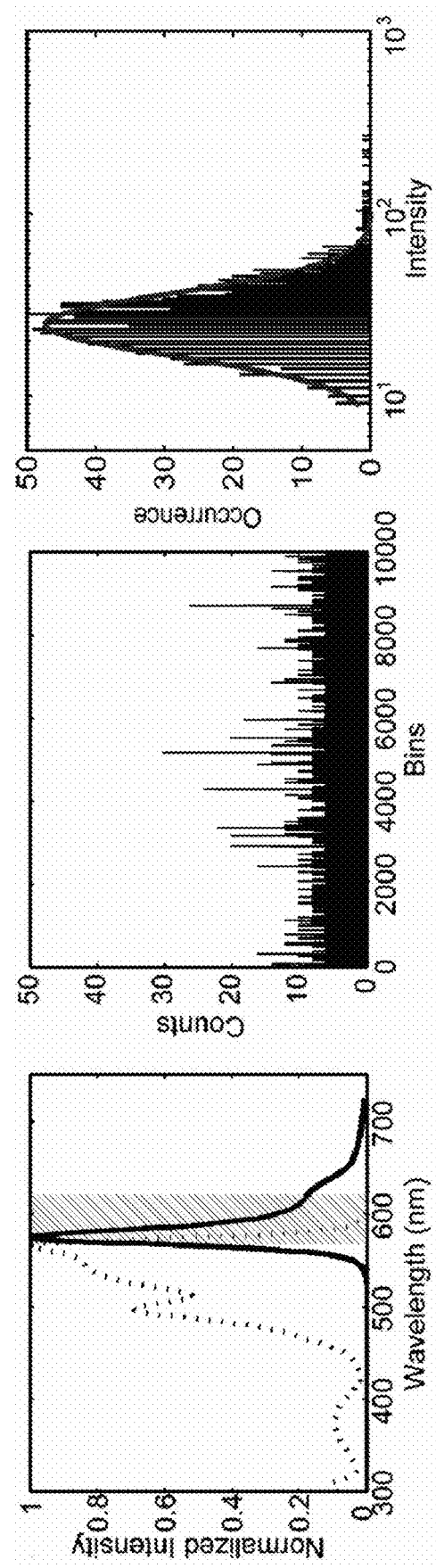
Figure 12C:
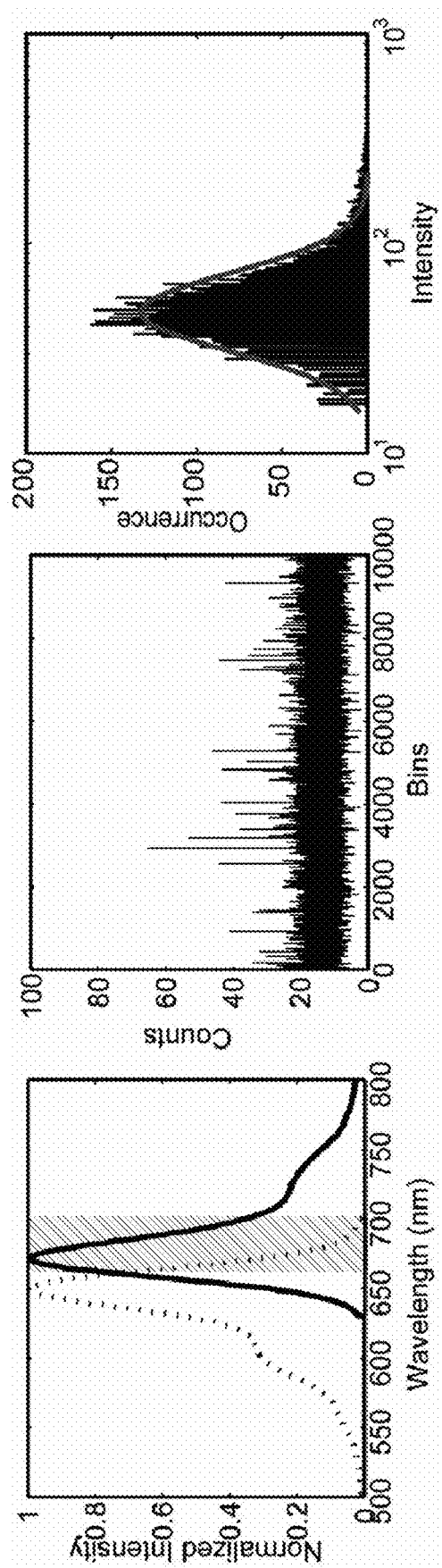
Figure 13:
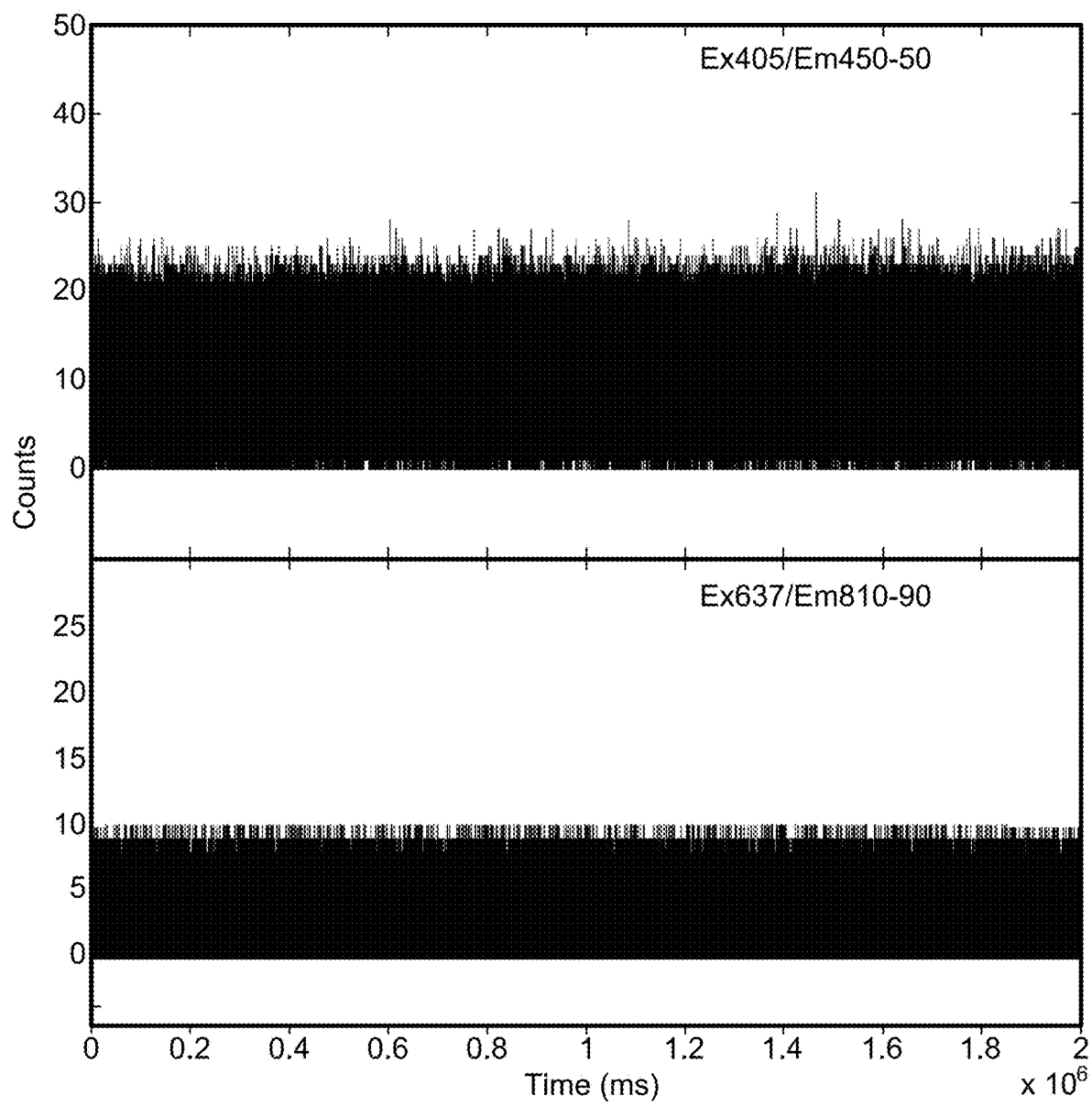
FIG. 13 shows measured background level, obtained using a high numerical aperture air objective (40× magnification with 0.95 NA), is highly stable during a 2000-second experimental measurement period in two fluorescence channels, in accordance with an embodiment of the present disclosure.

Recovery rate, such as a recovery rate defined as the ratio between the counted analytes to the amount of analytes spiked into or present in a given volume, is influenced by many other factors (e.g. the accuracy of stock concentration, possible aggregation and degradation of analytes, surface absorption, etc.), besides detection efficiency. If the stock concentration of the analyte is accurately known, it is also possible to determine the recovery rate accordingly. FIGS. 12A-12C illustrates that the methods of the present disclosure are exceptionally sensitive to both single fluorescent dyes and particles (e.g. EVs). In this regard, FIGS. 12A-12C illustrate that the methods of the present disclosure are exceptionally sensitive to both single small-molecule (e.g. Alexa 647 tagged antibodies, see FIG. 12B) and protein (R-phycoerythrin (PE, see FIG. 12C)) dyes, with the detection efficiency more than 99%. The average SNR for EVs stained with a membrane dye is about 54, with the recovery rate higher than 95%, which is within the uncertainty of the stock concentration; indicating a higher sensitivity to particles and molecules than is available through conventional methods.

Accurate Determination of Copy Number

As discussed further herein with respect to Example 10, the methods of the present disclosure are suitable to determine copy number of biomarkers present on a single particle. Because the present methods are suitable to detect an entire population of single molecules/particles present in a sample or an aliquot of a sample or a very large percentage of such molecules/particles (such as greater than 90%) that pass through the microchannel, the present methods can also use the single-molecule intensity distribution to de-convolve the single-particle intensity distribution to determine precisely the number of bound antibodies, and thus the corresponding protein, on each particle. Such an approach is useful in determining, for example, the number of fluorescently labelled antibodies associated with a particle, such as an EV, to provide quantitative information about the molecular composition of single particles. As discussed further herein with respect to Example 12, this information, in conjunction with other information regarding the size of the particle, can be used in determining whether the analyzed particle is intact or fragmented or whether the analyzed particle is empty (e.g. contain nucleic acid) and non-functional or biologically functional.

Auto-Focusing Methods

In another aspect, the present disclosure provides a method of focusing optical components of a system on a channel of the system. Counting and measuring particles and molecules in flow, such as extracellular vesicles, viruses, lipoproteins, RNA binding proteins, or cytokines, on the level of single molecules/particles is often extremely sensitive to the changes in environment (e.g. thermal induced expansion) and instrument configuration (e.g. subtle drift of optical alignment, and variations of channel dimension). To collect data consistently and improve the sensitivity of flow-based devices, the present disclosure provides an auto-focusing method.

In an embodiment, excitation light, such as a specific laser light (e.g. 870 nm) back reflected by the microfluidic device is collected, such as via a fiber-coupled confocal scheme discussed further herein with respect to FIG. 7A. A magnitude of this back reflection is externally calibrated and attenuated with neutral density filters to ensure it is in a dynamic range of photodetectors. In an embodiment, a preferred or optimal value of the back-reflected light is determined when the correct focusing of the detection channel is achieved and set as a reference to "lock" the focus level (See, for example, FIG. 7B). In an embodiment, a portion of the microfluidic device, such as the channel including the interrogation window, or objective lens is operatively coupled to a motorized moveable stage, such as a stage driven by piezo or DC motor. In this regard, the light collection system is configured to move relative to the interrogation window of the channel to focus the light collection system on the interrogation window. As detailed in FIG. 7C, the moveable stage can be controlled based upon comparing the current value of reflection, with the value at previous time point (e.g. 200 ms ago), as well as the reference value.

Accordingly, in an embodiment, the present disclosure provides method of focusing excitation light through optical components on a fluidic channel. In an embodiment, the method includes using the system 700 discussed further herein with respect to FIGS. 7A and 7B. In an embodiment, the method comprises illuminating an interrogation window or other portion of a fluidic channel with light from a light source; focusing the light onto the interrogation window with optical components disposed between the channel and a photodetector; generating a lock signal with the photodetector based on the focused light back reflected from the interrogation window at a first time; generating a test signal with the photodetector based on the focused light back reflected from the interrogation window at a second time after the first time; determining whether the test signal is within a predetermined percentage of the lock signal; and moving the fluidic channel relative to the high-NA air objective if the test signal is outside of the predetermined percentage of the lock signal.

As shown in FIG. 7C. 7F, and 7G, in an embodiment, the predetermined percentage is about 5%. In an embodiment, the predetermined percentage is in a range of about 0.5% to about 15%, a range of about 1% to about 10%, a range of about 2% to about 8%, a range of about 2.5% to about 7.5%, a range of about 3% to about 6%, or a range of about 3% to about 5%.

In an embodiment, the method comprises, the present disclosure provides a method of maintaining focus on a fluidic channel, the method comprising: illuminating an imaging area of a microfluidic system with light from a near infrared light source; generating an image of the imaging area with a camera; determining an amount of defocus of the image; determining whether the amount of defocus is within a predetermined amount of defocus; and moving the fluidic channel relative to the high-NA air objective if the test signal is outside of the predetermined range. In an embodiment, the structure being imaged is a structure adjacent to, and in certain embodiments, separate from, the channel. In an embodiment, the structure has a high level of contrast relative to other portions of the imaging area. In an embodiment, the structure defines an air-filled enclosure within the microfluidic system. Such an air-filled structure will have higher contrast than, for example, a fluid-filled channel, and, in this regard, is suitable for generating an image a determining an amount of defocus of the image.

Figure 7D:
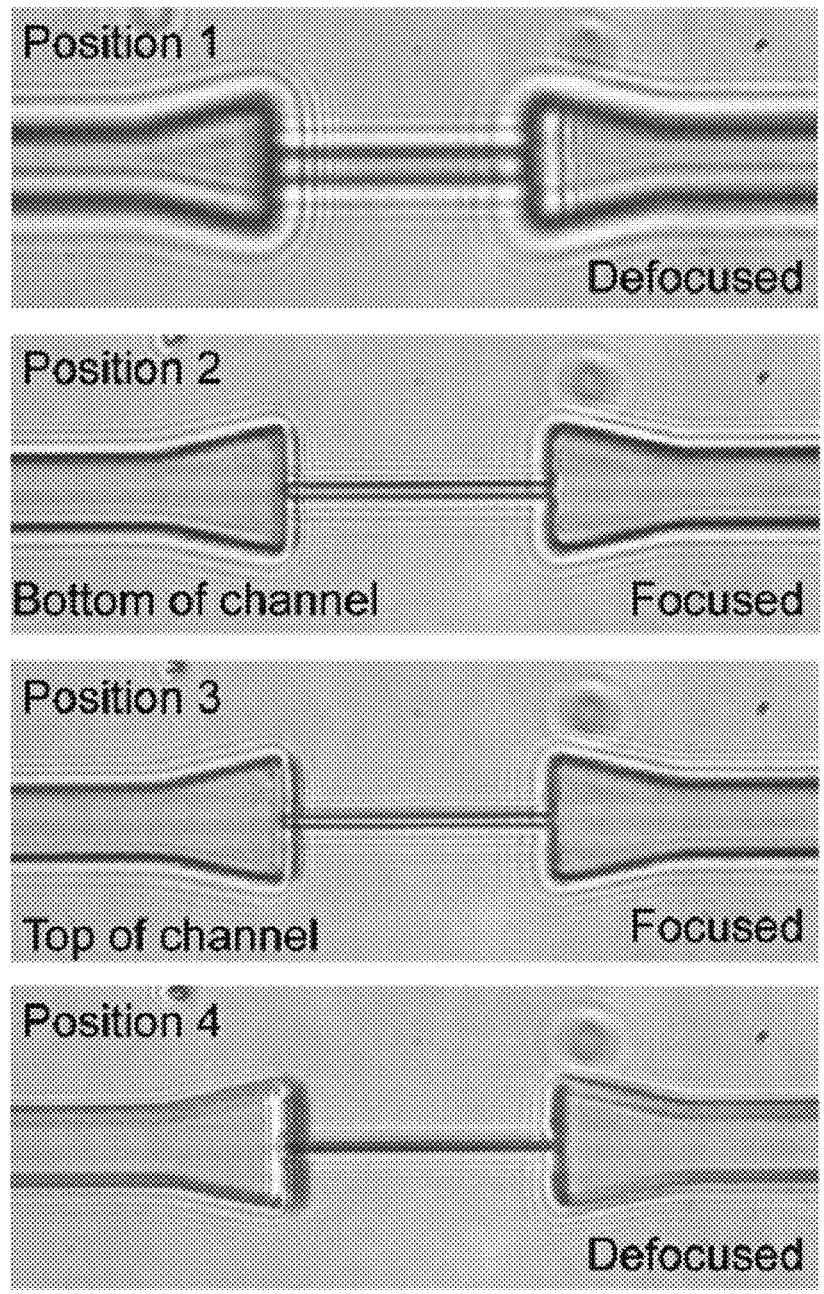
FIG. 7D is a series of images of a channel taken a number of distances between the channel and the high-NA air objective and having different amounts of defocus, in accordance with an embodiment of the disclosure.
Figure 7E:
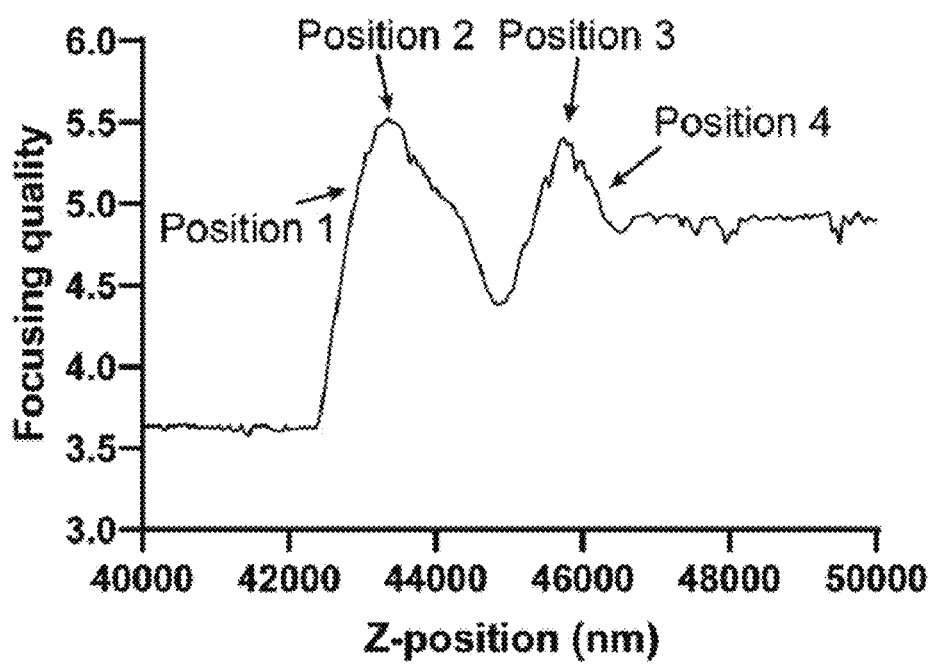
FIG. 7E illustrates an amount of focusing quality at various distances between the channel and the high-NA air objective, in accordance with an embodiment of the disclosure, noting the positions of the images of FIG. 7D.
Figure 16:
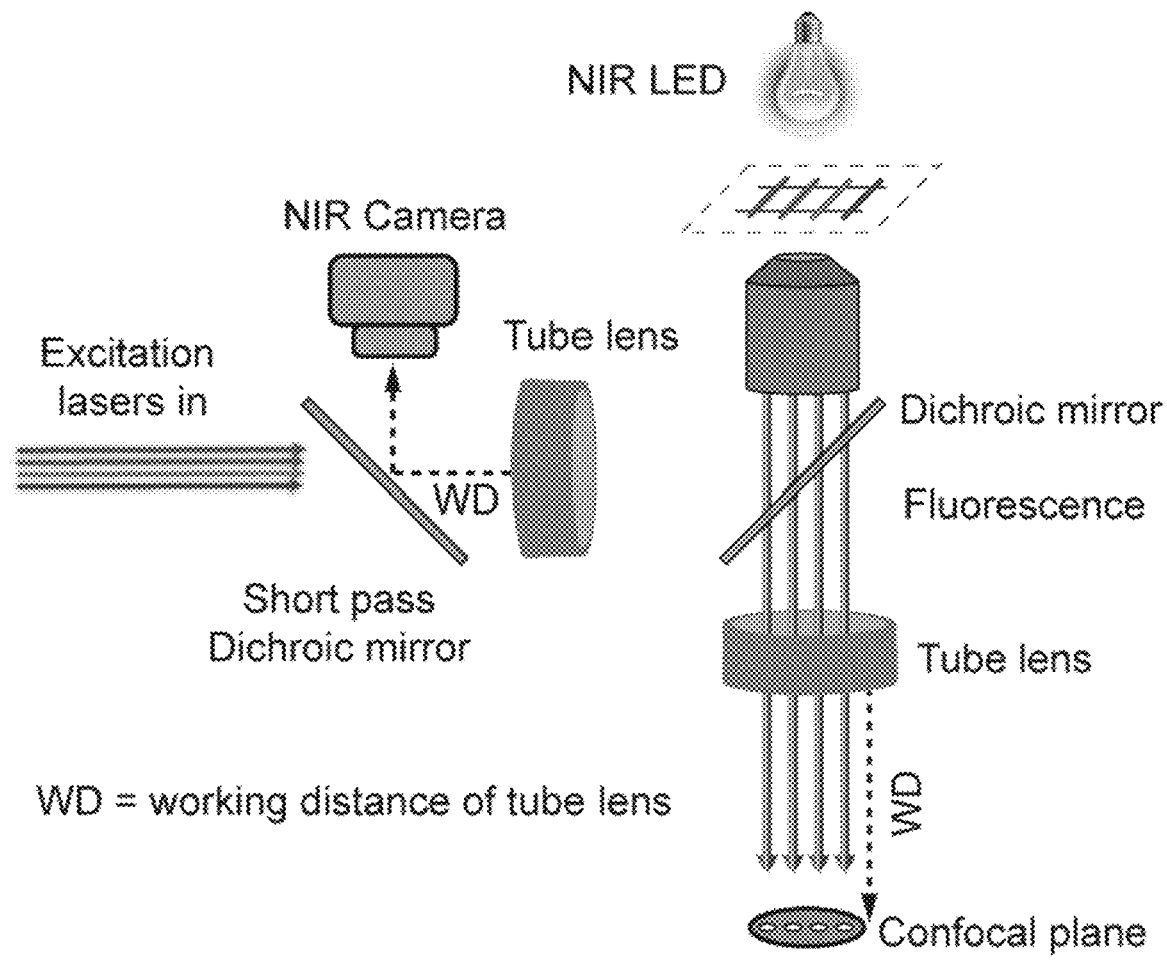
FIG. 16 graphically illustrates the apparatus to achieve auto-focusing by using near-infrared imaging or machine vision together with a high numerical aperture air objective (NA=0.95), in accordance with an embodiment of the present disclosure.

FIG. 7D is a series of images of a channel taken a number of distances from the high-NA air objective and having different amounts of defocus, in accordance with an embodiment of the disclosure. FIG. 7E illustrates an amount of focusing quality at various distances between the channel and the high-NA air objective, in accordance with an embodiment of the disclosure, noting the positions of the images of FIG. 7D. In the pictured embodiment, a focal plane was detected using NIR imaging and a NA 0.95 air objective. FIG. 16 graphically illustrates the apparatus to achieve auto-focusing by using near-infrared imaging or machine vision together with a high numerical aperture air objective (NA=0.95), in accordance with an embodiment of the present disclosure.

As shown, the focal channel includes a constriction. The focusing quality for the constriction was monitored in real time, as shown in FIG. 7E. When the objective was moved up, the focusing quality increased until it reached the first maximum, which indicated the focal plane was at the bottom of constriction channel. With increasing position of objective, the focusing quality dropped and then increased to the second maximum value, which suggest the focal plane was set at the top of constriction channel. The four pictures in FIG. 7D show the real-time imaging, when the high-NA air objective was at the four positions correspondingly.

Figure 7F:
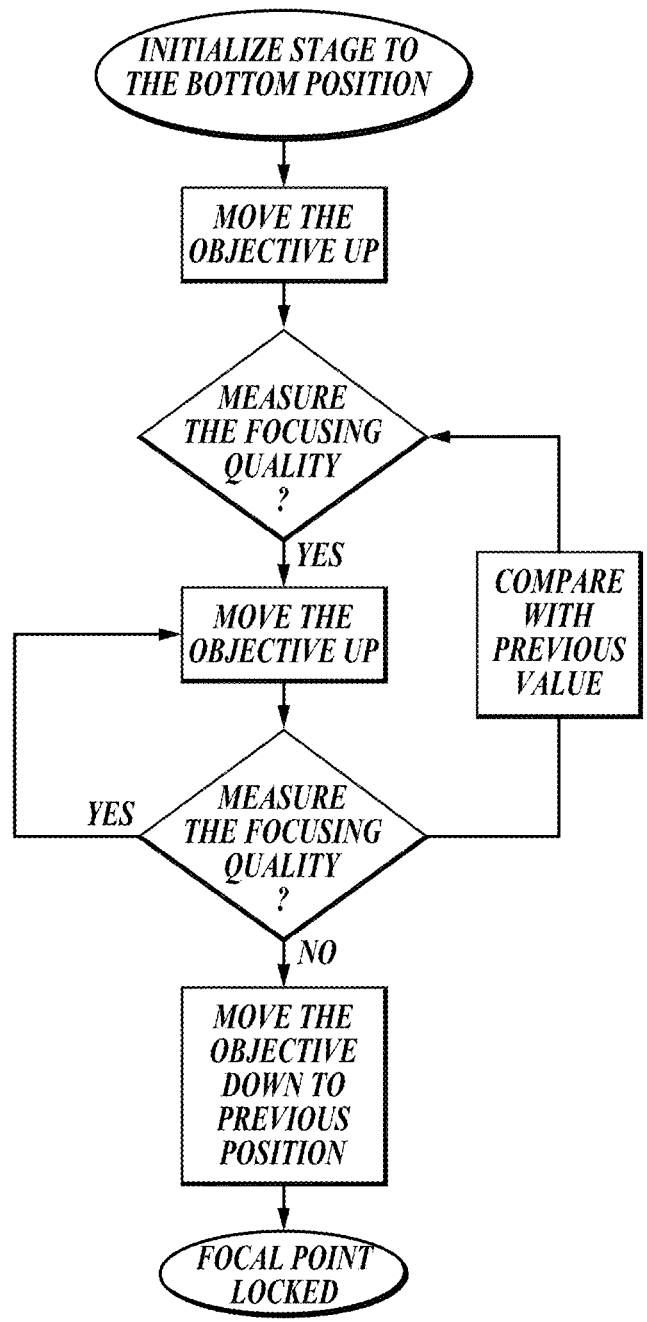
FIG. 7F is a block diagram illustrating a feedback control loop used to set a focal plane using near infrared imaging with a high-NA air objective, in accordance with an embodiment of the disclosure.
Figure 7G:
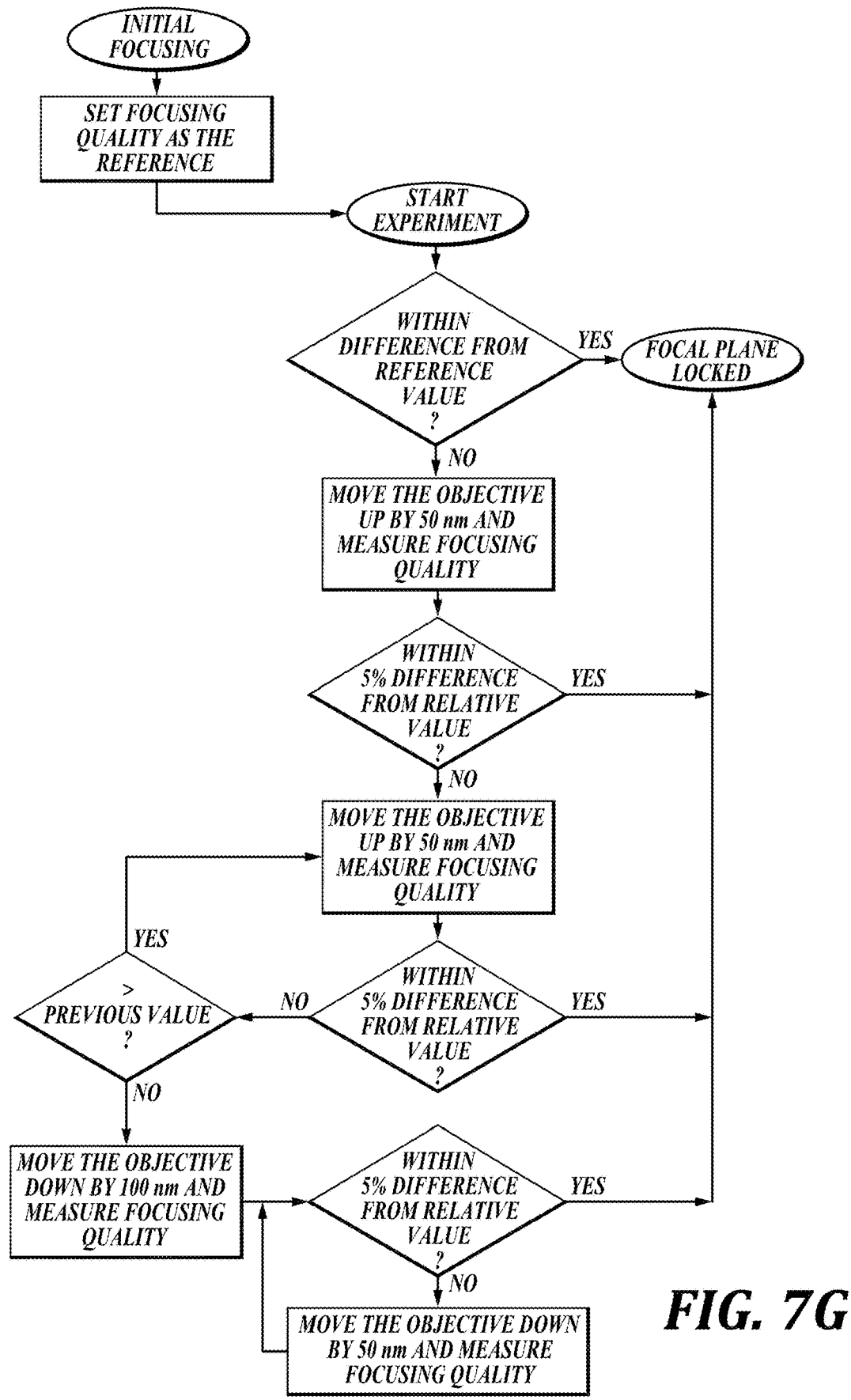
FIG. 7G is another block diagram illustrating a feedback control loop used to perform real-time focusing assisted by near infrared machine vision and a high-NA air objective, in accordance with an embodiment of the disclosure.

FIG. 7F schematically illustrates a feedback control loop used to set a focal plane, in accordance with an embodiment of the disclosure. FIG. 7G is another feedback control loop used to perform real-time focusing assisted by near infrared machine vision through a high-NA air objective, in accordance with an embodiment of the disclosure. The focusing methods schematically illustrated in FIGS. 7F and 7G can be used to achieve focus of the channels.

In an embodiment, the method includes collecting the focused light back reflected from the interrogation with a light collection system, wherein the light collection system comprises an air objective having a numerical aperture in a range of about 0.91 to less than 0.99, or about 0.95.

In an embodiment, the method includes collecting light for generating the image of the imaging area with the camera by collecting light with a light collection system, wherein the light collection system comprises an air objective having a numerical aperture in a range of about 0.91 to less than 0.99, or about 0.95.

In an embodiment, the light is in a range of about 700 nm to about 1.5 µm. In an embodiment, the light is in a range of about 700 nm to about 1100 nm. In an embodiment, the light is in a non-visible wavelength range.

Certain processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

EXAMPLES

Example 1: Multiplexed Single-Particle/Molecule Detection Using Free-Space Lasers and Emission Fiber Bundle This example describes the apparatus that enables single-molecule and single-particle analysis in flow using free space lasers and an emission fiber bundle. This apparatus (e.g. FIG. 6) is configured to detect fluorescence in multiple color channels from different excitation regions or detection windows or portions of the channel that are spatially separated, including two functional modules: excitation module using free-space lasers and detector system using emission fiber bundle and detector modules.

Figure 4:
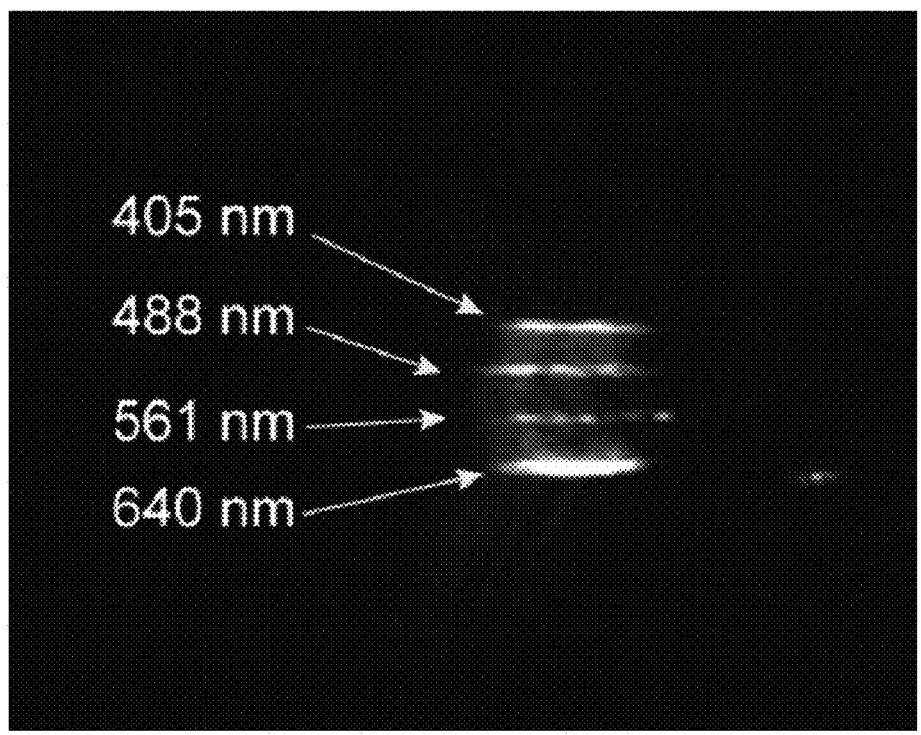
FIG. 4 is an image of a channel of a system, in accordance with an embodiment of the present disclosure.

The excitation module combines and shapes multiple laser beams to the desired profile and spatial pattern (e.g. FIG. 4). The spacing between excitation regions can be adjusted, for example, by a telescope structure, such as two plano-convex lenses (f=75 mm and f=125 mm) conjugated with each other. The laser beams are shaped by a cylindrical lens (f=200 mm) to generate four lines (for the four excitation regions/detection windows/portions of the channel), and thereafter transmitted to the back focal plane of the objective lens by a multi-band dichroic mirror or by a partially reflective mirror. Four laser lines are thus focused on the respective four portions of the microfluidic channel forming four excitation regions or detection windows (FIG. 3B), where particles or molecules labeled with fluorescent dyes flow and interact with the excitation laser illuminations, resulting in fluorescence emitted from each particle or molecule.

Depending on the application, this excitation module can be configured in different ways. For example, four laser lines with the wavelength at 405, 488, 561 and 640 nm, are focused on the microfluidic channel with equal spacing, or alternatively, four laser lines with the wavelength at 488, 488, 561 and 640 nm, are focused on the microfluidic channel with equal spacing, or four laser lines with the wavelength at 488, 405, 640 and 561 nm, are focused on the microfluidic channel with equal spacing, or four laser lines with the wavelength at 355, 405, 488 and 640 nm, are focused on the microfluidic channel with equal spacing. Although equal spacing is generally preferred, in some applications, it can be desirable to have non-equal spacing, which can be easily achieved by adjusting the excitation module. The number of lasers and excitation regions can be easily adjusted, such as expanded to include more laser colors.

The detector system separates and quantitatively measures the fluorescence emitted from the four excitation regions. To collect the four spatially separated fluorescence signals emitted from the particle/molecule as it transits and interacts with the four spatially separated laser lines/excitation regions, we use an emission fiber bundle (e.g. FIG. 5). Each fiber of the fiber bundle collects fluorescence caused by excitation of the particle/molecule by each of the laser line/excitation window, and the fluorescence collected by each fiber can be further separated spectrally and detected by different photodetectors of a detector module (e.g. FIG. 2). Here, fluorescence collected by the objective lens pass through the multi-band dichroic mirror, and focused by a tube lens. A microfabricated array of four slits is precisely placed at the focal plane of tube lens, in the way that only light from the desired portions of the channel can pass through the slits (e.g. FIG. 5A). Because this slit array is placed at the proximal end of the fiber bundle (e.g. FIG. 5A), the four closely spaced fluorescence signals from the four excitation regions/laser lines are thus separated through the four fibers of the fiber bundle.

The fluorescence signals from each of the fiber of the fiber bundle is then further separated spectrally, such as into several color bands, by a series of dichroic mirrors and band pass filters in a detector module (e.g. FIG. 2). Using an aspherical lens (f=7.8 mm), the fluorescence corresponding to a spectral region or color band is then focused onto a photodetector, such as an avalanche photodiode or single-photon counting module, where photons are converted to electric signals. Using high-frequency counting devices, the number of photons in a certain time interval is counted, and stored in binary files on the computer in communication with this apparatus, for further analyses as described in following examples.

Example 2: Use of High Numerical Aperture Air Objective for Ultra-High Sensitivity and Robust Detection of Single Molecules and Particles Flowing in a Planar Microfluidic Channel with Line Illumination and Confocal Detection This example describes the apparatus and method for ultra-high sensitivity and efficiency detection of single molecules flowing in a planar microfluidic channel with line confocal detection. For single particles flowing in the planar microfluidic chip or channel, the apparatus and method provides the same ultra-high levels of sensitivity and efficiency as that described for single molecules flowing through the planar microfluidic channel.

Single-molecule flow analysis is often hindered by the lack of sensitivity, throughput, and robustness. To address these challenges, the apparatus described in Example 1 is configured with a high numerical aperture air objective and a microfluidic device with planar channels. To ensure ultra-high single-molecule detection sensitivity, it is critical to collect as much light signal as possible, and in our apparatus, we used a 0.95 NA air objective lens. Although the NA of objectives can be higher than 1.0 when an immersion medium (e.g. oil or water) is used, such "wet" objectives greatly reduce the robustness of the system, is much more prone to vibration, drifts, and evaporation of the medium. It is also difficult to switch the channel of interest from one to another by scanning from one planar channel to another on the microfluidic chip with "wet" objectives, because such "wet" objectives often have difficulty scanning over longer distances because of smearing of the immersion medium, thus resulting in a much-lowered throughput and more complicated instrument design.

In addition to the use of high NA air objective, planar microfluidic channel is another essential component to enable the ultra-high sensitivity and efficiency of single-molecule flow analysis. High NA objectives often require a very limited working distance (e.g. 170 μm for 40X/0.95 NA objective used in this example), so usually only planar substrates or chips between the objective and sample is compatible with this working distance. Other widely used flow configurations, such as micro capillaries, often have walls thicker than this very limited working distance, and is thus not suitable to use with high NA objectives. Additionally, use of planar micro fluidic channels eliminates spherical/cylindrical aberrations associated with the use of a round cylindrically-shaped capillary, another important factor that influence the collection efficiency and focusing quality of high-NA objectives. Furthermore, microfluidic chips or devices can facilitate the creation of channels with different widths or heights along the length of the channel (e.g., a constriction or a step change in width and/or height of the channel) to facilitate the manipulation, detection, analyses, determination, and/or identification of the biological nanoparticles and/or molecules in transit. Microfluidic chips, through methods of microfabrication, can allow for the creation of channels with cross sections that are non-spherical or non-square (e.g., rectangular), which can facilitate the detection, analyses, determination, and/or identification of the biological nanoparticles and/or molecules in transit. Microfluidic chips can be formed by bonding to a coverslip (e.g. made of glass or plastic) of a desirable thickness as well as having a desirable material property (e.g. refractive index) to enhance compatibility with high-NA air objective for maximal light collection and to facilitate the manipulation, detection, analyses, determination, and/or identification of the biological nanoparticles and/or single molecules in transit. Finally, microfluidic devices make possible the generation of many channels on the same device (e.g. 96 or 384 channels for 96 or 384 samples) for high-throughput analysis of a larger number of samples (e.g. 96 or 384 in a format compatible with multi-channel pipettors). Microfluidic chips provide an attractive and versatile platform for use with a high-NA air objective to achieve the ultra-high sensitivity and efficiency analysis of single molecules and/or particles.

Illuminating the channel with a tightly focused laser line that covers the entire cross section of the channel (e.g. FIG. 3B and FIG. 4), as described in this Example, ensures every molecule that passes through the channel is illuminated and excited with near hundred percent probability. Confocal detection geometry using aperture (e.g. FIG. 5A) improves detection sensitivity by increasing the signal-to-noise ratio and by minimizing cross talk between different excitation regions or laser lines. Our apparatus that uses a high-NA air objective, line illumination using tightly focused laser lines, and confocal detection geometry ensures every molecule or particle that flow through the channel is detected with high efficiency and high sensitivity and throughput. This contrasts with existing technologies, for example, when a focused laser spot (not a tightly focused laser line) is used to interrogate some or a small portion of the molecules that flow through the channel, because the laser spot is only micrometers in diameter (e.g. 5 microns) and cannot illuminate well the entire cross section of a capillary with a much larger diameter (e.g. 100 microns); a 5 micron diameter laser spot at the center of a 100-um diameter capillary represents only about 1/400 of the cross section of channel and where the molecules or particles flow, which would translate into about 1 in 400 molecules in flow detected even if assuming each molecule that flow through the laser spot would be detected. To solve this problem, in our apparatus the laser beams are shaped by a cylindrical lens (f=200 mm) to form a set of laser lines that are focused at the center of the constriction of our planar microfluidic channel to illuminate the entire cross section of channel (e.g. FIG. 4), so every molecule in flow can interact with the laser excitations. Furthermore, the confocal geometry, either via the openings of the optical fibers that act as apertures or with slits (FIG. 5A) enhances the detection signal-to-noise from every molecule in flow, resulting in an ultra-high detection efficiency (number of single molecules detected over the number of single molecules that flow through the channel).

The next Example 3 will describe in more detail the detection efficiency achieved using the apparatus described in this Example 2. In addition to extremely high single-molecule detection efficiency as detailed in the next Example 3, the use of a high-NA air objective, in contrast with an oil or water immersion objective, provides highly stable and robust detection of single molecules in flow. FIG. 14 shows a blank sample (PBS buffer) running for 2000 sec, with no change in background noise at all, indicating there is no instability or variation associated with the high-NA air objective, which is usually not the case when using an oil or water immersion objective.

Example 3: Achieving High Detection Efficiency of Single Molecules Under Flow

This example shows the ability to detect single molecules under flow with extremely high detection efficiency using the apparatus described in Examples 1 and 2 (i.e. 0.95 NA air objective and emission fiber bundle).

Detection efficiency of single molecules and/or particles under flow is the number of molecules/particles detected versus the number of molecules/particles that flow through the channel (e.g. through the excitation regions). For a given type of fluorescent molecule/particle, this metric is a direct indicator of the sensitivity of flow analyzer apparatus, and thus an important metric to evaluate the sensitivity and performance of the apparatus or instrument.

In this example, we apply the principle of single-molecule counting to determine the detection efficiency. When measuring a population of single molecules, instead of having identical signal from each molecule, we always obtain a distribution of signals. The variation of these signals is determined by both the intrinsic properties of the molecule (e.g. photon emission probability or bleaching probability) and extrinsic factors such as from the measurement process itself. Our studies show such a distribution can follow a lognormal distribution. FIGS. 12B and 12C show the distribution of signal-to-noise ratio (SNR) for single R-phycoerythrin (PE) and Alexa 647, respectively. After fitting to a lognormal distribution, a statistical metric (e.g. coefficient of determination, R2) is applied to quantify the fitting quality. When the R2 value is higher than a certain threshold (e.g. 0.98), we can conclude the distribution of single-molecule SNR follows a lognormal model.

In signal analysis, limit-of-detection (LOD) is often defined as the weakest signal that can be distinguished from background with SNR of 3. Using the same definition and using the results of lognormal fitting, we can calculate the cumulative distribution when SNR is above LOD. Using this analysis, FIGS. 12B and 12C show the detection efficiency of single PE and Alexa647 in flow is over 99% (e.g. 99.5% and 99.8%, respectively).

Example 4: Self-Corrected Flow Analysis

This example describes a method to identify a population of biological particles with specific flow information linked to each particle using self-corrected measurement of fluorescence in microfluidic channel.

Biological nanoparticles are typically described by a physical and/or biological parameter. For example, extracellular vesicles (EVs) are lipid bilayer-delimited particles released from cells, and can be identified by the staining with membrane dyes, which can exhibit strong fluorescence when inserted in a hydrophobic environment (e.g. lipid bilayer). Successful analyses (e.g. multi-color co-localization, determination of detection efficiency, measurement of flow profile, and the estimation of the concentration) of EVs in flow require the detection of each particle and the tagging of the particle with its own flow information (e.g. velocity). Using the apparatus described in the above Examples, we describe the tagging of each detected particle with its own flow information (e.g. velocity). Depending on the specific markers used to detect EVs, we can achieve such tagging in different ways. Below are four examples:

1) EVs are stained with the di-8-ANEPPS membrane dye and sequentially excited by two 488-nm laser lines or excitation regions: Briefly, 199 µL of EV solution with the concentration of $5 \times 10^9$ particles/mL was mixed with 1 µL of 20 µM di-8-ANEPPS dissolved in DMSO, and incubated for 30 min at room temperature. After incubation, this sample was introduced into a reservoir in fluidic communication with a microfluidic channel having a constriction (2×2×125 µm); flow was driven by gravity and surface tension. Two laser lines with the wavelength of 488 nm (20 mW) were focused onto this portion of the microfluidic channel, to generate two excitation regions or detection windows (FIG. 9A) spaced by 10 µm. When an EV stained with di-8-ANEPPS flows through these two different excitation regions or detection windows, two fluorescence signals (in the wavelength range of 575-625 nm) having similar intensities were observed sequentially, due to the nature of laminar flow in microfluidic channels. This particle was thus detected and tagged or assigned with the corresponding flow information, which, in this example, was the transit time between the two 488-nm laser excitation regions, and thus, velocity knowing the spacing between the two excitation regions. This method can be applied similarly to the analysis of single molecules, to the tagging of each detected molecule with its own flow information (e.g. transit time and/or velocity).

2) EVs are stained with di-8-ANEPPS and sequentially excited by a 405-nm laser and a 488-nm laser: Briefly, 199 µL of EV solution with the concentration of $5 \times 10^9$ particles/mL was mixed with 1 µL of 20 µM di-8-ANEPPS dissolved in DMSO, and incubated for 30 min at room temperature. After incubation, this sample was introduced into a reservoir in fluidic communication with a microfluidic channel having a constriction (2×2×125 µm); flow was driven by gravity and/or surface tension. Because of the absorption spectrum of di-8-ANEPPS (FIG. 9B), we focused a 405-nm laser output and a 488-nm laser output onto respective portions of the microchannel, with powers of 100 mW and 20 mW, respectively, to generate two excitation regions or detection windows (FIG. 9B) spaced by 10 µm. When an EV stained with di-8-ANEPPS flowed through these two different excitation regions, two fluorescence signals collected between 575 and 625 nm wavelength range with similar intensities were observed sequentially, due to the nature of laminar flow in microfluidic channels and the difference in excitation laser powers used. If similar laser excitation powers were used, then two fluorescence signals having a known difference in intensities were observed sequentially. This particle was thus detected and tagged or assigned with the corresponding flow information, which, in this example, was the transit time between the two laser excitation regions, and thus, velocity knowing the spacing between the two excitation regions.

3) EVs are stained with the mixture of two structurally similar membrane dyes, DiO and DiD, and sequentially interrogated by a 488-nm laser and a 640-nm laser: Briefly, 396 µL of particle solution with the concentration of $5 \times 10^9$ EVs/mL was mixed with 2 µL of 20 µM DiO (in DMSO) and 2 µL of 20 µM DiD (in DMSO), and incubated for 30 min at room temperature. After incubation, this sample was introduced into a reservoir in fluidic communication with a microfluidic channel having a constriction (2×2×125 µm); flow was driven by gravity and/or surface tension. Because of the absorption spectrum of DiO and DiD (FIG. 9C), a 488-nm laser output and a 640-nm laser output were focused onto the respective portions of the microfluidic channel, to generate two excitation regions or detection windows separated by 10 µm. When a particle stained with DiO and DiD flowed through these two laser excitation regions, two fluorescence signals were collected at between 495 nm to 515 nm and at between 660 nm to 700 nm, respectively. This particle was thus detected and tagged or assigned with the corresponding flow information, which, in this example, was the transit time between the two laser lines, and thus, velocity knowing the spacing between the two excitation regions.

4) Considering the debris of lipid membrane or solid lipid particles may also be labelled with membrane dyes, intact EVs can be detected by the co-staining of a membrane dye (e.g. DiD) and a volumetric dye (e.g. Calcein-AM), and sequentially analyzed by a 488-nm laser line and a 640-nm laser line (FIG. 9D): Briefly, 396 µL of particle solution with the concentration of $5 \times 10^9$ particles/mL was mixed with 2 µL of 20 µM DiD (in DMSO) and 2 µL of 2 mM Calcein-AM (in DMSO), and incubated for 30 min at 37° C. in dark. After incubation, this sample was introduced into the microfluidic channel with a constriction (2×2×125 µm). Because of the absorption spectrum of Calcein-AM and DiD (FIG. 9D), a 488-nm laser output and a 640-nm laser output were focused onto the microfluidic channel, with the power of 20 mW and 10 mW, respectively, to generate two detection windows or excitation regions separated by 10 µm. When an EV stained with Calcein-AM and DiD flowed through these two laser excitation regions, two fluorescence signals were collected at between 495 nm to 515 nm and at between 660 nm to 700 nm, respectively. This EV was thus detected and tagged or assigned with the corresponding flow information, which, in this example, was the transit time between the two laser lines, and thus, velocity knowing the spacing between the two excitation regions.

Tagging or assigning the detected particle or molecule with the corresponding flow information (e.g. transit time and/or velocity) allows for self-corrected flow analysis described in this example and in later examples. This method can be applied similarly to the analysis of single molecules or to other biological nanoparticles or to other nanoscale entities, for the tagging of each detected molecule/nanoparticle/entity with its own flow information (e.g. transit time and/or velocity).

Example 5: Multi-Color Co-Localization Using Self-Corrected Flow Analysis

This example describes the co-localization of multiple markers (e.g. different dye-tagged antibodies and/or membrane dyes) on extracellular vesicles (EVs) using self-corrected flow analysis. This method can be applied similarly to the analysis of single molecules or to other biological nanoparticles or to other nanoscale entities Accurate colocalization of biomarkers expressed on the same biological nanoparticle is the foundation of many important applications (e.g. immuno-phenotyping for identifying sub-types of EVs). When multiple particles in close proximity in the flow stream pass through the excitation regions or detection windows, it can be challenging to correctly assign signals observed at different detection windows or from different excitation regions to a given particle, because particles may flow with a broad range of velocities in microfluidic channel due to the laminar nature of the microfluidic flow environment and the parabolic flow profile. Using self-corrected flow analysis described in the above example, where a biomarker (e.g. membrane dye or a given dye-tagged antibody) is measured twice at two excitation regions or detection windows, a particle or molecule is detected and tagged with its flow information (i.e. linear velocity and/or transit time). Because of the nature of laminar flow in microfluidic systems, searching for the presence and/or absence of other biomarkers (e.g. other dye tagged antibodies present on the EV) is directed to a very narrow time window (e.g. +0.1 ms) at a specific position (before or after a specific transit time; see FIG. 8), and thus the use of self-corrected flow analysis greatly improves the accuracy of co-localization as shown in FIG. 10.

In this example, human semen exosomes (sEVs) were used and co-stained with CD63-A647, CD81-PE/CF594, and di-8-ANEPPS. Briefly, 490 µL of sEVs solution with the concentration of 5×10⁹ particles/mL was mixed with 5 µL of 2 µg/mL CD63-A647 and 2.5 µL of CD81-PE/CF594 (100-fold dilution of the stock solution), and incubated in dark for 60 min at room temperature. Then, 2.5 µL of 20 µM di-8-ANEPPS (dissolved in DMSO) was added to the sample, which was further incubated for another 30 min. After incubation, this sample was introduced into a microfluidic channel having a constriction (2×2×125 µm) where detection occurred. To perform the multicolor colocalization using self-corrected flow analysis, four laser lines (640, 561, 488 and 405 nm, in this sequence) were focused onto portions of the microfluidic channel to generate four excitation regions or detection windows sequentially along the direction of flow. The first two laser lines (405 nm, 100 mW and 488 nm, 20 mW) with the same set of emission filter (600/50 nm) were used to measure the fluorescence from di-8-ANEPPS (FIG. 9B).

Figure 10A:
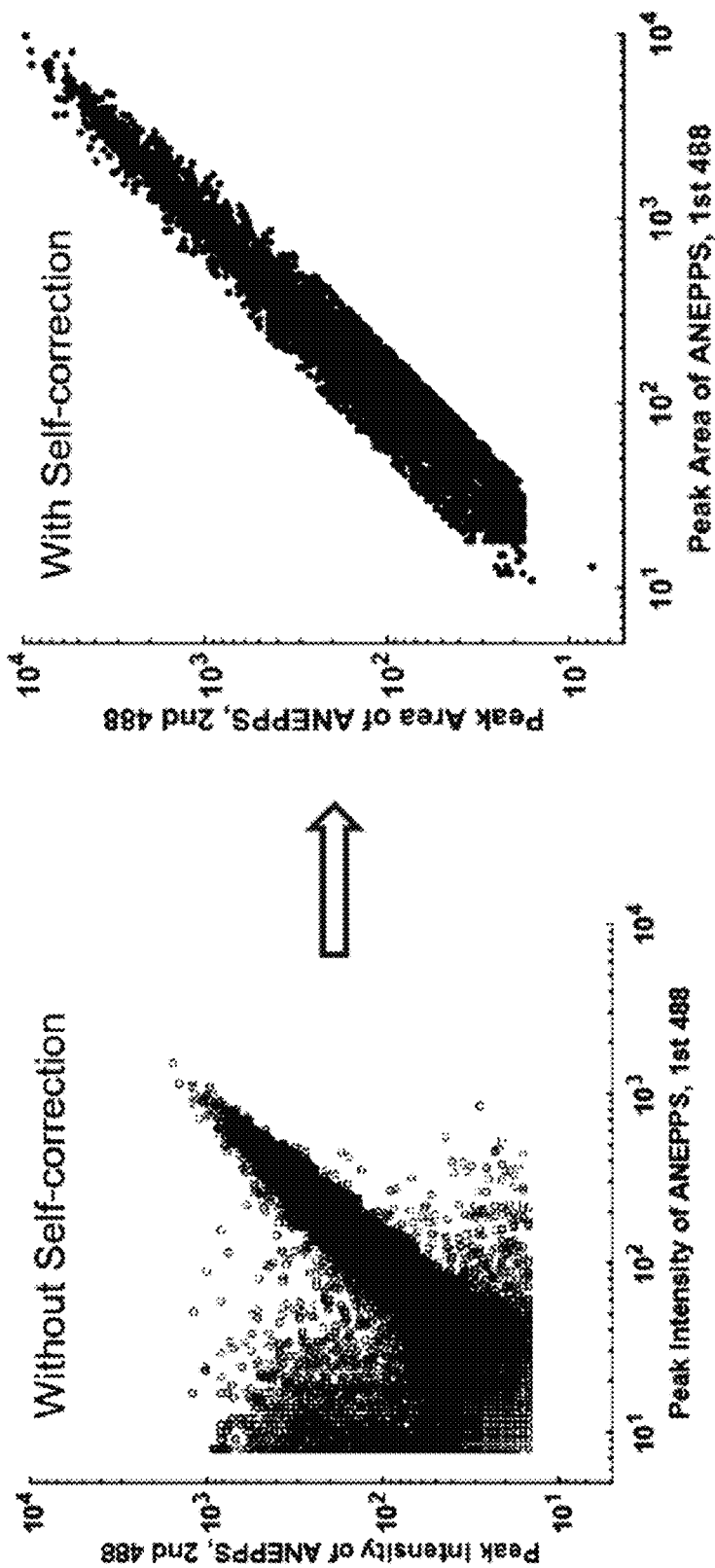
FIG. 10A shows (left) a comparison between a peak emission intensity of a dye associated with particles passing through portions of an interrogation window of a fluidic device, in accordance with an embodiment of the present disclosure, illuminated by a first light source and a second source, and (right) a comparison between a peak emission area of a dye associated with particles passing through an interrogation of a fluidic device, in accordance with an embodiment of the present disclosure, illuminated by a first light source and a second source and corrected with methods of the present disclosure.
Figure 10B:
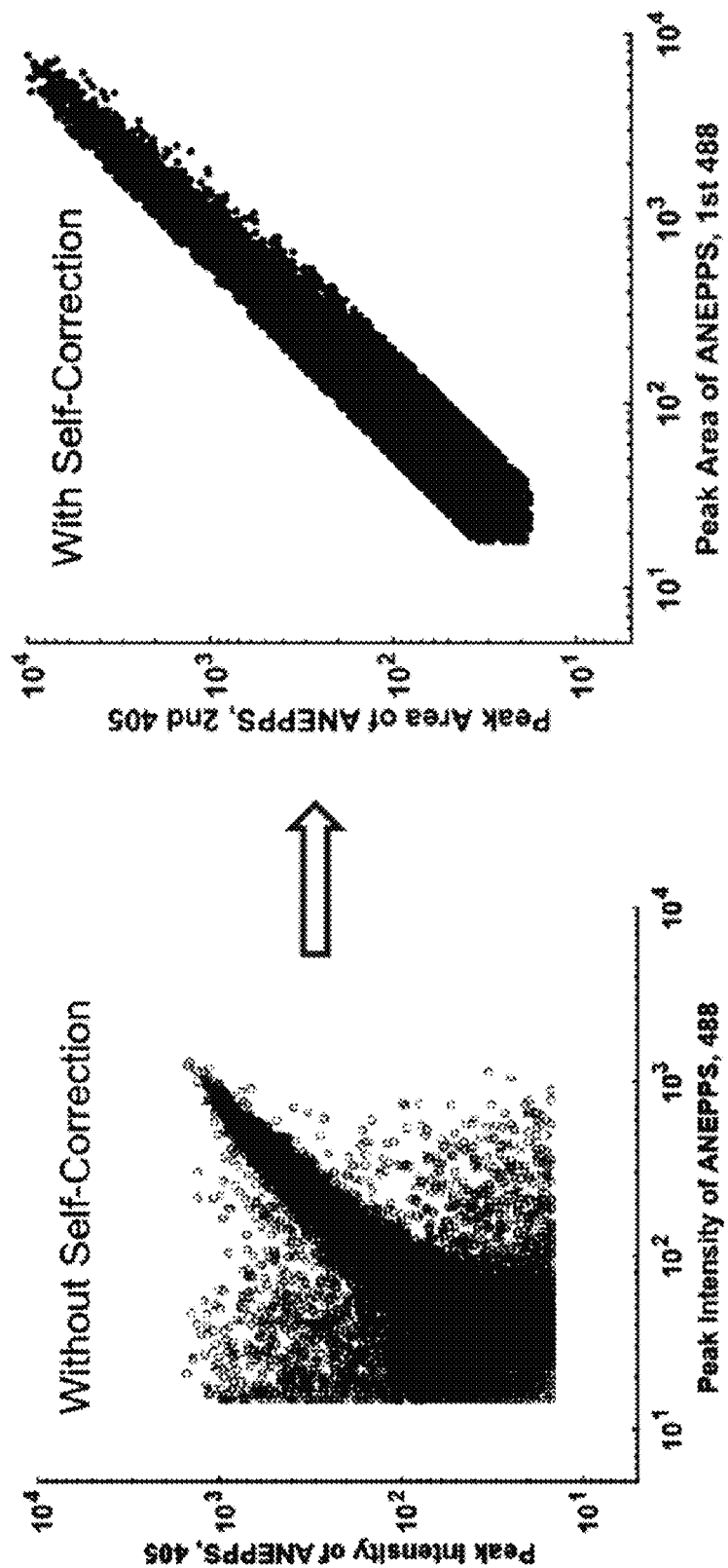
FIG. 10B shows (left) a comparison between a peak emission intensity of a dye associated with particles passing through portions of an interrogation window of a fluidic device, in accordance with an embodiment of the present disclosure, illuminated by a first light source and a second source, and (right) a comparison between a peak emission area of a dye associated with particles passing through an interrogation of a fluidic device, in accordance with an embodiment of the present disclosure, illuminated by a first light source and a second source and corrected with methods of the present disclosure.

The first step was to detect and tag sEVs stained with di-8-ANEPPS with their respective flow information (i.e. transit time between 405-nm and 488-nm laser lines). This step can be validated using the two membrane dye signals in the absence and presence of self-correction, as shown in FIG. 10. The fluorescence of di-8-ANEPPS excited by 405 nm from every particle stained with this membrane dye should be colocalized with the corresponding fluorescence excited by 488-nm laser, with an efficiency close to 100%. Additionally, the intensity of these two signals should be similar (i.e. +10% difference) due to the power setting (i.e. 100 mW for 405-nm laser, and 20 mW for 488-nm laser) used in this example. The left panel in FIG. 10B shows the colocalized events using auto-correlation function, which computes a "most likely" time window to find colocalized events. Many events colocalized using this statistical method were false positives, because of the mismatched signal intensities in these two channels. After applying the self-corrected flow analysis, the scatter plot (right panel in FIG. 10B) greatly narrowed, indicating most false-positive events were removed. With a slightly different configuration of the apparatus, FIG. 10A shows similar improvement was observed when two 488-nm laser lines were used to perform the self-corrected flow analysis.

Besides greatly reducing or eliminating the false-positive rate, tagging each biological nanoparticle or molecule with a specific transit time and/or velocity, which can be a near constant value for each two adjacent laser excitation regions of the same or similar spacing, enables precise colocalization of multiple biomarkers. Briefly, a specific sEV stained with di-8-ANEPPS was first detected and tagged as shown in FIG. 14A with a specific transit time (t) between 405- and 488-nm laser lines or excitation regions. The self-corrected flow analysis algorithm searches the presence of signals excited by another laser (e.g. 561-nm laser line) within a very narrow (e.g. ±0.1 ms) time window centered around that transit time between 488-nm and 561-nm laser lines (t), to find sEVs colocalized with CD81-PE/CF594. Another searching window at the location of the transit time between 488- and 640-nm lasers (2t), is then applied to find sEVs colocalized with CD63-Alexa647. Similar searching processes can be iterated when more markers and detection windows or excitation regions are examined (FIG. 8). After processing the data with self-corrected flow analysis, different subpopulations of sEVs can be determined based on the combination of different biomarkers as measured by the binding of the combination of corresponding antibodies against the corresponding biomarkers (e.g. immune-phenotype or immuno-phenotype). In this example, the four subpopulations of sEV were: CD81⁺ is 3.7%, CD63⁺ is 32.9%, CD81⁺/CD63⁺ is 1.8%, and CD81⁻/CD63⁻ is 65.2% (FIG. 14B).

Example 6: Determining Volumetric Flow Rate Using Single Particle/Molecule Transit Times This example describes the determination of the volumetric flow rate using the transit times of single particles/molecules.

Knowing the volumetric flow rate in microfluidic based analysis is often required to determine the volume of sample that has been analyzed during an experiment. The absolute concentration of single particles/molecules can thus be measured based on the counts of analytes/molecules/nanoparticles and the analyzed volume. Volumetric flow rate is also a useful parameter to evaluate the throughput and consumption of samples. Although important, direct measurement of volumetric flow rate is often challenging in microfluidic environment, especially when the volumetric flow rate is extremely low (e.g. pL-nL per sec), due to the ultra-small volumes of sample being interrogated by the excitation regions.

This example describes the measurement of volumetric flow rate using the transit time of each analyte/molecule/particle that flow through the laser lines or excitation regions, based on the fact that the flow is laminar in this microfluidic environment. Consequently, the linear velocity of each particle/molecule can be calculated, knowing the distance between these laser lines or excitation regions.

Because this specific channel geometry (i.e. 2×2×150 µm) is close to a pipe with a circular cross section with a length substantially longer than its diameter, the flow profile can be approximated by a parabolic flow profile in pipe with a cylindrical geometry. Based on this simplifying assumption, we can convert the linear velocities of single particles/molecules to the volumetric flow rate of this sample. Briefly, we first calculate the arithmetic mean of linear velocities (($\bar{u}_{obs}$) that we observed. In laminar flow, the volume ($\Delta V$) that pass through the cross section in each laminar during unit time is, $$\Delta V = u(r) \cdot 2\pi r \cdot \Delta r \qquad \text{(eq. 1)}.$$

The number of particles with the same velocity (i.e. u(r)) that passes through the cross section during unit time is, $$N(r) = C\frac{dQ}{dr} = Cu(r)2\pi r, \qquad \text{(eq. 2)}$$

where C is the concentration of particles. The observed average linear velocity is thus, $$\bar{u}_{obs} = \frac{\int_0^R N(r)u(r)dr}{N} = \frac{\int_0^R Cu^2(r)2\pi r dr}{N}, \qquad \text{(eq. 3)}$$

in which r is the radial position at the cross section. In parabolic flow, it is known that the linear velocity profile follows, $$u(r) = u_{max}\left(1 - \frac{r^2}{R^2}\right). \qquad \text{(eq. 4)}$$

where $u_{max}$ is the linear velocity at the center of flow, the fastest laminar in parabolic profile, and R is the radius of channel (e.g. 1 um in this example), so eq. 3 can be reorganized to $$\bar{u}_{obs} = \frac{C \int_0^R \left(u_{max}\left(1 - \frac{r^2}{R^2}\right)\right)^2 2\pi r dr}{\frac{u_{max}}{2} \cdot \pi R^2} = \frac{2}{3} u_{max}. \quad \text{(eq. 5)}$$

Because in parabolic flow, it is known that the volumetric flow rate (Q) can be $$Q = \frac{1}{2} u_{max} \pi R^2, \quad \text{(eq. 6)}$$

the relationship between $\bar{u}_{obs}$ and V (FIG. 11A) is thus, $$Q = \frac{3}{4} \bar{u}_{obs} \pi R^2. \quad \text{(eq. 7)}$$

In summary, because we can obtain $\bar{u}_{obs}$ and the area of channel cross section, we can measure the volumetric flow rate using eq. 7 (FIG. 11A). This analysis is a first approximation, and to achieve a more precise description, it is straightforward to account for the precise cross section geometry and the overall geometry of the microfluidic channel. This example shows a new method for measuring volumetric flow rate by using the measured single particle/molecule transit times/velocities.

Example 7: Determining Particle/Molecule Concentration

This example describes the method that can accurately measure the absolute concentration of particle/molecule without the requirement of any external calibration.

A direct application of the measurement of volumetric flow rate, as described in Example 6, is to determine concentration of analytes (e.g. particles and/or molecules). Briefly, using self-corrected flow analysis, a population of particles that flow through the excitation regions or detection windows is enumerated. Because of the ultra-high sensitivity of our instrument, all particles stained with a specific marker (e.g. di-8-ANEPPS in this example) were counted (N). Knowing the volumetric flow rate (Q) determined from the measured linear velocities/transit times of individual particles (FIG. 11A) and the experimental measurement time (t), the analyzed volume (V) is determined using V=Qt, so the concentration of analytes (C) can be calculated: C=N/V=N/(Qt).

In the experiment in this example, a sample of human semen exosome (sEV) was first diluted 1000 fold, by adding 1 µL of stock solution to 999 µL of PBS buffer (pH=7.2). 199 µL of the diluted sample was then stained with 1 L of 20 µM di-8-ANEPPS dissolved in DMSO, and incubated for 30 min at room temperature. A 405-nm laser line (100 mW) and a 488-nm laser line (20 mW) that were spaced by 10.7 µm were used to detect the fluorescence of this membrane dye. After incubation, 10 µL of the labeled sEV was introduced into a microfluidic channel having a constriction (with a dimension of 2 µm width×2 µm height×125 µm long), onto which the laser beams were focused into lines to illuminate the entire cross section of the channel constriction. The data acquisition was started after loading the sample for 3 min, and it took 300 sec for one experimental measurement. FIG. 11B shows the measured concentration of sEV with 35 replications.

To further demonstrate the robustness of this method, the same sEV sample was diluted to generate a series of concentrations ($1 \times 10^7$ to $1 \times 10^{10}$ particles/mL), each of which was measured using the same method described above. For samples with lower concentrations, the data acquisition was performed for longer periods of time to collect enough data points. For each concentration, at least 3 replications were performed. FIG. 15 shows the frequency of detected sEVs versus the dilution ratio, and the measured concentration versus the calculated concentration, both of which show a linear relationship between the measured concentration and dilution ratio across at least 3 orders of magnitude. These results indicate the measurement of the concentration of sEVs was highly robust.

Example 8: Auto-Focusing Using Near-Ir Imaging and High Numerical Aperture Air Objective This example describes the apparatus and method that are used to determine and maintain the correct focal position before and during the experiment, respectively.

The quality of single particle/molecule flow analysis depends on how the microfluidic channel is focused with respect to the objective for two reasons: 1) Setting the focal plane at the center will ensure best quality of excitation, so all the molecule flowing in the channel can be interrogated by the laser beams. 2) It also influences the efficiency of collecting fluorescence. Shifting the focal plane from the desired position by even 1 µm can disrupt the measurement. It is preferred to automatically determine and set the focal plane at the center of microfluidic channel before each experiment, because of the improved throughput and robustness offered by automation. Additionally, auto-focusing method will eliminate the user-to-user variation induced by a manual process, and thus improve the quality of measurement.

In this example, the apparatus of single-molecule/particle flow analyzer was configured to enable the auto-focusing assisted by near-IR (NIR) machine vision. Illumination with NIR light was used to minimize the interface with the line-confocal fluorescence measurement, which mostly resides within the visible light spectral wavelength region. The apparatus as shown in FIG. 16 consists of a NIR LED (center wavelength at 870 nm), the microfluidic device for flow analysis, a high-NA air objective mounted on a Z-dimensional stage, a multi-band dichroic mirror, a tube lens, a short-pass dichroic mirror, and a NIR camera. Briefly, the NIR light illuminating the microfluidic channel is collected by the high-NA air objective (40X/0.95NA), reflected by the first dichroic mirror, and then focused by the tube lens. The NIR beam is steered by a short-pass dichroic, and finally the image is projected onto the sensor of the camera.

When the objective was moved up and down, a series of pictures were recorded at each position (FIG. 7D), with the microfluidic channel in focus or out of focus. An edge detection filter is applied to all these images to find the boundary of the center channel, so the contrast of this channel can be measured. The focusing quality is thus defined using this contrast value; higher contrast suggests the detection channel is in better focus. FIG. 7D shows the change in focusing quality as a function of the position of objective with respect to the channel, and the two peaks indicate the bottom (Position 2) and top (Position 3) of the channel was in focus, respectively. Knowing the position of these two peaks, the center of the channel can be determined, and the objective is moved so the focus is moved to that position accordingly. FIG. 7F shows the feed-back control loop to realize this auto-focusing method assisted by NIR machine vision using a high-NA air objective.

After the data acquisition is started, it is also important to maintain the focal plane at the desired position, to minimize any fluctuation of SNR resulting from vibrations and/or thermal expansion of the microfluidic chip and/or other factors that might cause drift or fluctuation of the apparatus. In this example, the same auto-focusing mechanism assisted by NIR machine vision is applied to lock the focal plane during the experiments. Because the NIR light source (870±25 nm) does not interfere with fluorescence detection, this autofocusing scheme can be used with the single-molecule/particle flow experiments in real time. FIG. 7F shows the feedback control mechanism of this process. Briefly, when the focal plane is initially set and locked before the experiment, the corresponding focusing quality is recorded as a reference value. After the experiment started, a NIR image of the chip was captured every 100 ms, and the obtained focusing quality was compared with the reference value. If the difference was within 5%, the focal plane was locked at the same position. If not, the objective was moved up with a new focusing quality measured, at every 50 nm. If the difference became smaller, it indicated the objective was moving in the correct direction; if not, the objective was moved in the opposite direction. Using these iterations and logic controls, a shift of the focal plane can be detected and corrected in real time during an experiment.

Example 9: Single-Ev and Biological Nanoparticle Immuno-Phenotyping

The present Example describes single particle immuno-phenotyping using devices and methods according to embodiments of the present disclosure.

Isolation of Seminal Extracellular Vesicles (Evs) and Nanoparticles

Semen samples were obtained from the University of Washington Male Fertility Program. Written informed consent was obtained from each donor. All protocols were approved by the Institutional Review Boards of the University of Washington and the Fred Hutchinson Cancer Research Center. Briefly, a series of centrifugation steps were employed to isolate seminal plasma from semen samples, and the plasma was then filtered through a 0.22-μm syringe filter. After ultracentrifugation over a sucrose gradient, the 30% and 25% sucrose cushions containing seminal EVs and nanoparticles were pooled and washed by centrifugation through an Amicon Ultracel 100-kDa cellulose centrifugal filter. Seminal EVs/nanoparticles were then filtered by a size exclusion chromatography column to remove proteins in solution. The final EVs/nanoparticles concentration was ~$10^{13}$/mL based on nanoparticle tracking analysis.

Flow Analysis of Seminal Extracellular Vesicles and Nanoparticles

Prior to labeling, the seminal EVs/nanoparticles suspension was diluted to 1010/mL in HEPES buffer (20 mM, pH 7.4). To label tetraspanins, 100 μL of diluted EVs/nanoparticles suspension was incubated with 10 μL of diluted antibody solution. For each antibody, we tested multiple concentrations ranging from $10^{-6}$ to $10^{-1}$ μg/mL to generate a titration curve. After incubation with antibodies for 1 h, 1 μL of 20 μM Di-8-ANEPPS in dimethyl sulfoxide was added to the solution to label the lipid membrane. After 10 min of incubation with Di-8-ANEPPS, the solution was centrifuged and re-diluted three times in HEPES buffer containing 0.1% bovine serum albumin (BSA) using a spin-column (Sartorius Vivaspin 500, 300-kDA) to remove excess antibodies.

A flow platform was developed based, according to embodiments of the present disclosure, on a line confocal design and included four spatially separated laser lines and five avalanche photodiodes. In each experiment, 5 μL of sample was injected into an inlet reservoir on the microfluidic chip. Due to a height difference in reservoir fluid levels, flow was initiated without an external pump, making operation simple and robust. The injected sample flowed through a 2X2 μm channel and was excited by four laser lines. This channel geometry offered high sensitivity and high throughput without clogging. The laser lines were over 10 times the channel width to achieve homogeneous excitation across the channel. At maximal laser output, the power density inside the channel was about 20 kWcm$^{-2}$. Emitted photons at each laser line were filtered with an aperture and a band-pass filter before being focused onto the detector. A custom-built autofocusing system which uses backscattering of a 640 nm laser line as real-time feedback was employed to minimize focus drift. Due to the high excitation power density, high focusing stability, and reduced excitation and detection volumes, the system provides sufficient sensitivity for detection of a single fluorophore.

As above, for flow measurements, 5 μL of sample was injected into the inlet reservoir of the microfluidic chip. The typical volumetric flowrate was ~15 pL/s. Fluorescence signals were collected by APDs at 10 kHz. An autofocusing system, such as described in Example 8 was engaged to minimize focus drift during the experiment. To differentiate signal from noise, a threshold was set as the average background plus five times the medium absolute deviation of the background. The intensity of each event was calculated by integration within a fixed time window after background subtraction.

We collected flow trajectories of diluted free antibodies and Di-8-ANEPPS-labeled EVs/nanoparticles at different excitation powers to determine the optimal signal-to-noise ratio in each channel.

For high-throughput profiling of tetraspanins, we labeled seminal EVs/nanoparticles with the membrane dye Di-8-ANEPPS and with the fluorophore-conjugated anti-tetraspanin antibodies, Brilliant Violet 510 (BV510)-anti-CD9, phycoerythrin (PE)-anti-CD63, and Alexa Fluor 647-anti-CD81. Di-8-ANEPPS is nonfluorescent in water but becomes highly fluorescent when inserted into a lipid membrane. The fluorescence intensity of a membrane dye-stained EV is proportional to the surface area of the lipid membrane. We observed that, with scaling, the distribution of the square root of the intensity of Di-8-ANEPPS-stained EVs could be overlaid with the EV size distribution determined from dynamic light scattering (DLS). The scaling factor allowed estimation of EV size from the membrane dye signals detected in flow. We collected flow trajectories of the three diluted free antibodies at different excitation powers to determine the optimal signal-to-noise ratio in each detection channel. At the optimal excitation power, a single antibody intensity histogram could be fitted to a log-normal distribution. Based on the truncated fraction in the intensity histogram fitting, we determined over 98% of single antibodies were detected in our flow system.

As EVs labeled with membrane dye and with fluorescently labeled anti-tetraspanin antibodies flowed through the laser lines, the fluorescence signal of each dye was detected by the corresponding detector. The transit time between two laser lines was determined by cross-correlation analysis of the trajectories collected by the detection channels. The transit time was used to perform co-localization between different channels. A signal was attributed to an EV only when the antibody peak occurred within the expected time-window near a membrane dye peak to minimize the influence of free antibodies.

Figure 17A:
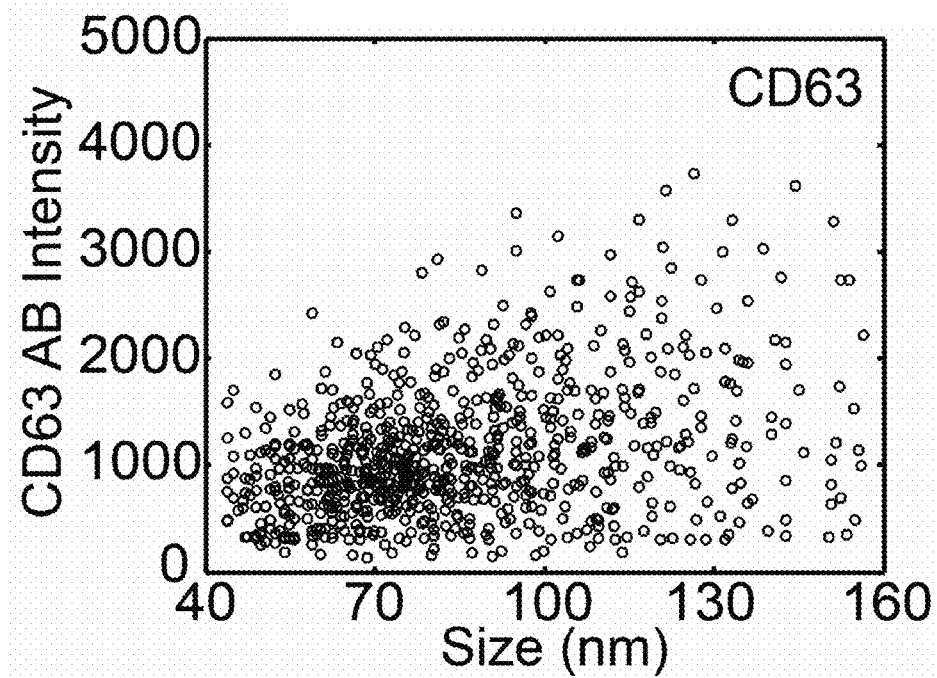
FIGS. 17A-17C illustrate seminal exosome size versus antibody fluorescence intensity for CD63+ (17A), CD81+ (17B), and CD9+ (17C) exosomes, in accordance with an embodiment of the present disclosure.
Figure 17B:
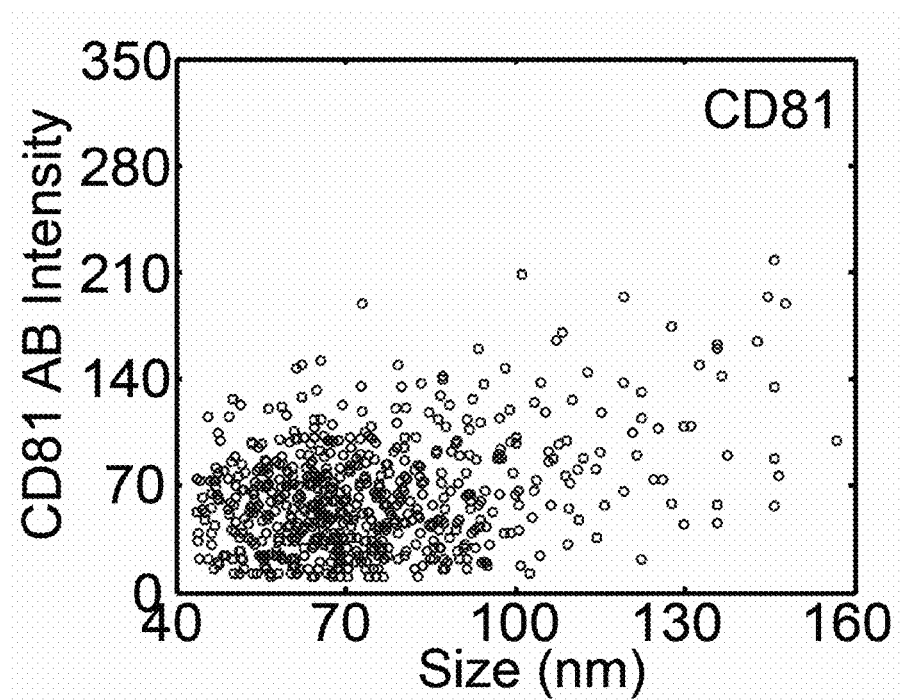
Figure 17C:
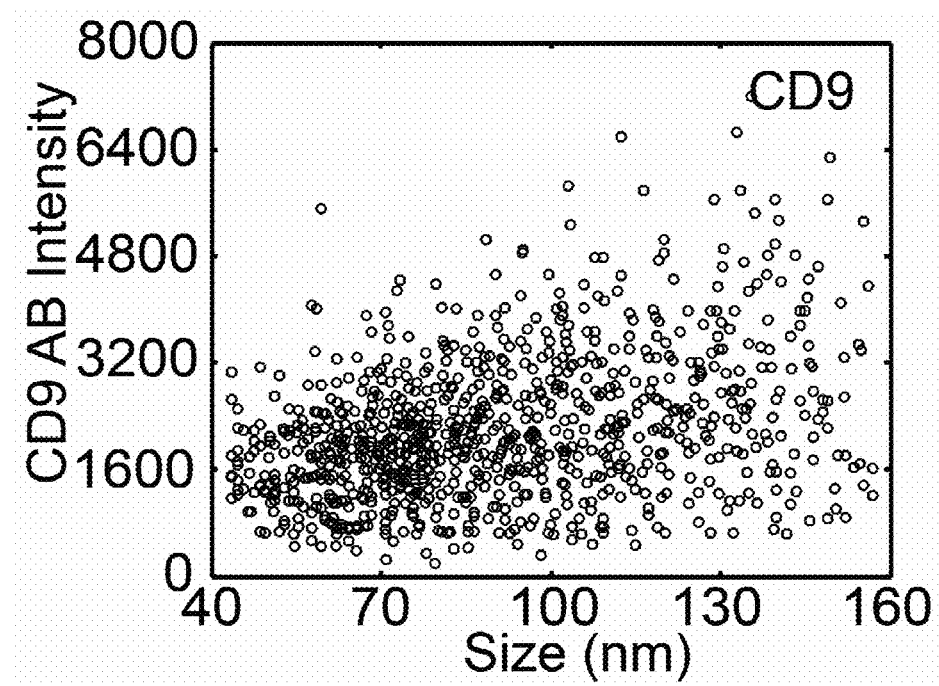
Figure 17D:
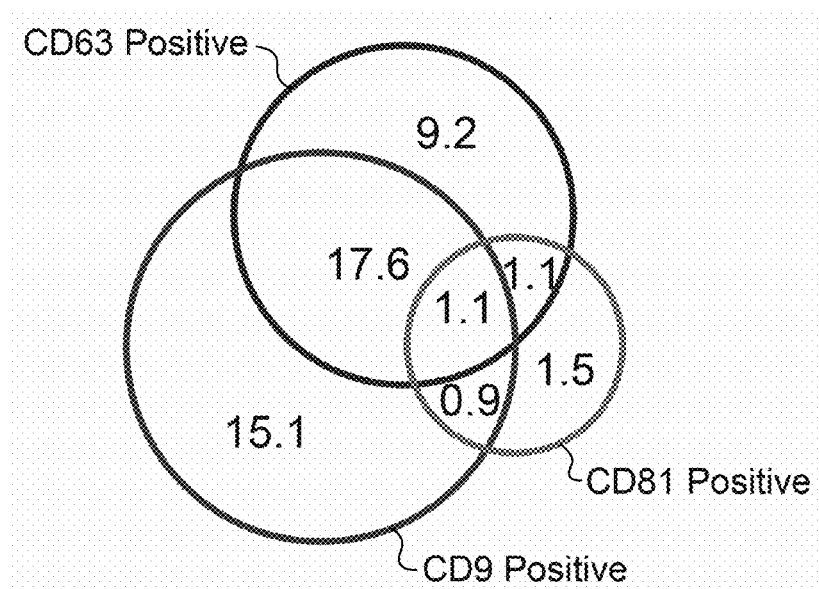
FIG. 17D is a Venn diagram illustrating percentages of subpopulations of seminal exosomes illustrated in FIGS. 17A-17C, in accordance with an embodiment of the present disclosure.

We converted the square root of membrane dye intensity to EV size and plotted EV size versus antibody intensity (FIGS. 17A-17C). The resulting scatter plots showed a weak correlation between protein expression level and EV size for all three tetraspanins. Through four-color co-localization analysis, we identified seven subgroups of seminal exosomes (FIG. 17D). 15.1% of seminal exosomes expressed only CD9, 9.2% expressed only CD63, and 1.5% expressed only CD81. Only 1.1% of seminal exosomes had all three tetraspanins. The 53.5% of membrane-stained vesicles not represented in FIG. 17D showed no significant expression of CD63, CD81, or CD9. These results indicate that while CD63, CD81, and CD9 are all considered common exosome markers, many seminal exosomes express only one or two of these markers, and there is great heterogeneity in tetraspanin expression levels both between exosomes and between these tetraspanins.

Figure 18A:
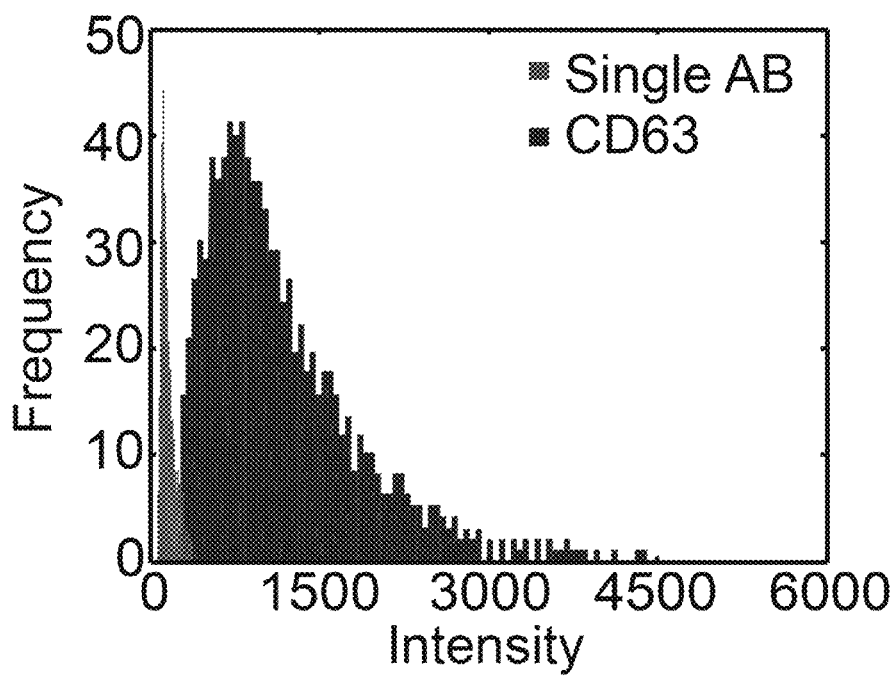
FIGS. 18A-18C illustrate Intensity distributions of single anti-CD63 (18A), anti-CD81 (18B), and anti-CD9 (18C) antibodies and corresponding antibody-labeled seminal exosomes, in accordance with an embodiment of the present disclosure.
Figure 18B:
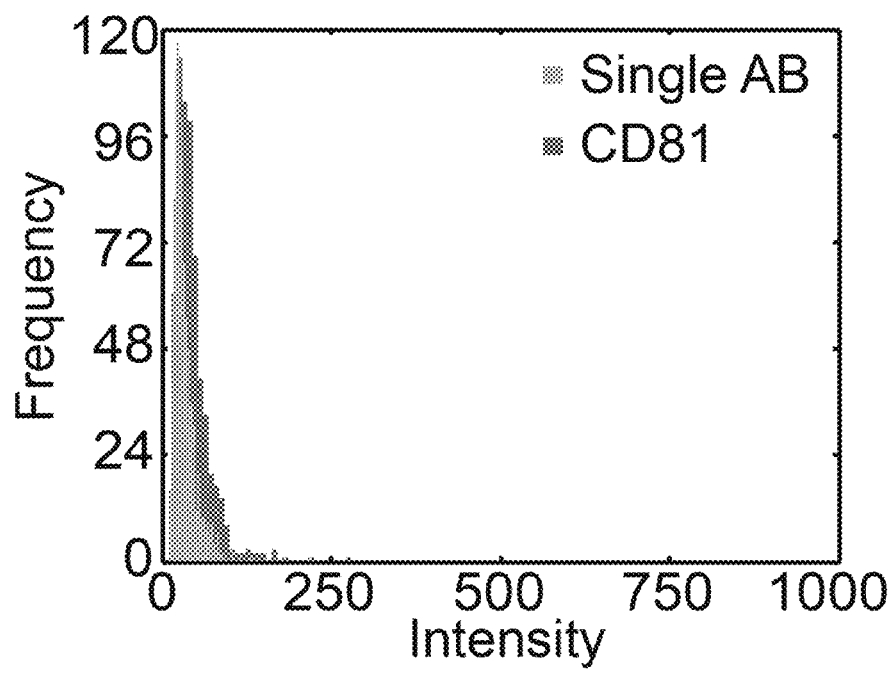
Figure 18C:
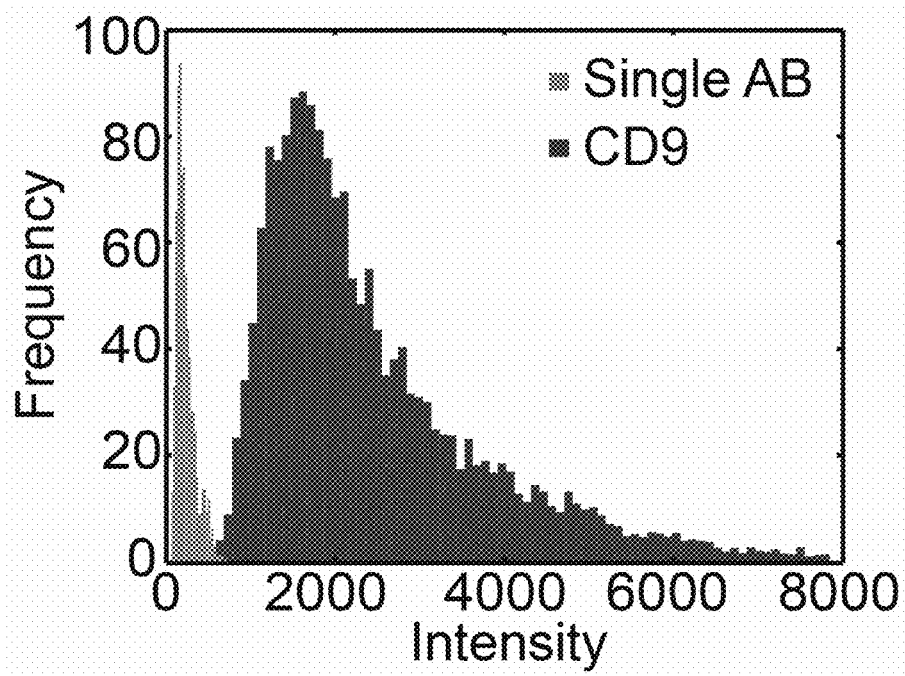
Figure 18D:
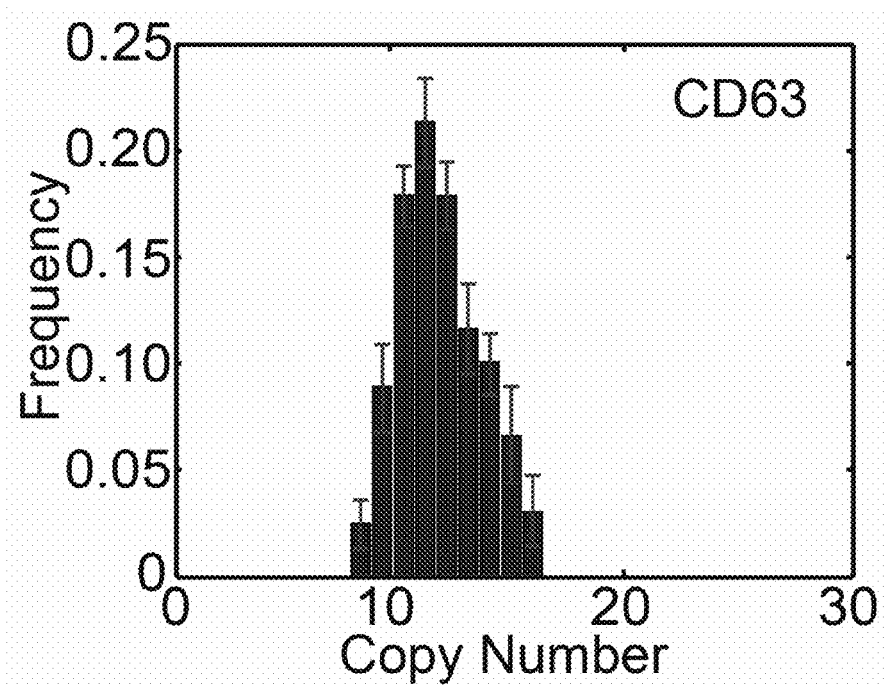
FIGS. 18D-18F illustrate copy number distribution of the tetraspanins CD63 (18D), CD9 (18E), and CD81 (18F), in accordance with an embodiment of the present disclosure.
Figure 18E:
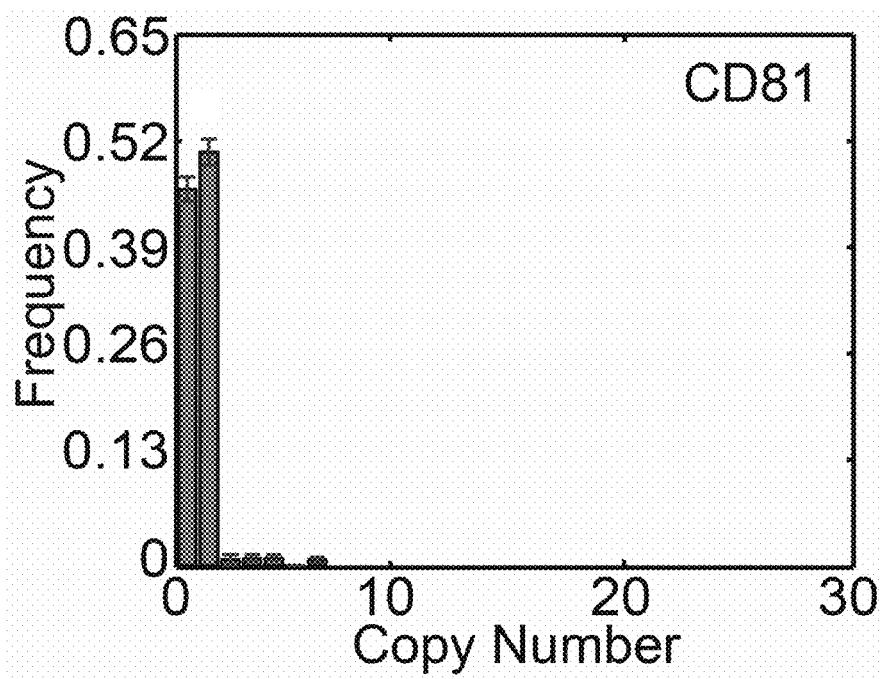
Figure 18F:
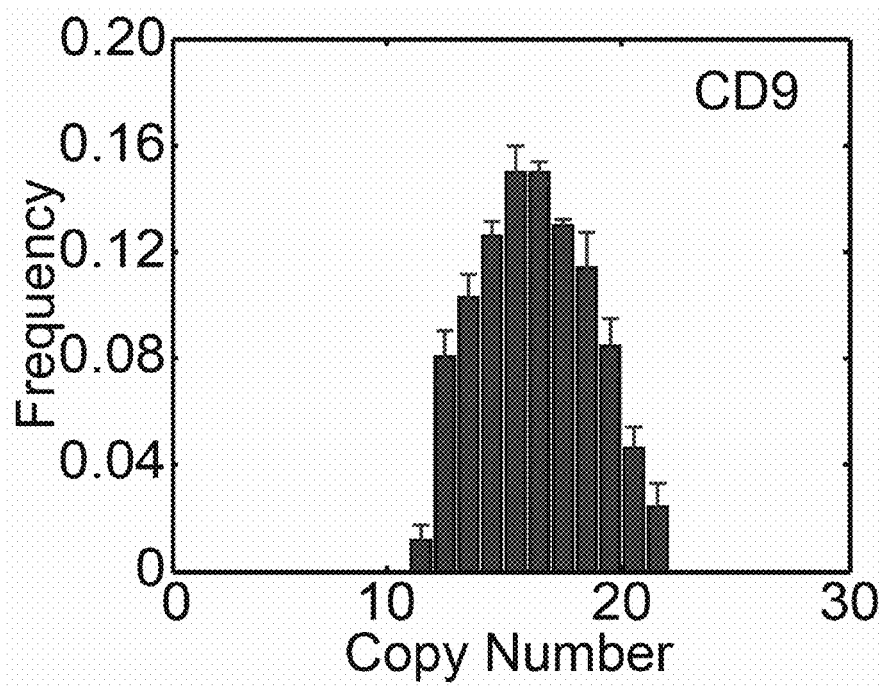

Example 10: Single-Ev and Biological Nanoparticle Protein Copy-Number Determination Using the seminal EVs/nanoparticles as prepared in Example 9, tetraspanin copy number distributions were obtained by deconvolving the intensity distributions of antibody-labeled exosomes using single antibody intensity distributions (FIGS. 18A-18C). For each tetraspanin, we labeled exosomes with antibodies at different concentrations and analyzed the exosomes in flow to ensure saturated labeling. The average copy numbers of CD63, CD81, and CD9 were 12.8, 1.6, and 17.0, respectively (FIGS. 18D-18F).

Because we can detect the dimmest <1% of single molecules present, we use the single-molecule intensity distribution to de-convolve the single-EV intensity distribution to determine precisely the number of bound antibodies, and thus the corresponding protein, on each EV. FIGS. 18A-18C show that in a single experiment, we were able to obtain both the intensity distributions of the single antibodies and single EVs fully labeled with the antibodies. The average copy numbers of the 3 tetraspanins were 12.8 (CD63), 1.6 (CD81), and 17.0 (CD9), respectively; FIGS. 18D-18F show also how the copy numbers vary between EVs. This quantitative information about the molecular composition of single EVs is useful in distinguishing intact vs fragmented EVs, in subtyping EVs, or in studying EV biogenesis and regulation.

Figure 19A:
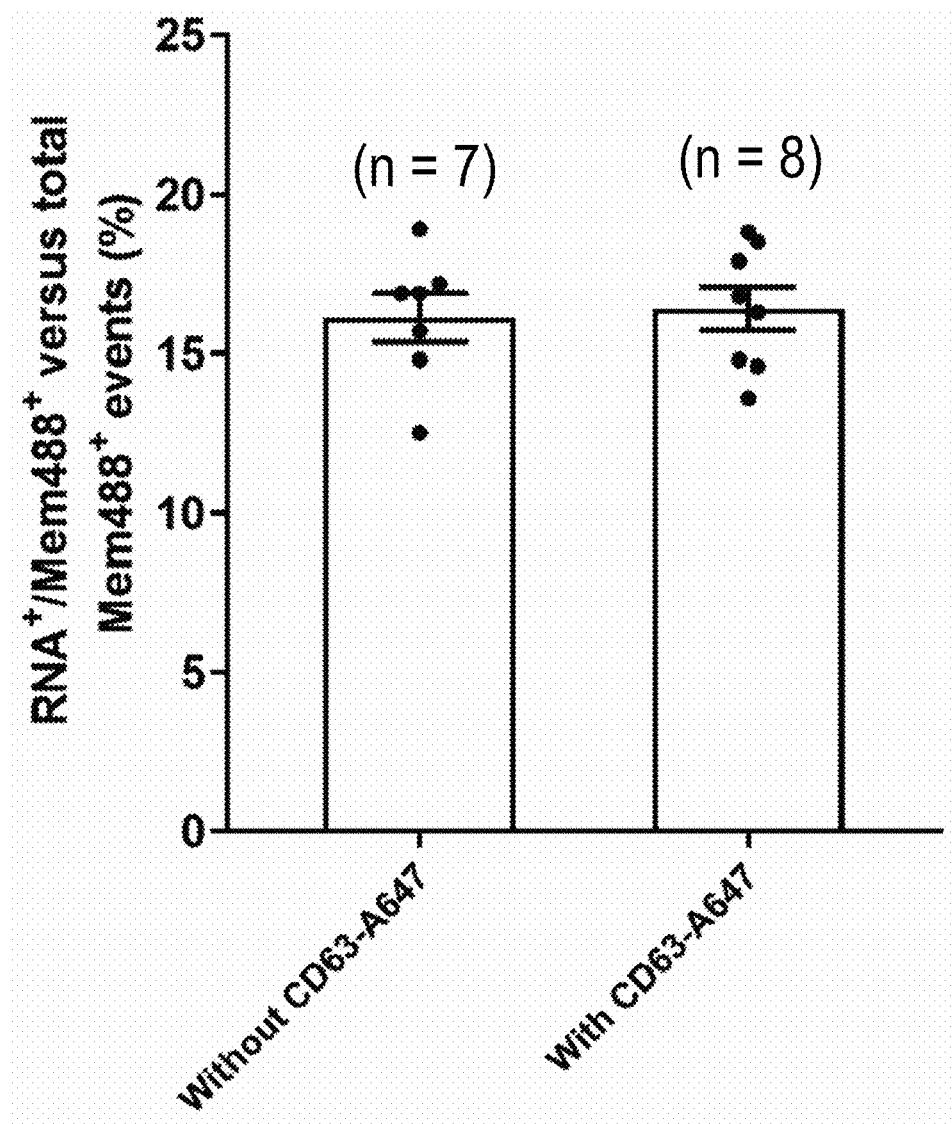
FIG. 19A illustrates the percentages of vesicles or lipid-containing nanoparticles as reported by a membrane dye that contain and do not contain RNAs as reported by a membrane permeant RNA dye (SYTO), and furthermore, of the vesicles that contain RNA (positive for membrane dye and RNA dye), the percentage of those with and without the anti-CD63 antibody over all the vesicles (positive for membrane dye), in accordance with an embodiment of the present disclosure.
Figure 19B:
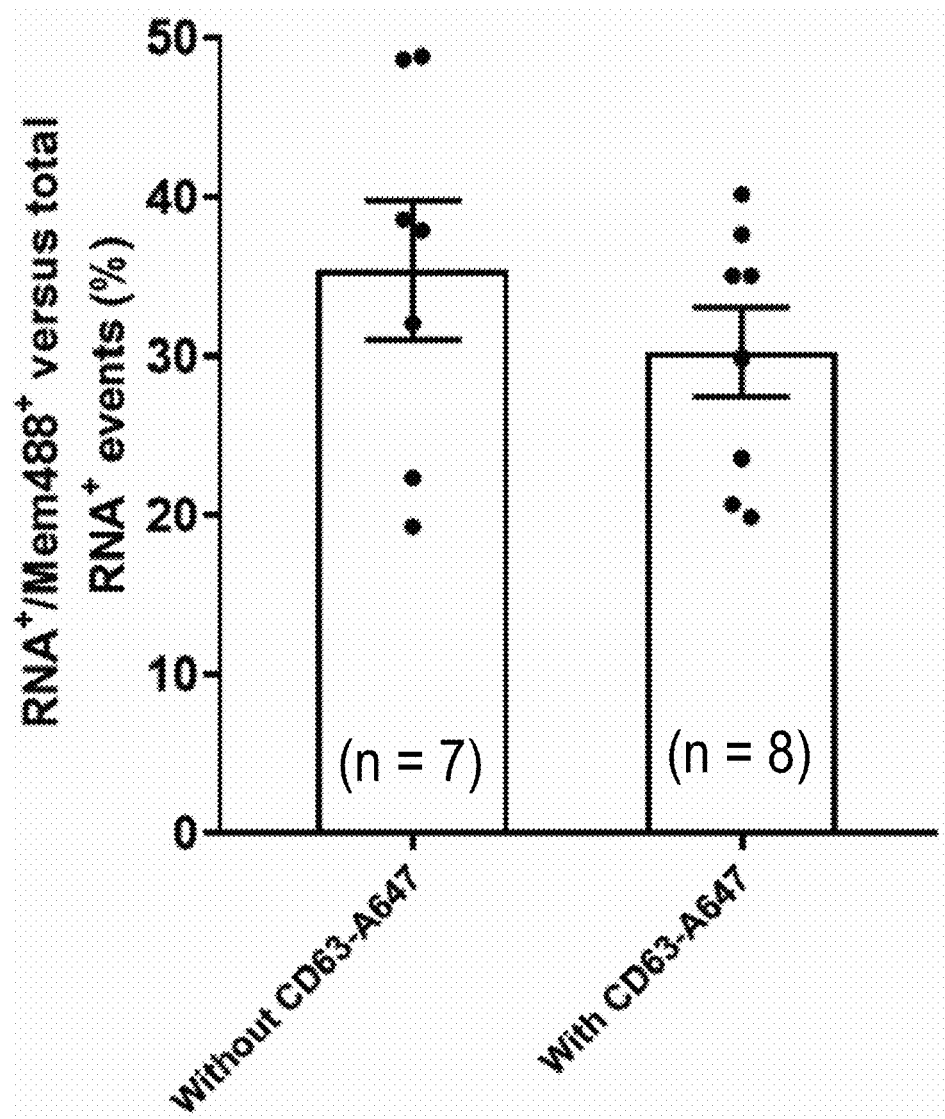
FIG. 19B illustrates the percentages of the RNA-containing particles or molecules as reported by a membrane permeant RNA dye (SYTO) that are or are not vesicles or lipid-containing nanoparticles as reported by a membrane dye, and furthermore, of the vesicles that contain RNA (positive for membrane dye and RNA dye), the percentage of those with and without the anti-CD63 antibody over all the RNA-containing particles or molecules (positive for the RNA stain), in accordance with an embodiment of the present disclosure.
Figure 19C:
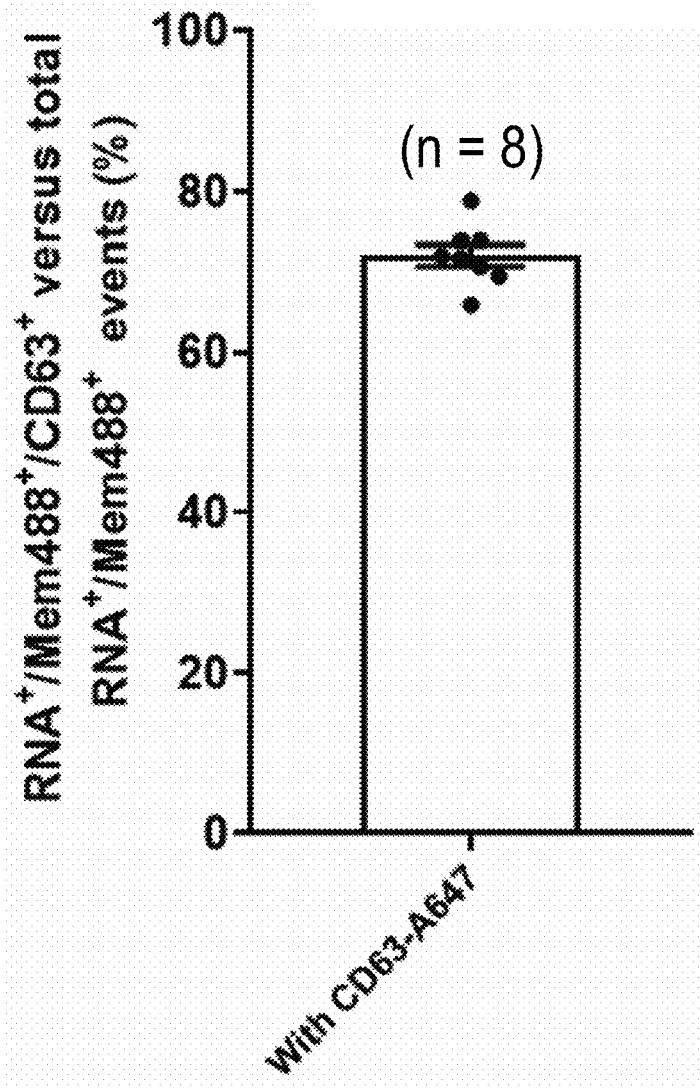
FIG. 19C illustrates the percentage of vesicles containing RNA and positive for CD63 (i.e. positive for membrane dye and RNA dye and anti-CD63) overall all vesicles or lipid-containing nanoparticles that contain RNA (i.e. positive for membrane dye and RNA dye), in accordance with an embodiment of the present disclosure.
Figure 19D:
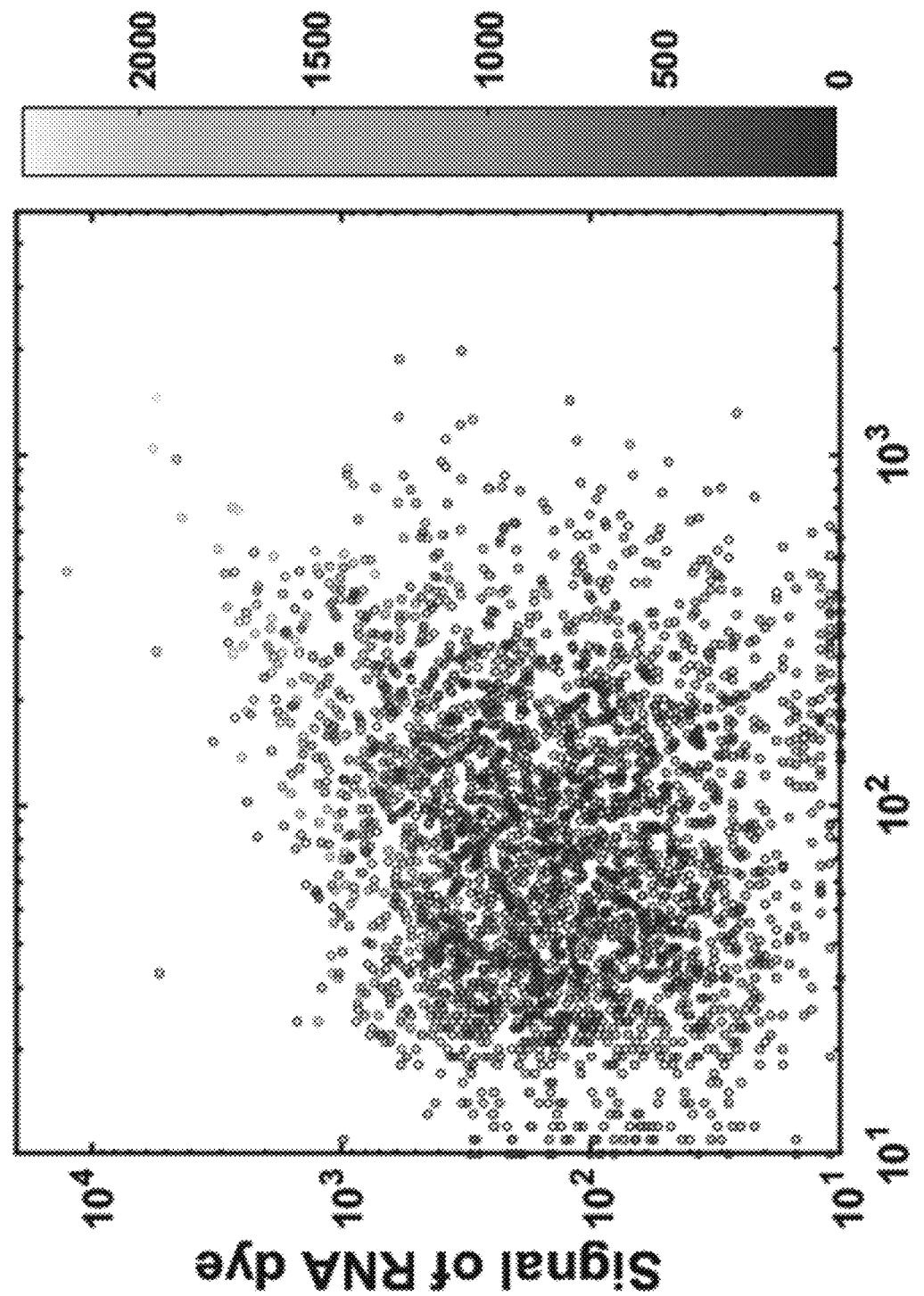
FIG. 19D illustrates vesicle size versus RNA content for the vesicles or lipid-containing nanoparticles of FIG. 19A, in accordance with an embodiment of the present disclosure.

Example 11: Single Nucleic-Acid-Containing Nanoparticles and Molecule Analysis, Such as Evs, RNA or DNA Binding Proteins, RNA or DNA Granules, and Other RNA- or DNA-Containing Nanoparticles FIGS. 19A-19D show that the single-EV/Nanoparticle/Molecule flow analyzer of the present disclosure can detect and track the RNA contents of individual EVs, as well as other non-EV biological nanoparticles or molecules, such as RNA binding proteins. Here, we used a membrane-permeant RNA stain, and, because of the high sensitivity of the flow analyzer, we were able to detect RNAs contained in either EVs, other non-EV vesicles, and other non-vesicle biological nanoparticles and molecules. To perform this measurement, we stained the semen EV sample with a membrane dye (labels all EV and non-EV membrane vesicles), anti-CD63 antibody (a classic exosome marker), and a membrane-permeant RNA dye (SYTO). This result shows that of all the membrane vesicles present, only ~15% contained RNAs (FIG. 19A), and of all the RNA-containing biological particles present, only ~35% were within membrane vesicles (FIG. 19B). But if the RNA is contained within a membrane vesicle, then ~75% of these vesicles were exosomes as defined by CD63 (FIG. 19C). We did not find significant correlation between EV size and RNA content (FIG. 19D).

This capability offered by the single-EV/Nanoparticle/Molecule flow analyzer allows for both single-EV/nanoparticle immuno-phenotyping and tracking of the RNA contents of EVs and other biological nanoparticles.

Example 12: Single Viral Particle Analysis

The present Example describes determining integrity or functional state of viral particles through determining protein copy number and nucleic acid content.

Proteins and nucleic acids in or on viral particles are labelled as described in the previous Examples, such as in Examples 9 and 11. As above, the single-molecule intensity distribution of fluorescently labelled viral proteins is used to de-convolve the single-viral particle intensity distribution to determine precisely the number of bound antibodies. Furthermore, as above, the fluorescence intensity of nucleic-acid stain reports the presence or absence or amount of nucleic acid contained in the viral particle. For membrane-containing viral particles, as above, the fluorescence intensity of a membrane dye stained viral particle is proportional to the surface area of the lipid membrane and the size of the viral particles can be determined based on signal intensity from individual particles.

The determined particle protein and/or nucleic acid content, and optionally size, are then used to determine whether the analyzed viral particle is a typical intact or functional viral particle, or is too small to be intact and is, rather, a portion or subunit of a viral particle or is a non-functional viral particle (e.g. an otherwise intact viral particle but is empty and does not contain nucleic acid).

Example 13: Absolute Quantification of Concentration Via Direct Counting of Fluorescent Single-Particles or Single-Molecules The present Example demonstrates methods for absolute quantification of concentration of fluorescent particles or molecules in a sample through direct counting of such particles or molecules passing through devices according to embodiments of the present disclosure.

As described further herein, the devices of the present disclosure are configured to detect essentially or close to every fluorescent particle or molecule (or at least a large fraction, such as over 90%) that flows through the channel. Accordingly, it is also possible to extract with high accuracy the linear velocity of each particle or a portion of the particles, which, together with knowing the cross-section of the channel, allows one to determine the corresponding volumetric flow rate. As a result, the devices of the present disclosure are configured to provide absolute quantification of EV/biological nanoparticle concentration in a sample without calibration via single-particle counting (#particles counted÷volume flown through). This new capability will find broad use by researchers in fields that study biological nanoparticles, including EVs, Viruses, Lipoproteins (e.g. HDL, LDL, VLDL), and Macromolecular Complexes (e.g. circulating RNA binding proteins, RNA granules, exomeres). For example, this capability allows for the determination of the absolution concentration of a subtype of biological nanoparticle or EVs based on the particle or EVs' phenotype (e.g. based on the presence and/or absence and/or amount of certain biomarkers (e.g. proteins) and/or nucleic acid and/or size of the particle) as described in Example 9-12 above.

Figure 20B:
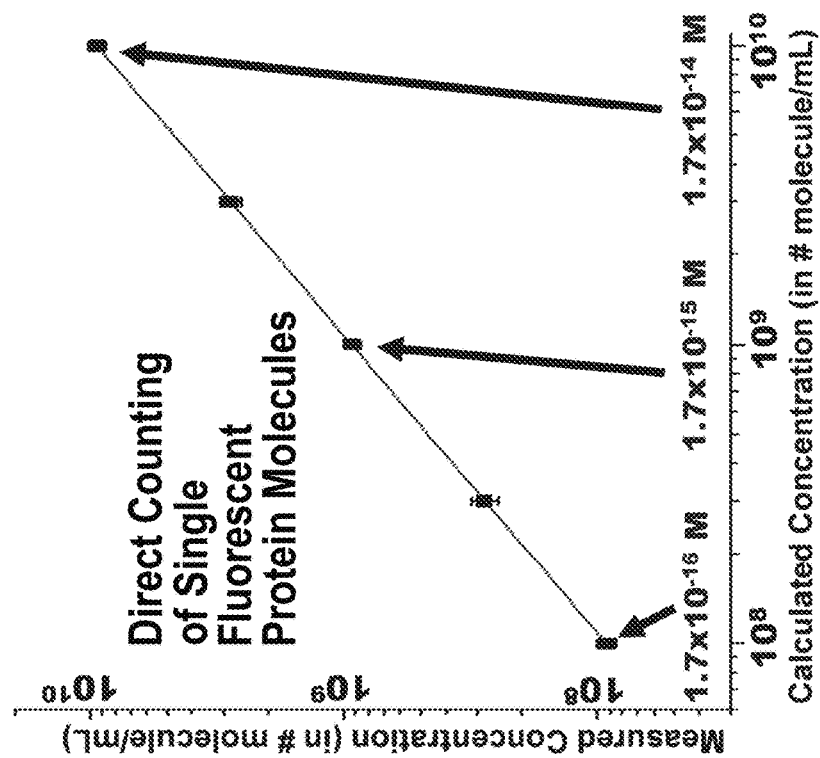
FIGS. 20A and 20B illustrate concentration determination via direct counting of single fluorescent particle or molecule, where 20A illustrates single-200 nm-fluorescent bead counting at the same flow rate covering a concentration range of ~4 orders-of-magnitude such that by increasing the flow rate, the lower concentration range can be increased further; by incorporating Poisson correction, the upper concentration range also can be extended further, and 20B shows absolute quantification of the concentration of single fluorescent proteins to below 1 fM·in concentration.
Figure 20A:
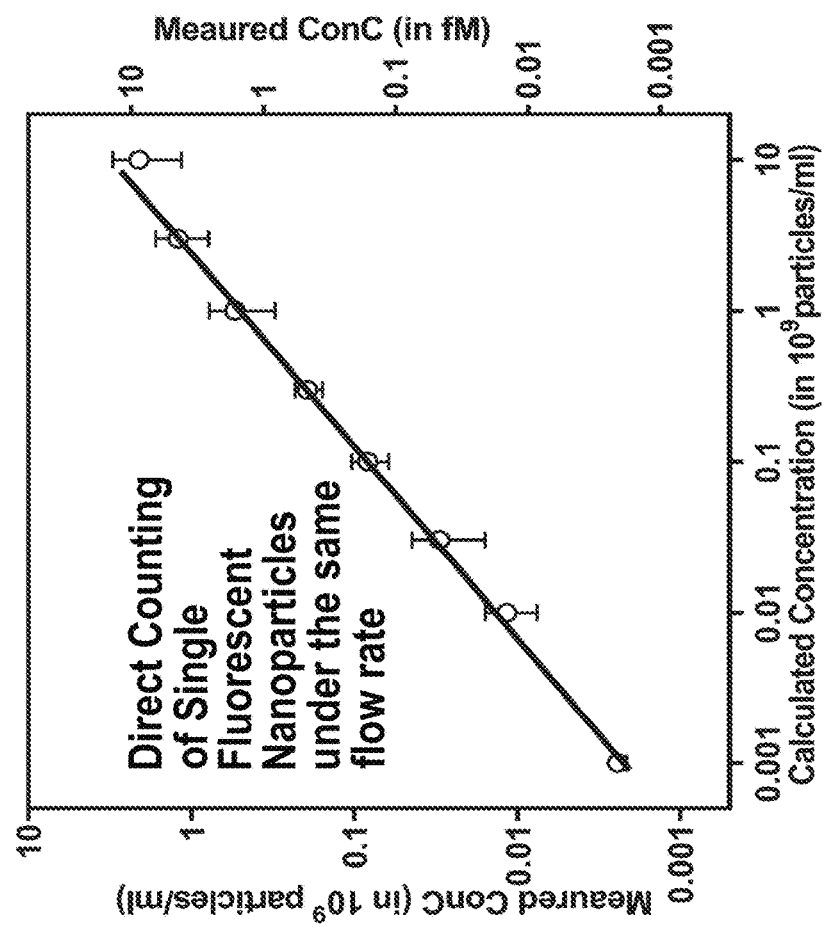

FIGS. 20A and 20B show the direct counting of fluorescent nanoparticles and fluorescent proteins molecules. Here fluorescent antibodies are shown, but the methods of the present Example are applicable to other fluorescent proteins, fluorescent DNA, fluorescent RNA, and other fluorescent molecules. FIG. 20A shows measurements down to $10^6$ fluorescent nanoparticles per mL, which corresponds to $1.67 \times 10^{-18}$ M. This limit is set by the experiment run time. In the present Example, the sampling rate is $10^4$ events per see, and thus even this very low concentration detection limit can be extended by increasing the flow rate. The approximate 4 order-of-magnitude range shown in FIG. 20A was performed using the same flow rate. FIG. 20B shows similar absolute quantification of fluorescent protein molecules (Alexa647 conjugated proteins).

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for self-corrected single-molecule and/or single-particle flow analysis, the system comprising:
a channel configured to flow a particle and/or a molecule through a lumen of the channel, the channel defining an interrogation window configured to allow light to pass into and out of the lumen;
a light engine comprising:
a first light source positioned to output first excitation light onto a first portion of the channel in the interrogation window; and
a second light source positioned to output second excitation light onto a second portion of the channel in the interrogation window separate from the first portion; and
a detector system comprising:
a first photodetector positioned to receive first emission light emitted from the first portion of the channel; and
a second photodetector positioned to receive second emission light emitted from the second portion; and
a controller operatively coupled to the first light source, the second light source, the first photodetector, and the second photodetector, including logic that, when executed by the controller, causes the system to perform operations including:
outputting the first excitation light with the first light source;
outputting the second excitation light with the second light source;
generating a first emission signal with the first photodetector based upon first emission light received from the first portion;
generating a second emission signal with the second photodetector based upon second emission light received from the second portion; and
determining a velocity of a particle and/or a molecule in the channel based on a time difference between generating the first emission signal and the second emission signal and a distance between the first portion and the second portion.

2. The system of claim 1, wherein the controller further includes logic that, when executed by the controller, causes the system to perform operation include:
correlating the first emission signal and the second emission signal based on an emission signal characteristic shared by the first emission signal and the second emission signal.

3. The system of claim 1, wherein the velocity of the particle and/or molecule is used to determine a volumetric flow rate through the lumen including the interrogation window.

4. The system of claim 1, wherein quantifying the number of particles and/or molecules comprise single-molecule sensitivity or detection efficiency.

5. The system of claim 1, wherein the channel is disposed in a portion of a microfluidic device.

6. The system of claim 5, wherein the microfluidic device defines a planar portion.

7. The system of claim 5, wherein the channel within the interrogation window defines a constriction relative to adjacent portions of the channel.

8. A method of self-corrected single-molecule and/or single-particle flow analysis, the method comprising:
flowing a particle and/or molecule through a lumen of a channel, the channel defining an interrogation window configured to allow light to pass into and out of the lumen;
outputting first excitation light with a first light source into a first portion of the interrogation window;
outputting second excitation light with a second light source into a second portion of the interrogation window separate from the first portion;
generating a first emission signal with a first photodetector based upon first emission light received from the first portion;
generating a second emission signal with a second photodetector based upon second emission light received from the second portion; and
determining a velocity of a particle and/or molecule in the channel based on a time difference between the first emission signal and the second emission signal and a distance between the first portion and the second portion.

9. The method of claim 8, further comprising correlating the first emission signal and the second emission signal based on an emission signal characteristic.

10. The method of claim 9, wherein correlating the first emission signal and the second emission signal includes comparing an intensity of the first emission signal with an intensity of the second emission signal.

11. The method of claim 9, further comprising enumerating a number of particles and/or molecules passing through the channel based upon correlating the first emission signal and the second emission signal.

12. The method of claim 11, wherein enumerating a number of particles and/or molecules comprises single-molecule sensitivity or detection efficiency.

13. The method of claim 12, wherein the channel is disposed in a portion of a microfluidic device.

14. The method of claim 12, wherein the microfluidic device defines a planar portion.

15. The method of claim 9, further comprising colocalizing target molecules on a particle and/or molecule based upon correlating the first emission signal with the second emission signal.

16. The method of claim 9, further comprising determining a particle and/or molecule concentration based upon correlating the first emission signal with the second emission signal.

17. The method of claim 9, further comprising determining a detection efficiency and recovery rate based upon correlating the first emission signal with the second emission signal.

18. The method of claim 8, wherein the velocity of the particle and/or molecule is used to determine a volumetric flow rate through the lumen including the interrogation window.

19. The method of claim 8, wherein the particle and/or molecule comprises a dye excited by one or more of the first excitation light and the second excitation light.

20. The method of claim 8, wherein the channel within the interrogation window defines a constriction relative to adjacent portions of the channel.

21. A method of maintaining focus of optical components directed on a fluidic channel, the method comprising:
- illuminating an imaging area of a microfluidic system with light from a light source;
- generating an image of the imaging area with a camera;
- determining an amount of defocus of the image;
- determining whether the amount of defocus is within a predetermined amount of defocus; and
- moving the fluidic channel relative to the camera if the amount of defocus is outside of the predetermined amount of defocus.

22. The method of claim 21, further comprising collecting the focused light back reflected from the interrogation with a light collection system, wherein the light collection system comprises an air objective having a numerical aperture in a range of about 0.91 to less than 0.99, or about 0.95.

23. The method of claim 21, wherein the light is in a range of about 700 nm to about 1500 nm.

* * * * *